United States Patent
Lin et al.

(10) Patent No.: US 12,334,031 B2
(45) Date of Patent: Jun. 17, 2025

(54) CHOLESTERIC LIQUID CRYSTAL DISPLAY DEVICE AND METHOD FOR DRIVING THE SAME

(71) Applicant: IRIS OPTRONICS CO., LTD., Tainan (TW)

(72) Inventors: Hui Cheng Lin, Tainan (TW); Cheng-Hong Yao, Tainan (TW); Chi Chang Liao, Tainan (TW)

(73) Assignee: IRIS OPTRONICS CO., LTD., Tainan (TW)

( * ) Notice: Subject to any disclaimer, the term of this patent is extended or adjusted under 35 U.S.C. 154(b) by 0 days.

(21) Appl. No.: 18/632,147

(22) Filed: Apr. 10, 2024

(65) Prior Publication Data
US 2024/0412704 A1   Dec. 12, 2024

Related U.S. Application Data

(60) Provisional application No. 63/471,481, filed on Jun. 6, 2023.

(51) Int. Cl.
  G09G 3/36     (2006.01)
  G02F 1/133    (2006.01)
  (Continued)

(52) U.S. Cl.
  CPC ....... G09G 3/3629 (2013.01); G02F 1/13306 (2013.01); G02F 1/134309 (2013.01);
  (Continued)

(58) Field of Classification Search
  CPC .. G09G 3/2007; G09G 3/3629; G09G 3/3674; G09G 3/3696; G09G 2310/02;
  (Continued)

(56) References Cited

U.S. PATENT DOCUMENTS

| 6,414,669 B1* | 7/2002 | Masazumi | G09G 3/3629 |
| | | | 345/98 |
| 2005/0001797 A1* | 1/2005 | Miller, IV | G09G 3/3685 |
| | | | 345/87 |

(Continued)

OTHER PUBLICATIONS

European Extended Search Report mailed Oct. 1, 2024 in counterpart European application EP24177845.5, 14 pages in English.

*Primary Examiner* — Sanghyuk Park
(74) *Attorney, Agent, or Firm* — Juan Carlos A. Marquez; Marquez IP Law Office, PLLC

(57) ABSTRACT

The present disclosure provides a method for driving a cholesteric liquid crystal display device. The method includes the following steps: utilizing a driving circuit section to sequentially activate each scanning electrode within a display panel; utilizing the driving circuit section to apply first alternating-current (AC) voltage pulses to pixel circuits on an activated scanning electrode during a first stage within a pulse-width modulation (PWM) scanning procedure of an activated scanning electrode; and utilizing the driving circuit section to apply second AC voltage pulses to the pixel circuits on the activated scanning electrode during a second stage of the PWM scanning procedure. A first voltage amplitude and a first period of the first AC voltage pulses are different from a second voltage amplitude and a second period of the second AC voltage pulses, respectively.

20 Claims, 45 Drawing Sheets

(51) Int. Cl.
*G02F 1/1343* (2006.01)
*G09G 3/20* (2006.01)

(52) U.S. Cl.
CPC ....... *G09G 3/2007* (2013.01); *G02F 2203/30* (2013.01); *G09G 2310/02* (2013.01)

(58) Field of Classification Search
CPC .... G09G 2300/0486; G09G 2300/0495; G02F 1/13306; G02F 1/134309; G02F 2203/30
See application file for complete search history.

(56) References Cited

U.S. PATENT DOCUMENTS

| | | |
|---|---|---|
| 2011/0210953 A1 | 9/2011 | Nose et al. |
| 2013/0258220 A1 | 10/2013 | Uehara |

* cited by examiner

CHOLESTERIC LIQUID CRYSTAL DISPLAY DEVICE AND METHOD FOR DRIVING THE SAME

CROSS REFERENCE TO RELATED APPLICATION

This application claims the benefit of U.S. Provisional Application No. 63/471,481 filed on Jun. 6, 2023, the entirety of which is incorporated by reference herein.

TECHNICAL FIELD

The present disclosure relates to display devices, and, in particular, to a cholesteric liquid crystal display device and a method for driving the same.

DESCRIPTION OF THE RELATED ART

A cholesteric liquid crystal display (Ch-LCD) possesses bi-stable properties, allowing it to retain displayed content without power consumption. The planar state and focal conic state are both stable, meaning that when the applied voltage is deactivated, the molecular state and displayed images remain unchanged. Voltage is solely applied when it is necessary to transition the cholesteric liquid crystal molecules to a different state or refresh the displayed images. As a result, cholesteric liquid crystal display devices have become popular in temperature sensor displays, e-books, e-paper, electronic whiteboards, and various other products.

SUMMARY

In an aspect of the present disclosure, a cholesteric liquid crystal display device is provided, which includes a liquid crystal display panel. The liquid crystal display panel includes a first substrate, a second substrate, a cholesteric liquid crystal layer, and a driving circuit section. A plurality of first electrodes extending in a first direction are formed on the first substrate. A plurality of second electrodes extending in a second direction different from the first direction are formed on a second substrate. The cholesteric liquid crystal layer is formed between the first substrate and the second substrate. The driving circuit section is configured to apply a plurality of alternating-current (AC) voltage pulses to pixel circuits at intersections between the first electrodes and the second electrodes. A pulse-width modulation (PWM) scanning procedure of the pixel circuits on an activated first electrode comprises a first stage and a second stage. The first stage is configured to expedite the second stage for writing data to the pixel circuits on the activated first electrode.

In another aspect of the present disclosure, a cholesteric liquid crystal display device is provided, which includes a liquid crystal display panel. The liquid crystal display panel includes a first substrate, a second substrate, a cholesteric liquid crystal layer, and a driving circuit section. A plurality of first electrodes extending in a first direction are formed on the first substrate. A plurality of second electrodes extending in a second direction different from the first direction are formed on a second substrate. The cholesteric liquid crystal layer is formed between the first substrate and the second substrate. The driving circuit section is configured to apply a plurality of alternating-current (AC) voltage pulses to pixel circuits at intersections between the first electrodes and the second electrodes. The first stage is configured to manipulate grayscale values of the pixel circuits on the activated first electrode to be written in the second stage.

In yet another aspect of the present disclosure, a method for driving a cholesteric liquid crystal display device is provided. The cholesteric liquid crystal display device includes a display panel and a driving circuit section. The display panel comprises a plurality of scanning electrodes and a plurality of data electrodes, the method includes the following steps: utilizing the driving circuit section to sequentially activate each scanning electrode within the display panel; utilizing the driving circuit section to apply one or more first alternating-current (AC) voltage pulses to pixel circuits on an activated scanning electrode during a first stage within a pulse-width modulation (PWM) scanning procedure of an activated scanning electrode; and utilizing the driving circuit section to apply one or more second AC voltage pulses to the pixel circuits on the activated scanning electrode during a second stage of the PWM scanning procedure. A first voltage amplitude and a first frequency of the one or more first AC voltage pulses are different from a second voltage amplitude and a second frequency of the one or more second AC voltage pulses, respectively.

BRIEF DESCRIPTION OF THE DRAWINGS

Aspects of the present disclosure are best understood from the following detailed description when read with the accompanying figures. It is noted that in accordance with the standard practice in the industry, various features are not drawn to scale. In fact, the dimensions of the various features may be arbitrarily increased or reduced for clarity of discussion.

DETAILED DESCRIPTION

Figure 1:
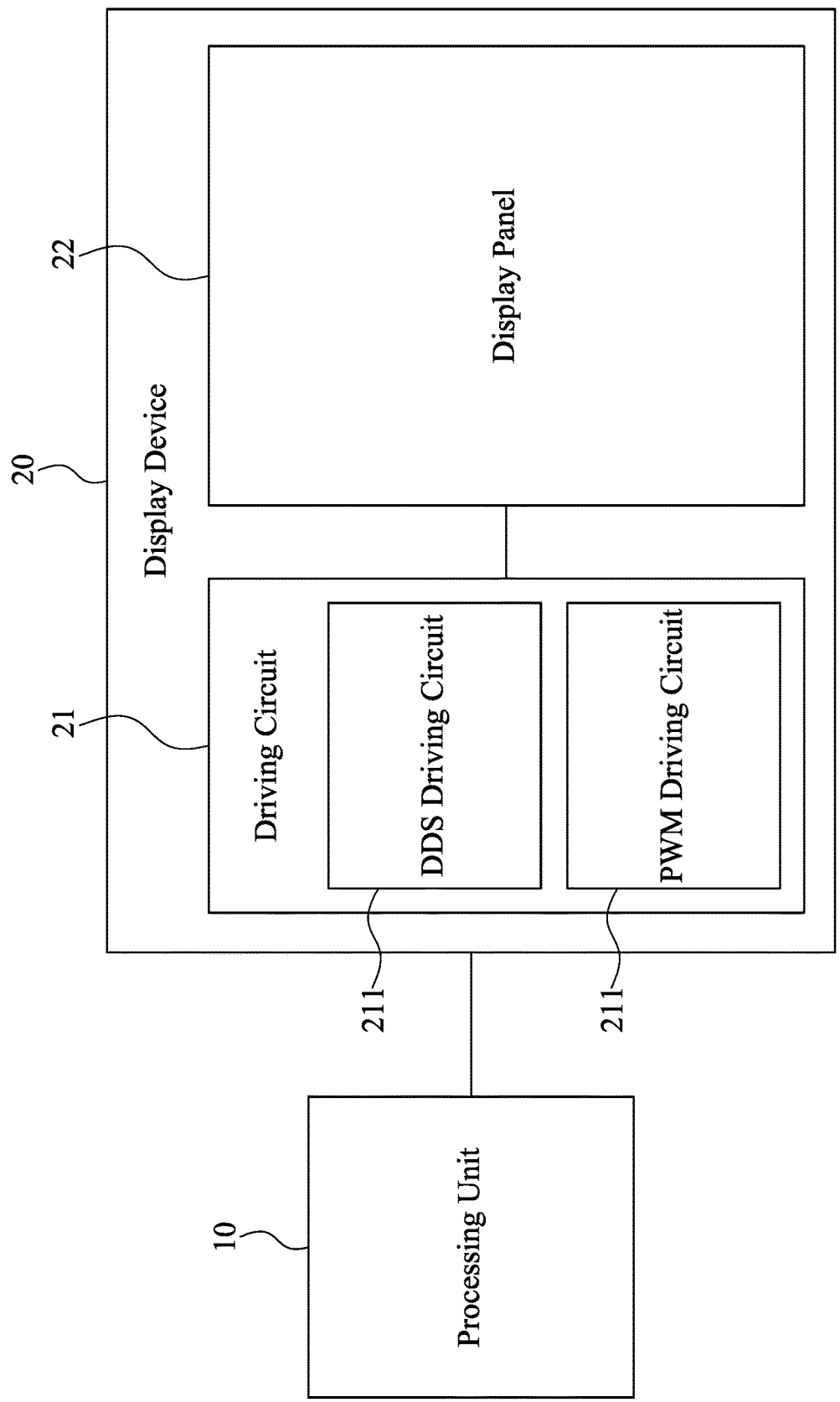
FIG. 1 is a block diagram of an electronic device in accordance with an embodiment of the present disclosure.

The following disclosure provides many different embodiments, or examples, for implementing different features of the provided subject matter. Specific examples of operations, components, and arrangements are described below to simplify the present disclosure. These are, of course, merely examples and are not intended to be limiting. For example, a first operation performed before or after a second operation in the description may include embodiments in which the first and second operations are performed together, and may also include embodiments in which additional operations may be performed between the first and second operations. For example, the formation of a first feature over, on or in a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Time relative terms, such as "prior to," "before," "posterior to," "after" and the like, may be used herein for ease of description to describe the relationship of one operation or feature to another operation(s) or feature(s) as illustrated in the figures. Such time relative terms are intended to encompass different sequences of the operations depicted in the figures. Further, spatially relative terms, such as "beneath," "below," "lower," "above," "upper" and the like, may be used herein for ease of description to describe the relationship of one element or feature to another element(s) or feature(s) as illustrated in the figures. Such spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Relative terms for connections, such as "connect," "connected," "connection," "couple," "coupled," "in communication," and the like, may be used herein for ease of description to describe an operational connection, coupling, or linking one between two elements or features. The relative terms for connections are intended to encompass different connections, couplings, or linkings of the devices or components. The devices or components may be directly or indirectly connected, coupled, or linked to one another through, for example, another set of components. The devices or components may be connected, coupled, or linked with each other by wire and/or wirelessly.

As used herein, the singular terms "a," "an," and "the" may include plural referents unless the context clearly indicates otherwise. For example, reference to a device may include multiple devices unless the context clearly indicates otherwise. The terms "comprising" and "including" may indicate the existences of the described features, integers, steps, operations, elements, and/or components, but may not exclude the existence of combinations of one or more of the features, integers, steps, operations, elements, and/or components. The term "and/or" may include any or all combinations of one or more listed items.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

The nature and use of the embodiments are discussed in detail as follows. It should be appreciated, however, that the present disclosure provides many applicable inventive concepts that can be embodied in a wide variety of specific contexts. The specific embodiments discussed are merely illustrative of specific ways to embody and use the disclosure, without limiting the scope thereof.

FIG. 1 is a block diagram of an electronic device in accordance with an embodiment of the present disclosure.

In some embodiments, the electronic device 1 may be an E-book, and E-paper, an electronic whiteboard, a temperature display board, etc., but the present disclosure is not limited thereto. As depicted in FIG. 1, the electronic device 1 may include a processing unit 10 and a display device 20. The processing unit 10 may be a central processing unit (CPU), a digital signal processor (DSP), an image signal processor (ISP), a microprocessor, a microcontroller unit (MCU), or any other equivalent circuit, but the present disclosure is not limited thereto. The display device 20 may be cholesteric liquid crystal display (ChLCD) device.

In some embodiments, the display device 20 may include a driving circuit 21 and a display panel 22. The display panel 22 may be a ChLCD panel which includes multiple ChLC layers for red, green, and blue pixel arrays. Additionally, the driving circuit 21 may include a dynamic driving scheme (DDS) driving circuit 211 and a pulse width modulation (PWM) driving circuit 212. In some embodiments, one of the DDS driving circuit 211 and the PWM driving circuit 212 is used to drive the display panel 22. In other words, the display panel 22 can be driven either in a DDS driving mode or a PWM driving mode, depending on the driving mode selected by the driving circuit 21.

In some embodiments, the DDS driving mode exhibits certain characteristics, such as a faster scan speed and high image contrast in display effects. However, the color scale effect is not ideal because the reflectivity is significantly reduced when displaying colors in the dark state, typically around 4.5%. Additionally, the grayscale depth of the DDS driving mode is relatively limited, usually ranging from 4 to 8 levels. The PWM driving mode possesses certain characteristics, including a slower scan speed and poorer image contrast in display effects. However, the color scale display effect is better in the PWM driving mode because the reflection is reduced when displaying colors in the dark state, with a typical reflectivity of around 6%. Additionally, the PWM driving mode offers a relatively higher grayscale color depth, typically divided into 16 levels.

Figure 2A:
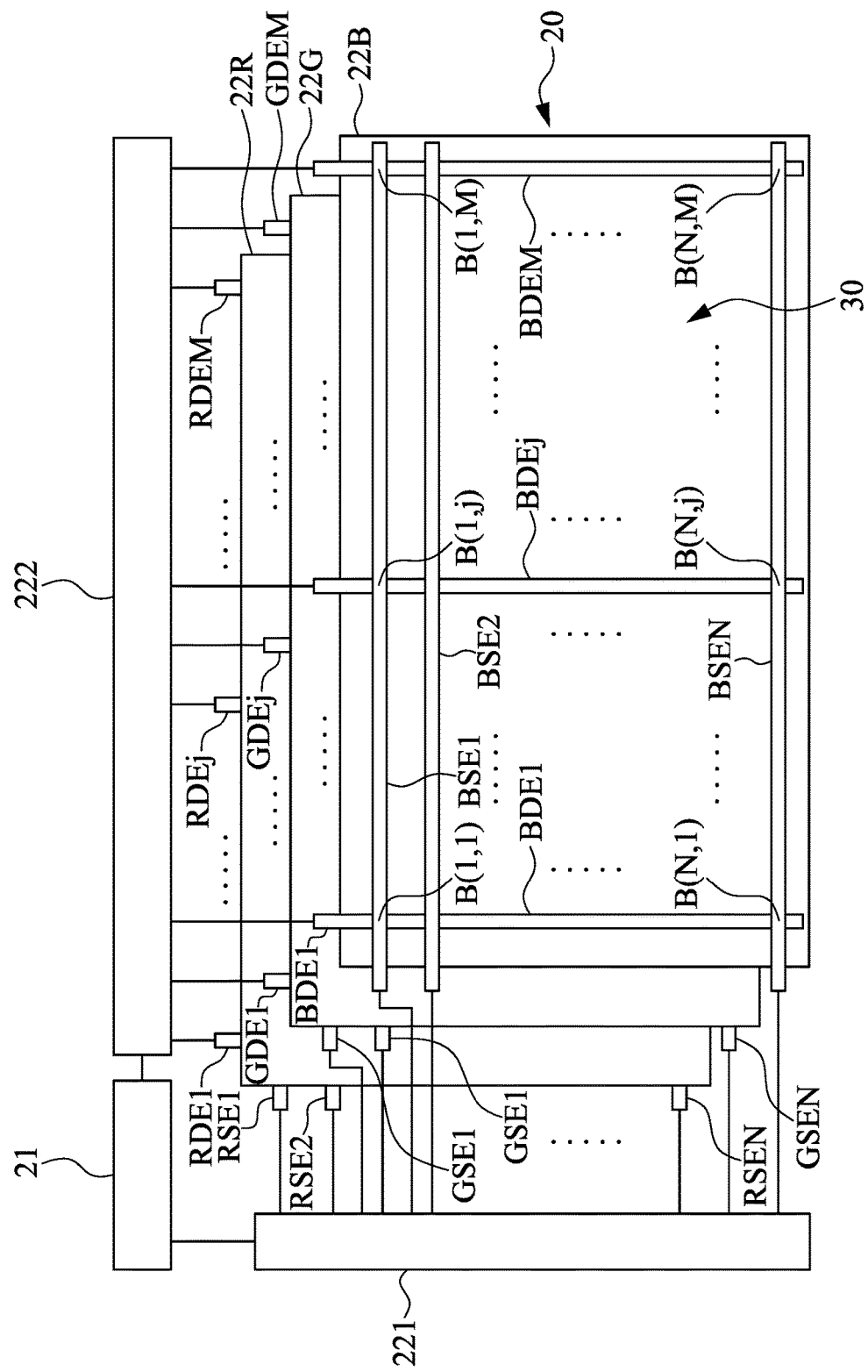
FIG. 2A is a diagram of the display device in accordance with the embodiment of FIG. 1.
Figure 2B:
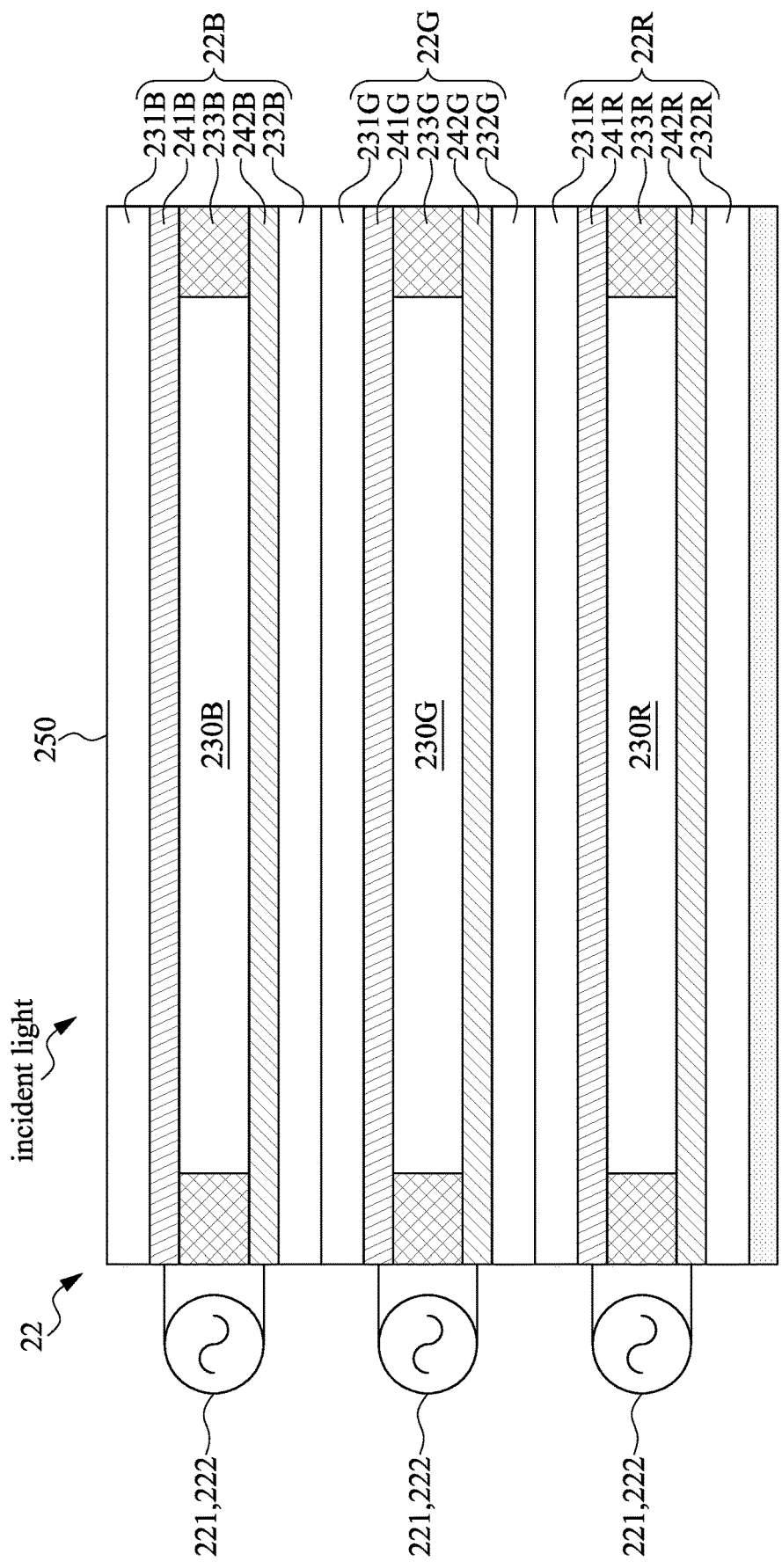
FIG. 2B is a cross section of the display panel in FIG. 2A.

FIG. 2A is a diagram of the display device in accordance with the embodiment of FIG. 1. FIG. 2B is a cross section of the display panel in FIG. 2A.

In some embodiments, the display panel 22 may include a plurality of display units 22B, 22G, and 22R, a scanning electrode driving circuit 221, and a data electrode driving circuit 222, as depicted in FIG. 2A. Additionally, the display units 22B, 22G, and 22R can be stacked to form the display panel, with the display units 22B, 22G, and 22R being the topmost, middle, and bottom display units, respectively, as shown in FIG. 2B. The display units 22B, 22G, and 22R may include pixels that display blue, green, and red colors, respectively, allowing the display panel 22 to render a screen 30 (e.g., a color display screen). The display unit 22B may include scanning electrodes BSE1 to BSEN (e.g., N electrodes along the Y-axis) and data electrodes BDE1 to BDEM (e.g., M electrodes along the X-axis).

In some embodiments, the scanning electrodes BSE1 to BSEN can be referred to as common (COM) electrodes, and the data electrodes BDE1 to BDEM can be referred to as segment (SEG) electrodes. Furthermore, the scanning electrodes BSE1 to BSEN and the data electrodes BDE1 to BDEN intersect in the top view of the display panel 22, as depicted in FIG. 2A.

In some embodiments, a pixel circuit (e.g., a ChLC pixel circuit, not explicitly shown in FIG. 2A) is disposed at each intersection between the scanning electrodes BSE1 to BSEN and data electrodes BDE1 to BDEN within the display unit 22B. This arrangement allows the pixel circuits within the display unit 22B to form a blue pixel array with a resolution of M*N. For example, the pixel circuit located at the intersection between the scanning electrode BSE1 and the data electrode BDE1 within the display unit 22B (e.g., for blue color) can be assigned the coordinates B(1, 1), while the pixel circuit at the intersection between the scanning electrode BSEN and the data electrode BDEj within the display unit 22B can be assigned the coordinates B(N, j), and so on.

Similarly, the display unit 22G may include scanning electrodes GSE1 to GSEN (e.g., N electrodes along the Y-axis) and data electrodes GDE1 to GDEM (e.g., M electrodes along the X-axis). The coordinates for each pixel circuit located at the intersections between the scanning electrodes GSE1 to GSEN and data electrodes GDE1 to GDEM within the display unit 22G can be assigned in a similar manner to those within the display unit 22B.

Similarly, the display unit 22R may include electrodes RSE1 to RSEN (e.g., N electrodes along the Y-axis) and data electrodes RDE1 to RDEM (e.g., M electrodes along the X-axis). The coordinates for each pixel circuit located at the intersections between the scanning electrodes RSE1 to RSEN and data electrodes RDE1 to RDEM within the display unit 22R can be assigned in a similar manner to those within the display unit 22B.

Moreover, the scanning electrodes BSE1 to BSEN, GSE1 to GSEN, and RSE1 to RSEN within the display units 22B, 22G, and 22R may be electrically connected to a scanning electrode driving circuit 221. In some embodiments, when the first row of the display panel 22 is to be activated, the scanning electrode driving circuit 221 may apply a voltage pulse to the scanning electrodes BSE1, GSE1, and RSE1 (e.g., common electrodes) to activate them simultaneously. In other words, the scanning electrodes with the same row number may be activated simultaneously by the scanning electrode driving circuit 221. In some embodiments, the scanning electrode driving circuit 221 and the data electrode driving circuit 222 can be collectively regarded as a driving circuit section.

In some embodiments, the scanning electrode driving circuit 221 is capable of activating one or more rows (i.e., scanning electrodes) of the display panel 22. For example, when two adjacent rows (e.g., rows n and (n+1)) of the display panel 22 are to be activated simultaneously, the scanning electrode driving circuit 221 may apply a first driving voltage to the scanning electrodes BSEn, GSEn, and RSEn at row n simultaneously, and apply a second driving voltage to the scanning electrodes BSE(n+1), GSE(n+1), and RSE(n+1) at row (n+1) simultaneously. It should be noted that the current stages of rows n and (n+1) can be different, resulting in the first driving voltage being different from the second driving voltage.

Referring to FIG. 2B, in some embodiments, the display units 22B, 22G, and 22R may be laminated in this order on a surface (e.g., surface 250) of incident light. The display unit 22B may include a liquid crystal layer 230B, substrates 231B and 232B, layers 241B and 242B, and sealing materials 233B. For example, the liquid crystal layer 230B may be a cholesteric liquid crystal (ChLC) layer which is sealed between the substrates 231B and 232B opposite to each other by the sealing material 233B applied onto the edges of the substrates 231B and 232B. Additionally, the average refractive index n and the helical pitch p of liquid crystal layer 230B are determined such that, for example, the wavelength, is approximately 480 nm. The average refractive index n can be adjusted by selecting a liquid crystal material and a chiral material, and the helical pitch p can be adjusted by adjusting the content of the chiral material. Accordingly, the liquid crystal layer 230B may selectively reflect blue light in a planar state. The layers 241B and 242B may refer to regions on which the scanning electrodes BSE1 to BSEN and data electrodes BDE1 to BDEM within the display unit 22B are disposed, that are electrically connected to the scanning electrode driving circuit 221 and the data electrode driving circuit 222, respectively. Furthermore, in the focal conic state, the liquid crystal molecules within the liquid crystal layer 230B are sequentially rotated in the in-plane direction of the electrodes (e.g., layers 241B and 242B) to form helical structures, and the helical axes of the helical structures are substantially parallel to the electrodes (e.g., layers 241B and 242B). As a result, the selectivity of the liquid crystal layer 230B with respect to a reflection wavelength is lost, and the liquid crystal layer 230B transmits most of incident light. The transmitted light is absorbed by a light absorbing layer 240 whereby dark (black) display is achieved. The light absorbing layer 240 may be provided on the bottom surface of the display unit 22R.

Similarly, the display unit 22G may include a liquid crystal layer 230G, substrates 231G and 232G, layers 241G and 242G, and sealing materials 233G. For example, the liquid crystal layer 230G may be a cholesteric liquid crystal (ChLC) layer which is sealed between the substrates 231G and 232G opposite to each other by the sealing material 233G applied onto the edges of the substrates 231G and 232G. Additionally, the average refractive index n and the helical pitch p of liquid crystal layer 230G are determined such that, for example, the wavelength, is approximately 550 nm, allowing the liquid crystal layer 230G to selectively reflect green light in a planar state. Similarly, although the scanning electrodes (e.g., GSE1 to GSEN) and data electrodes (e.g., GDE1 to GDEM) within the display unit 22G are not explicitly shown in FIGS. 2A-2B, the layers 241G and 242G may refer to regions on which these scanning electrodes GSE1 to GSEN and data electrodes GDE1 to GDEM within the display unit 22G are disposed, that are electrically connected to the scanning electrode driving circuit 221 and the data electrode driving circuit 222, respectively.

Moreover, the display unit 22R may include a liquid crystal layer 230R, substrates 231R and 232R, layers 241R and 242R, and sealing materials 233R. For example, the liquid crystal layer 230R may be a cholesteric liquid crystal (ChLC) layer which is sealed between the substrates 231R and 232R opposite to each other by the sealing material 233R applied onto the edges of the substrates 231R and 232R. Additionally, the average refractive index n and the helical pitch p of liquid crystal layer 230R are determined such that, for example, the wavelength λ is approximately 700 nm, allowing the liquid crystal layer 230R to selectively reflect red light in a planar state. Similarly, although the scanning electrodes (e.g., RSE1 to RSEN) and data electrodes (e.g., RDE1 to RDEM) within the display unit 22R are not explicitly shown in FIGS. 2A-2B, the layers 241R and 242R may refer to regions on which these scanning electrodes RSE1 to RSEN and data electrodes RDE1 to RDEM within the display unit 22R are disposed, that are electrically connected to the scanning electrode driving circuit 221 and the data electrode driving circuit 222, respectively. The operations of the ChLC molecules within the liquid crystal layers 230G and 230R in the planar state and focal conic states may be similar to those within the liquid crystal layer 230B, and thus details thereof are not be repeated here.

In some embodiments, the substrates 231B, 232B, 231G, 232G, 231R, and 232R may be implemented using a transmissive material, such as polycarbonate (PC), glass, polyethylene terephthalate (PET) film, etc., enabling them to transmit light. Additionally, the light absorbing layer 240 can be disposed on a bottom surface of the substrate 232R of the display unit 22R, effectively absorbing any transmitted light on that surface to achieve dark (black) display. It should be noted that the structure of the display panel 22 shown in FIG. 2B is for purposes of description, and it can be adjusted according to practical needs.

In some embodiments, the scanning electrode driving circuit 221 may apply different driving voltage pulses to the activated (or selected) scanning electrode (e.g., COM electrode) during different stages, such as a manipulation stage, a selection stage, and a non-selection stage in the PWM scanning procedure. Additionally, the data electrode driving circuit 222 may apply either a bright-state voltage pulse or a dark-state voltage pulse to the data electrodes (e.g., SEG electrode). Specifically, under the influence of the common voltage from the activated scanning electrodes, the data electrode driving circuit 222 can apply different driving AC voltage pulses on different regions of the activated scanning electrodes within the liquid crystal layers 230B, 230G, and 230R, enabling the pixel circuits on the activated scanning electrode to sense AC voltage pulses (or AC pixel pulses). By applying AC voltage pulses to the pixel circuits on the activate scanning electrode, the scanning electrode driving circuit 221 and the data electrode driving circuit 222 are capable of controlling the arrangement of cholesteric liquid crystal molecules within the liquid crystal layers 230B, 230G, and 230R. Thus, the brightness value of the pixel circuits on the activated scanning electrode within the display units 22B, 22G, and 22R can be adjusted by the scanning electrode driving circuit 221 and the data electrode driving circuit 222 resulting in the display of desired images or texts on the display panel 22. For purposes of description, the operations of the display unit 22B will be described in the following embodiments, and those of the display unit 22G and 22R can be performed in a similar manner.

Example 1: Speeding Stage in the PWM Scanning Procedure

In some embodiments, the PWM scanning procedure may include a speeding stage, a selection stage, and a non-selection stage, with the speeding stage being an additional stage compared with the conventional PWM scanning procedure. For example, a reset stage can be performed to clear the screen 30 before writing or updating the screen 30 displayed on the display panel 22 using the PWM scanning procedure. Specifically, the driving circuit 21 may control the scanning electrode driving circuit 221 and the data electrode driving circuit 222 to apply a high voltage (e.g., a first voltage), such as a high AC voltage difference between scanning electrodes and data electrodes, to the display units 22B, 22G, and 22R to set the ChLC molecules within the liquid crystal layers 230B, 230G, and 230R to enter the homeotropic state simultaneously, resulting in the screen 30 to be reset to a black screen or a grayscale screen with uniform grayscale values.

Additionally, during the selection stage, the driving circuit 21 may control the scanning electrode driving circuit 221 and the data electrode driving circuit 222 to apply an intermediate high voltage (e.g., a second voltage) to the display units 22B, 22G, and 22R, allowing the driving circuit 21 to control the brightness of each pixel (e.g., pixel circuit) within the liquid crystal layers 230B, 230G, and 230R. Here, the second voltage is lower than the first voltage. For example, the second voltage (i.e., voltage amplitude) may be between 18V and 48V, but the present disclosure is not limited thereto. Furthermore, during the non-selection stage, the driving circuit 21 may control the scanning electrode driving circuit 221 and the data electrode driving circuit 222 to apply a low voltage (e.g., a third voltage) to the display units 22B, 22G, and 22R, resulting in the state of the ChLC molecules within the liquid crystal layers 230B, 230G, and 230R being unchanged. Here, the amplitude of the third voltage is lower than that of the second voltage. In some embodiments, the third voltage may range between approximately 7V and −7V. In other words, the amplitude of the third voltage may be approximately 7V, but the present disclosure is not limited thereto.

In some embodiments, the speeding stage within the proposed PWM scanning mode may be a disturbing high-voltage stage that can be performed before or after then selection stage. For example, during the speeding stage, the driving circuit 21 may control the scanning electrode driving circuit 221 and the data electrode driving circuit 222 to apply a high voltage (e.g., a fourth voltage) to the display units 22B, 22G, and 22R, resulting in the kinetic energy of the ChLC molecules within the liquid crystal layers 230B, 230G, and 230R being increased to the level required by the homeotropic state, in which the ChLC molecules may have the highest kinetic energy.

In some embodiments, the fourth voltage may range between +/−30V and +/−48V. In other words, the amplitude of the fourth voltage is between approximately 30V and 48V, which is close to that required by the homeotropic state. The amplitude of the fourth voltage may be dependent on a variety of driving parameters, which include, but are not limited to, durations of driving AC voltage pulses, temperature and viscosity of the ChLC molecules, driving capability of the driving circuit section, a pitch of ChLC helical structures, etc. In some embodiments, when the duration of the driving voltage pulse is longer, the required voltage for the homeotropic state is lower. During the speeding stage, a high AC voltage pulse can be applied to the ChLC molecules repeatedly to accelerate the scanning procedure, thereby reducing the time required for updating the screen 30 of the display panel 22.

In some embodiments, when programming or writing the pixel circuits on each scanning electrode, the pixel circuits on each scanning electrode may experience the speeding stage, selection stage, and non-selection stage, and the order of these stages can be altered.

It should be noted that the first to fourth voltages described may be alternating-current (AC) voltages. For brevity, when it is described that the first voltage is higher than the second voltage, it indicates that the amplitude of the first voltage is higher than that of the second voltage unless particularly specified.

Example 2: Manipulation Stage in the PWM Scanning Procedure

In some embodiments, the PWM scanning procedure may include a manipulation stage, a speeding stage, a selection stage, and a non-selection stage, with the manipulation stage and the speeding stage being additional stages compared with the conventional PWM scanning procedure. It should be noted that the speeding stage is similar to that described in Example 1.

Figure 12A:
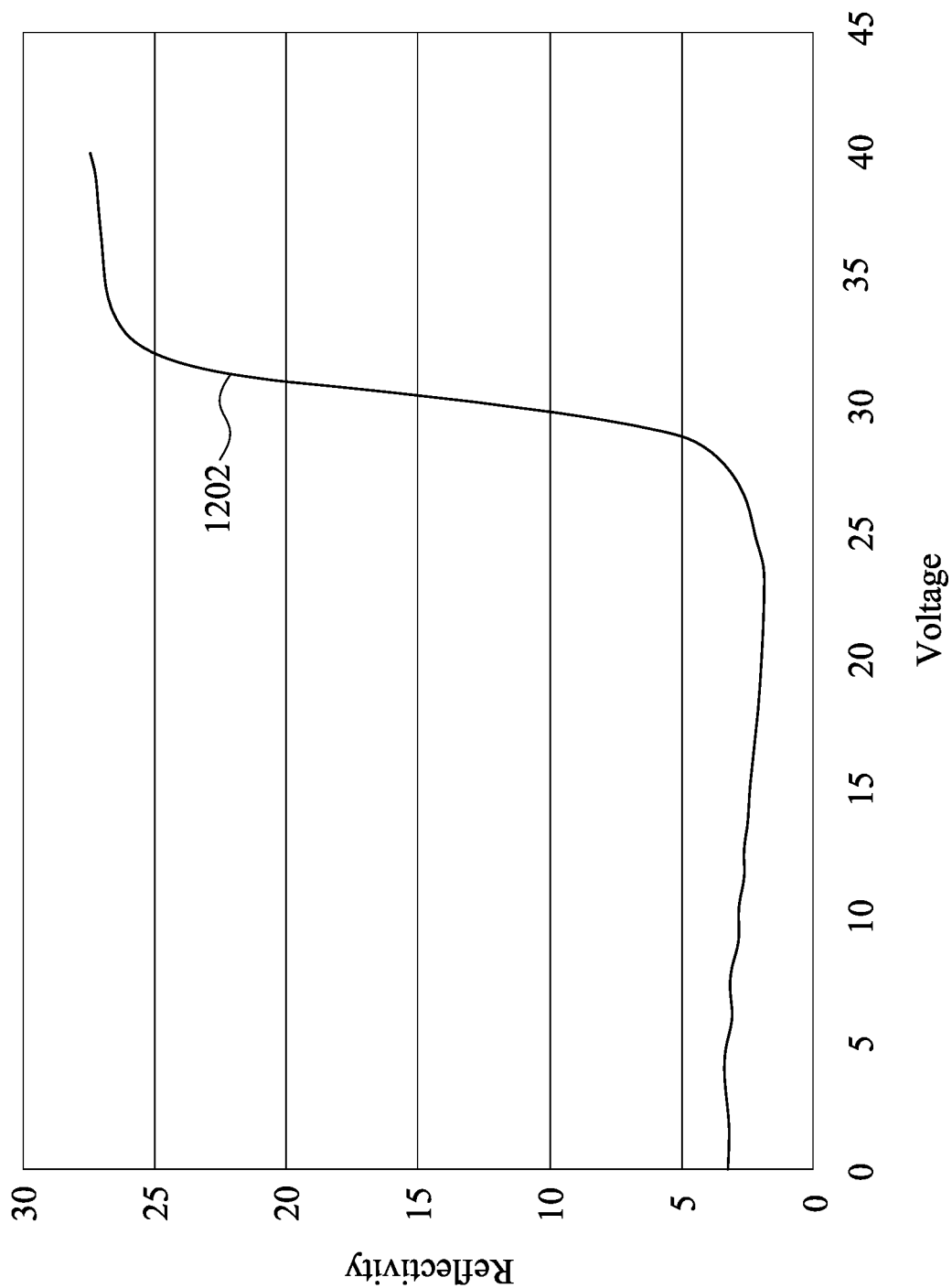
FIGS. 12A and 12B are diagrams illustrating single RV curves corresponding to a dark-state voltage pulse and a bright-state voltage pulse.
Figure 12B:
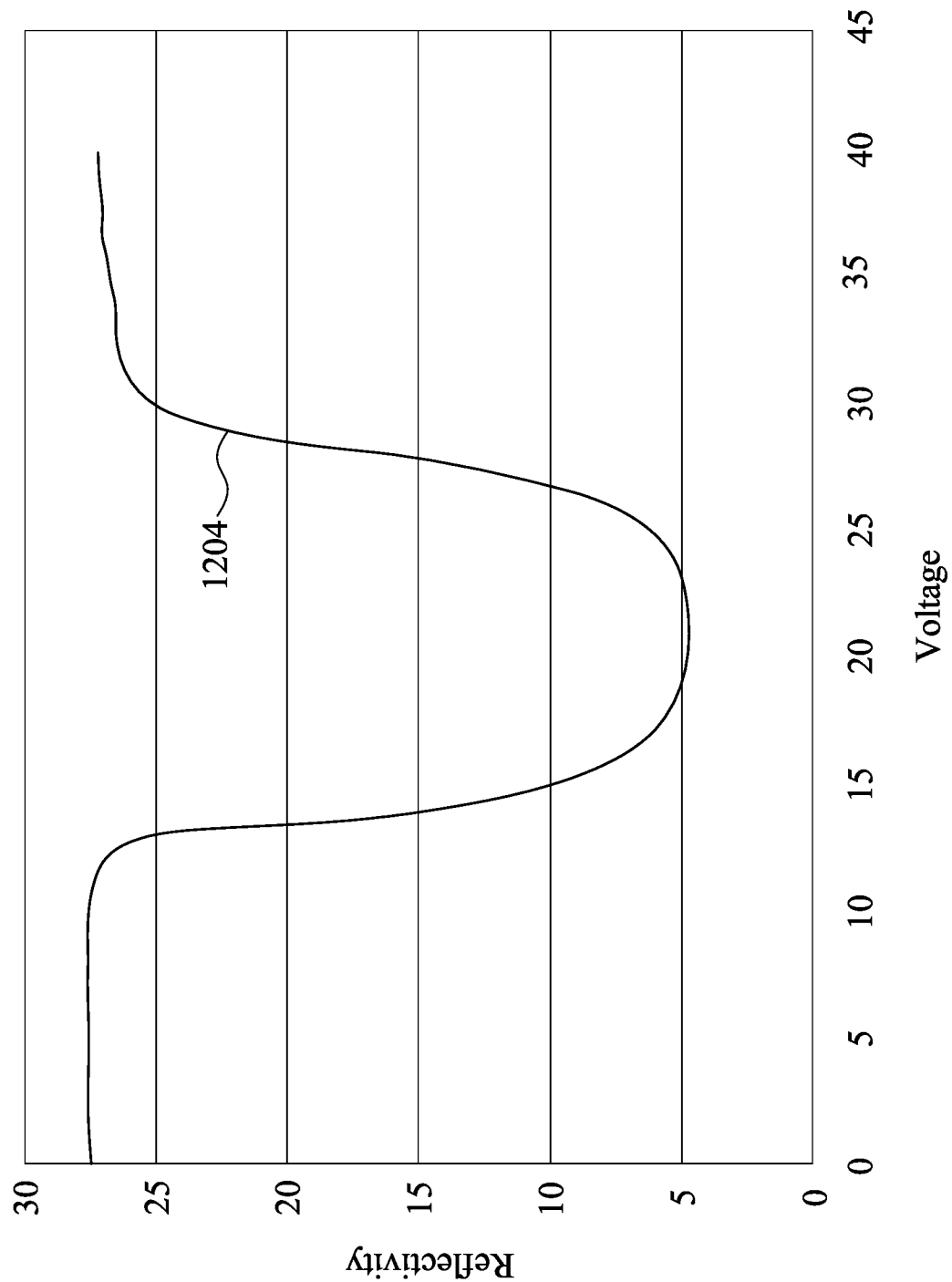

It should be noted that during the selection stage in the conventional PWM scanning procedure, a respective voltage is applied to each data electrodes (e.g., BDE1 to BDEM) for the scanning operation of each activated scanning electrode, allowing only one scanning electrode to intersect each data electrodes. As a result, the RV curve for each pixel circuit on the activated scanning electrode may be a single RV curve, as shown by either curve 1202 in FIG. 12A or curve 1204 in FIG. 12B.

Figure 11A:
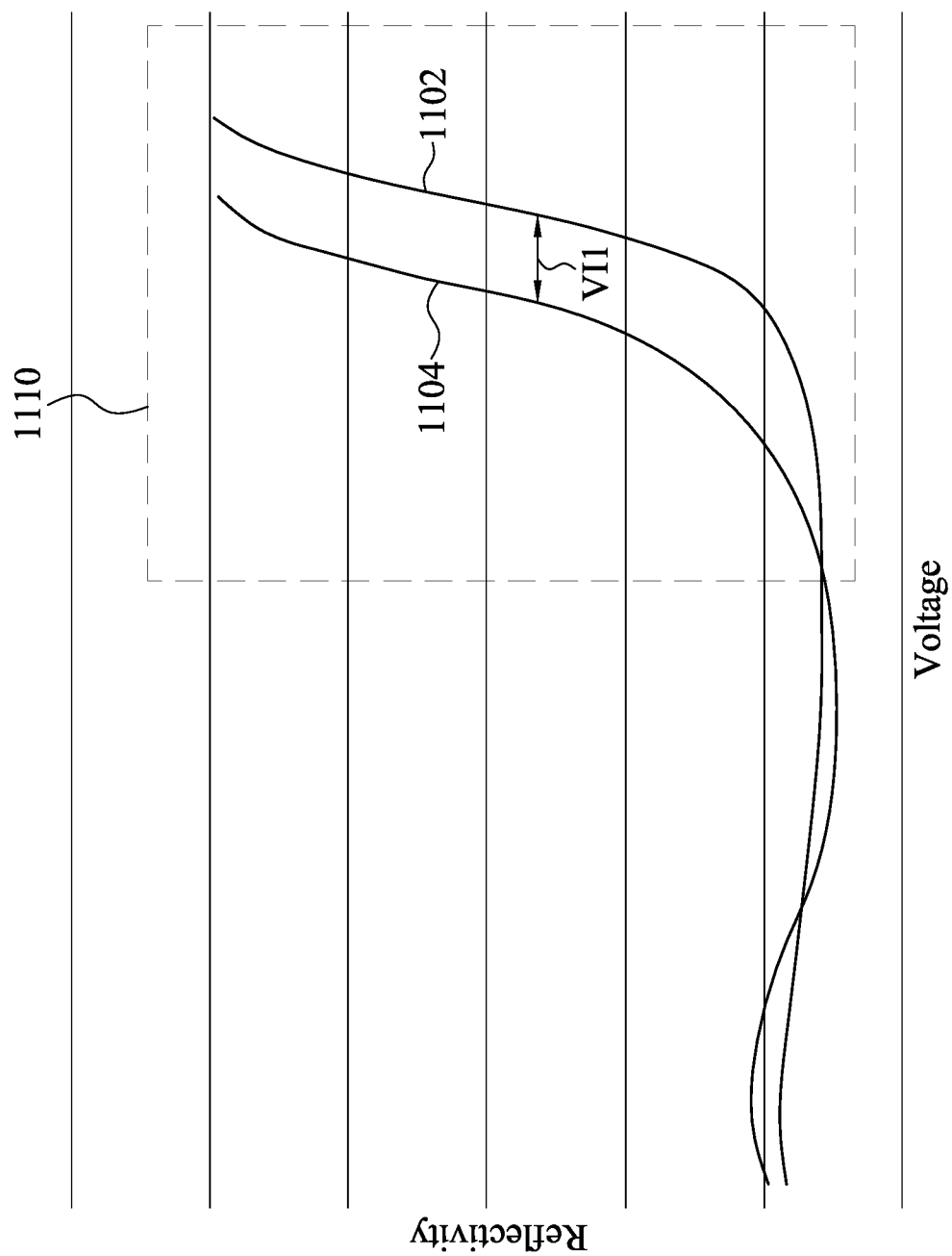
FIGS. 11A and 11B are diagrams illustrating RV curves corresponding to a dark-state voltage pulse and a bright-state voltage pulse in accordance with some embodiments of the present disclosure.

In some embodiments, the RV curve of the pixel circuits on the currently activated scanning electrode (e.g., row n) may be affected by the AC voltage pulses applied to the pixel circuits on one or more neighboring scanning electrode previously activated (e.g., rows (n−1) and (n−2)). When applying a bright-state voltage and a dark-state voltage respectively to the pixel circuits on the scanning electrodes at row (n−1) and row (n−2), the pixel circuits on the currently activated scanning electrode (e.g., row n) may have a first RV (reflectivity versus voltage, where the voltage herein refers to the absolute voltage difference or voltage amplitude) curve and a second RV curve, as shown by curve 1104 and curve 1102 in FIG. 11A, respectively. Additionally, a voltage interval VI1 can be determined using curves 1102 and 1104 within region 1110. The brightness (e.g., grayscale value) of the pixel circuits on the currently activated scanning electrode can be adjusted by applying an appropriate voltage, which is selected from the voltage interval VI1, to the data electrodes BDE1 to BDEM during the manipulation stage. The most appropriate voltage interval for each display unit 22B, 22G, and 22R within the display panel 22 can be found by adjusting a variety of driving parameters during the manipulation stage. The driving parameters may include, but are not limited to duration (or period) of driving AC voltage pulses, temperature and viscosity of the ChLC molecules, driving capability of the driving circuit section, pitches between a pitch of ChLC helical structures, etc.

In some embodiments, the voltage interval VI1 can be determined using more than two RV curves corresponding to different AC voltage pulses applied to the pixel circuits on the activated scanning electrodes BSE1 to BSEN. For example, the voltage interval VI1 can be obtained using four RV curves corresponding to four different voltages (e.g., applying different AC voltages to the pixels on four previous scanning electrodes at rows (n−1) to (n−4)). The specific range of these four different voltages may vary depending on the characteristics of the ChLC molecules. It should be noted that the manipulation stage described in Example 2 can work together with the speeding stage in Example 1, enabling the proposed PWM scanning procedure to expedite the scanning procedure of the display panel 22. This can be achieved by utilizing the voltage interval derived from multiple RV curves to generate the corresponding grayscale image.

Figure 11B:
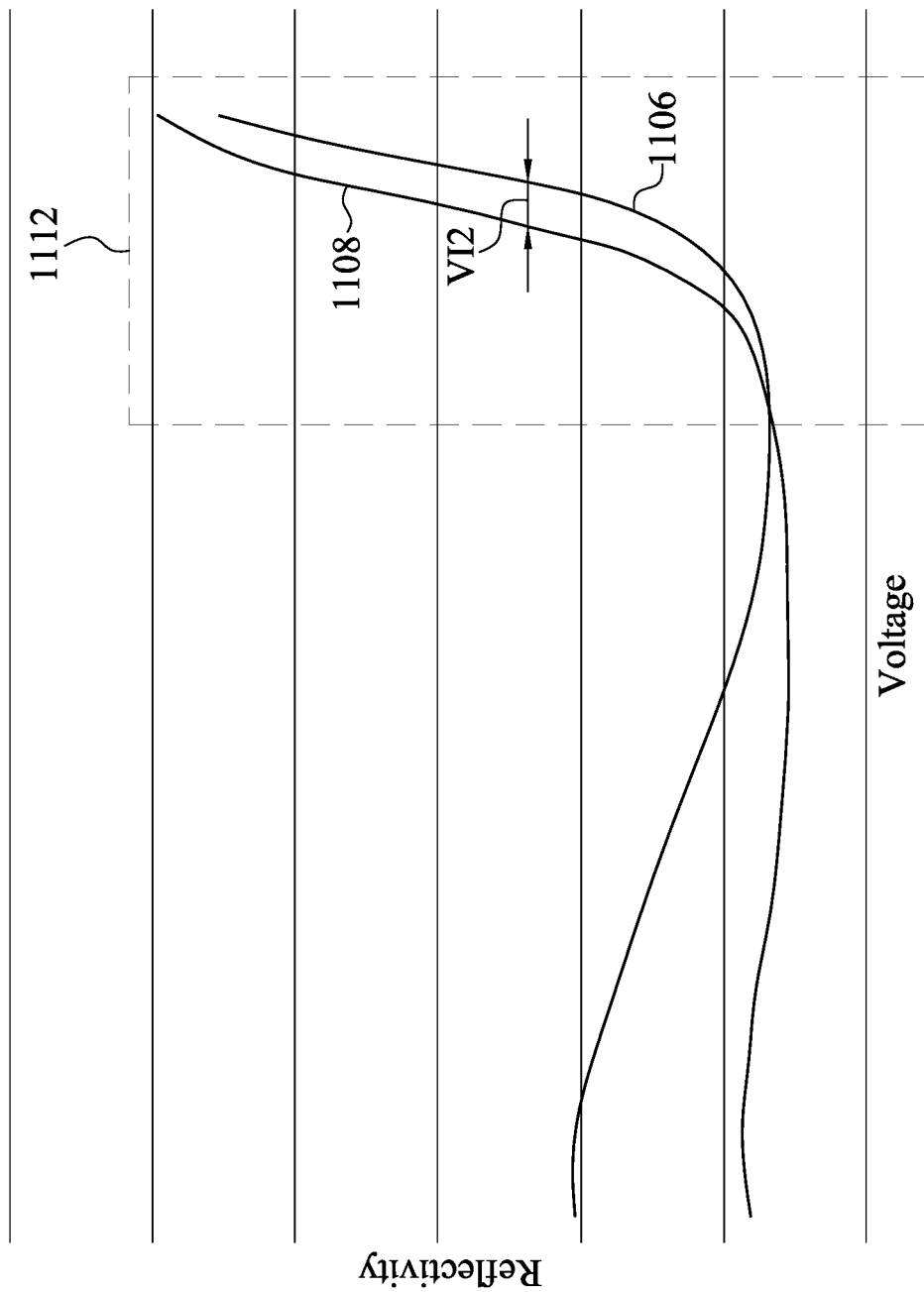

In some embodiments, the manipulation stage is not limited to a single waveform and voltage. It can incorporate multiple waveforms and voltages, as well as different frequencies (or different periods, where the period is the inverse of the frequency), to adjust the voltage interval derived from multiple RV curves. For example, AC waveform 1 with voltage amplitude 1 and frequency 1 can be used for driving during the manipulation stage. Additionally, AC waveform 2 with voltage amplitude 2 and frequency 2 can be used in the manipulation stage in conjunction with the selection stage for driving. The modulation of voltage amplitude, waveform, or frequency (or period) modulation is primarily utilized to adjust the size and position of the voltage interval derived from the RV curves. By applying the proposed method, curves 1102 and 1104 depicted in FIG. 11A can be adjusted to yield curves 1108 and 1106 shown in FIG. 11B, respectively. It should be noted that the voltage interval VI2 shown in region 1112 of FIG. 11B is shorter than the voltage interval VI1 shown in FIG. 11A, suggesting that the utilization of curves 1106 and 1108 may lead to improved image quality.

In some embodiments, the manipulation stage may include an operation region, a sleep region, and a half-influence region, which can be defined using different voltage ranges. For example, the voltage amplitude (i.e., the voltage difference between the activated scanning electrode and the data electrode) of the AC voltage pulse within the operation region may exceed 28V (but is lower than the upper limit of 48V) at the temperature of approximately 20° C. to 30° C., indicating that the AC voltage pulse within the operation region being higher than +28V and lower than −28V. Additionally, the voltage amplitude of the AC voltage pulse within the sleep region may be lower than 18V at the temperature of approximately 20° C. to 30° C., indicating that the voltage of the operation sleep region is between approximately −18V and +18V. In an embodiment, the voltage amplitude of the AC voltage pulse within the half-influence region may be between approximately 14V and 32V at the temperature of approximately 20° C. to 30° C., depending on the practical needs and characteristics of the ChLC molecules. In another embodiment, the voltage amplitude of the AC voltage pulse within the half-influence region may be between approximately 18V and 28V at the temperature of approximately 20° C. to 30° C.

In some embodiments, the manipulation stage can be categorized into two different types. The first type includes the operation region and the sleep region. The operation region can be divided into multiple operation sub-regions, with the total duration of the operation region being equal to the combined duration of the operation sub-regions. Additionally, the sleep region can also be divided into multiple sleep sub-regions, with the total duration of the sleep region being equal to the combined duration of the sleep sub-regions. The second type includes the half-influence region. These two different types of the manipulation stage can be employed in a specific sequence during the scanning procedure for each scanning electrode. Further details regarding this scanning procedure will be provided later.

In some embodiments, applying a high AC voltage pulse to the pixel circuits on the activated scanning electrode during the selection stage results in higher brightness values, leading to a bright screen. Conversely, applying a low AC voltage pulse to the pixel circuits on the activated scanning electrode during the selection stage results in lower brightness values, leading to a dark screen. In some embodiments, the ratio between the duration of the operation region within a single manipulation stage and the duration of the selection stage may be less than a predetermined value. In a preferred embodiment, the predetermined value is set at 0.6 to optimize image quality by adjusting the size and position of the voltage interval derived from the RV curves.

In some embodiments, in the operation region of the manipulation stage, a first voltage amplitude of a first voltage difference between the bright-state voltage (e.g., an AC voltage pulse) and the common voltage (e.g., another AC voltage pulse) may be equal to a second voltage amplitude of a second voltage difference between the dark-state voltage and the common voltage. Alternatively, in the operation region of the manipulation stage, the first voltage amplitude may be different from the second voltage amplitude. In some embodiments, the durations of the first voltage amplitude and second voltage amplitude in the operation region within the manipulation stage may be equal. Alternatively, the durations of the first voltage amplitude and second voltage amplitude in the operation region of the manipulation stage may be different.

In some embodiments, the ratio between the duration of the sleep region within a single manipulation stage and the duration of the selection stage may be higher than a predetermined value. In a preferred embodiment, the predetermined value is set at 0.4 to optimize image quality by adjusting the size and position of the voltage interval derived from the RV curves.

In some embodiments, the area (e.g., integral) of the dark-state voltage over time is greater than or equal to compared to the area of the bright-state voltage over time in the sleep region during the manipulation stage. Additionally, during the selection stage, the area of the bright-state voltage over time may be greater than the area of the dark-state voltage over time.

In some embodiments, the bright-state voltage sensed by the pixel circuits on the activated scanning electrode in the sleep region of the manipulation stage can be zero or close to zero, indicating that the brightness values of these pixel circuits will not be affected. Meanwhile, the bright-state voltage sensed by the pixel circuits on the activated scanning electrode is higher than the dark-state voltage sensed by these pixel circuits during the selection stage.

In some embodiments, the manipulation stage with the half-influence region can be used to drive the pixel circuits on the activated scanning electrode, and the number repeated manipulation stages may be less than a predetermined number. Specifically, the half-influence region may extend the duration of the operation region to enhance the driving effect. If the duration of the half-influence region is too long, it may result in non-uniform image quality. In a preferred embodiment, the selection stage includes one scan (e.g., one full AC voltage swing), and the maximum of repeated manipulation stages is 7, indicating that the predetermined number is 7 (e.g., 7 consecutive manipulation stages at maximum) to optimize image quality by adjusting the size and position of the voltage interval derived from the RV curves.

As described in the aforementioned embodiments, the voltage ranges of the operation region, sleep region, and half-influence region can be different. In some embodiment, the second best voltage interval can be derived from the RV curves when a portion of the voltage range is within the half-influence region (e.g., the dark-state voltage for a dark screen is within the sleep region, and the bright-state voltage for a bright screen is within the half-influence region) or when a portion of the voltage range is within the half-influence region and another portion is within the operation region.

In some embodiments, the speeding stage may be arranged between the selection stage and the manipulation stage, indicating that the speeding stage and the operation region of the manipulation stage are prior to the selection stage. Additionally, different high voltages are used in the speeding stage and the operation region of the manipulation stage. In some embodiments, the ratio between the duration of the speeding stage and the duration of the selection stage is greater than 0.6 and less than or equal to 1. Additionally, the number of repeated speeding stage is less than or equal to 4 (i.e., one to four consecutive speeding stages) to yield a better image quality.

In some embodiments, the voltage difference sensed by the pixel circuits on the activated scanning electrode may be zero or close to zero while displaying a white screen during the speeding stage. Moreover, the proposed PWM scanning procedure encompasses various combinations and/or order of the manipulation stage, speeding stage, and selection stage, which will be further elaborated in subsequent sections with references to FIGS. 3 to 10.

Case 1: One $1^{st}$ Type Manipulation Stage Plus the Selection Stage

FIGS. 3A to 3D are waveform diagrams illustrating the driving voltage applied to the pixel circuits over time in accordance with an embodiment of the present disclosure.

In some embodiments, the PWM scanning procedure of each activated scanning electrode may include stages 310 and 320 arranged in sequence. Stage 310 may refer to the manipulation stage including an operation region 311 and a sleep region 312 regions 311 and 312 (including sub-regions 312A and 312B) which refer to an operation region and a sleep region. Stage 320 may refer to the selection stage. For clarity, curves 302, 304, and 306, that respectively illustrate the dark-state voltage, bright-state voltage, and gray-state voltage applied to the pixel circuit on the activated scanning electrode over time, are separately shown in FIGS. 3A, 3B, and 3C, respectively. Additionally, curves 302, 304, and 306 are collectively shown in FIG. 3D for reference. It should be noted that the non-selection stage following the last stage (e.g., stage 320) in the PWM scanning procedure is not explicitly shown in FIGS. 3A to 3D. This also applies to FIGS. 4 to 10 and FIG. 15.

Figure 3A:
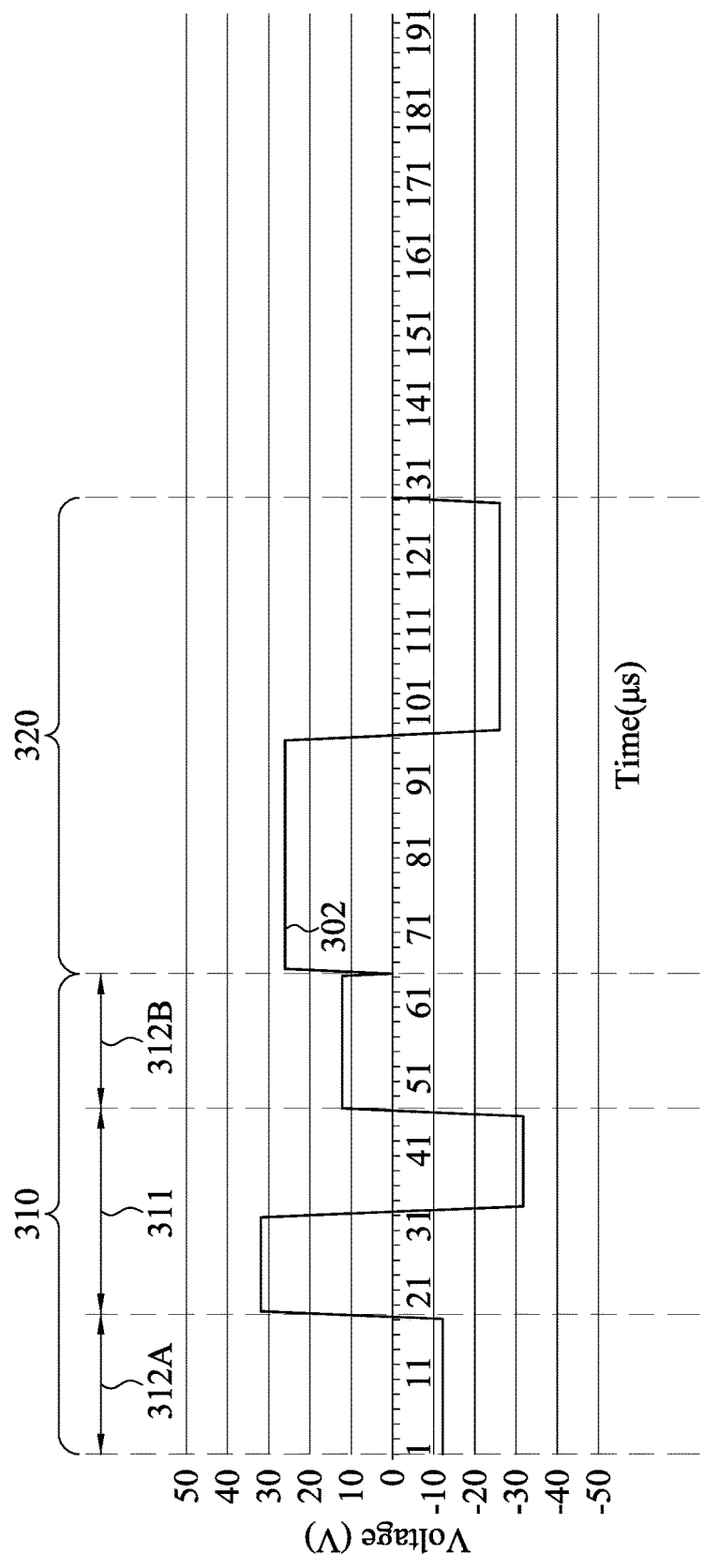
FIGS. 3A to 3D are waveform diagrams illustrating the driving voltage applied to the pixel circuits over time in accordance with an embodiment of the present disclosure.

For example, referring to FIG. 3A, the amplitudes of the dark-state voltage sensed by the pixel circuit on the activated scanning electrode in operation region 311 and sleep region 312 (including sub-regions 312A and 312B) in stage 310 (e.g., manipulation stage) are approximately 32.4V and 12.2V, respectively. Additionally, the amplitude of the dark-state voltage sensed by the pixel circuit on the activated scanning electrode in stage 320 (e.g., selection stage) is approximately 26.4V. It should be noted that the ratio between the duration of operation region 311 (e.g., operation region) and the duration of stage 320 (e.g., selection stage)

is approximately 0.5, while the ratio between the duration of sleep region 312 (e.g., sleep region) and the duration of stage 320 is also approximately 0.5.

Figure 3B:
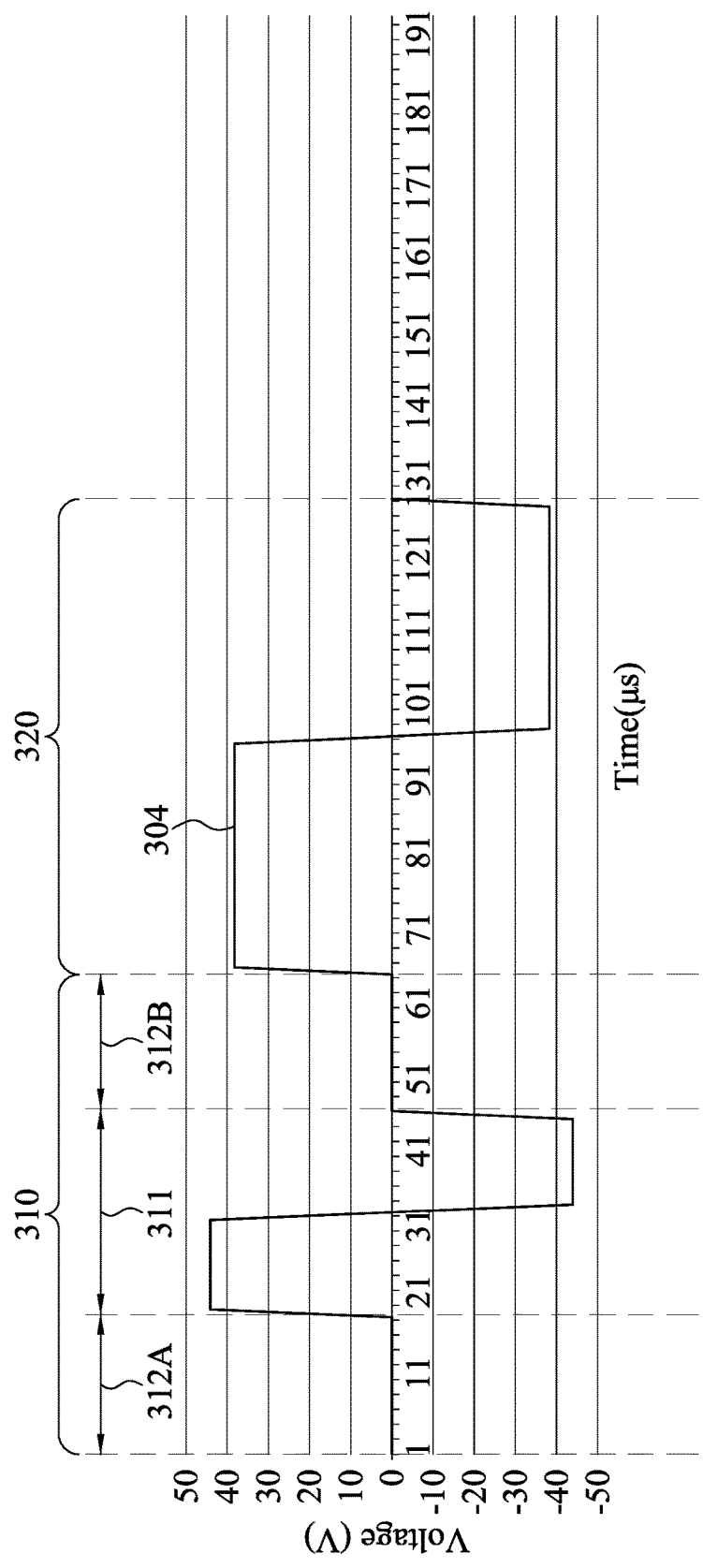

Referring to FIG. 3B, the amplitudes of the bright-state voltages sensed by the pixel circuit on the activated scanning electrode in operation region 311 and sleep region 312 (including sub-regions 312A and 312B) in stage 310 are approximately 44.4V and 0V, respectively. Additionally, the amplitude of the bright-state voltage sensed by the pixel circuit on the activated scanning electrode in stage 320 (e.g., selection stage) is approximately 38.4V.

Figure 3C:
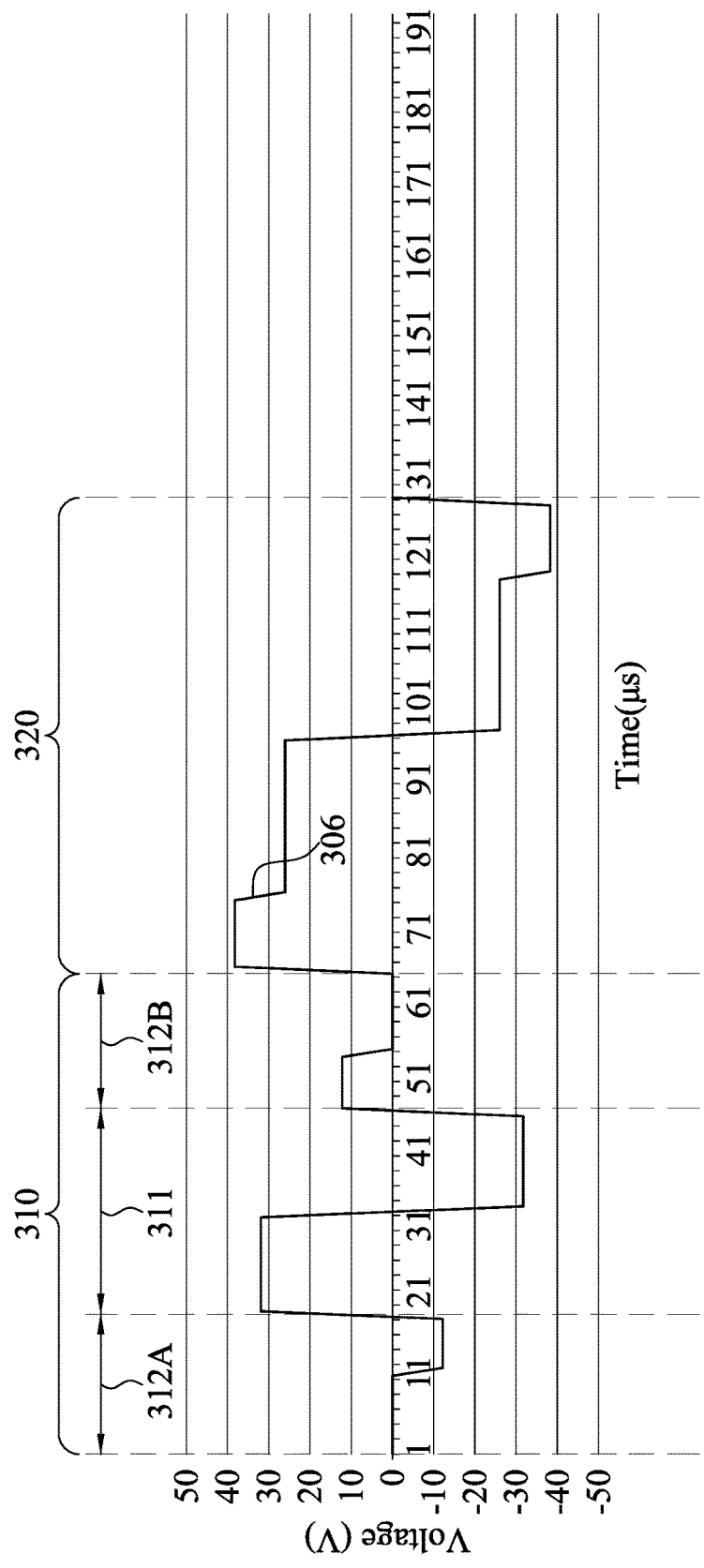
Figure 3D:
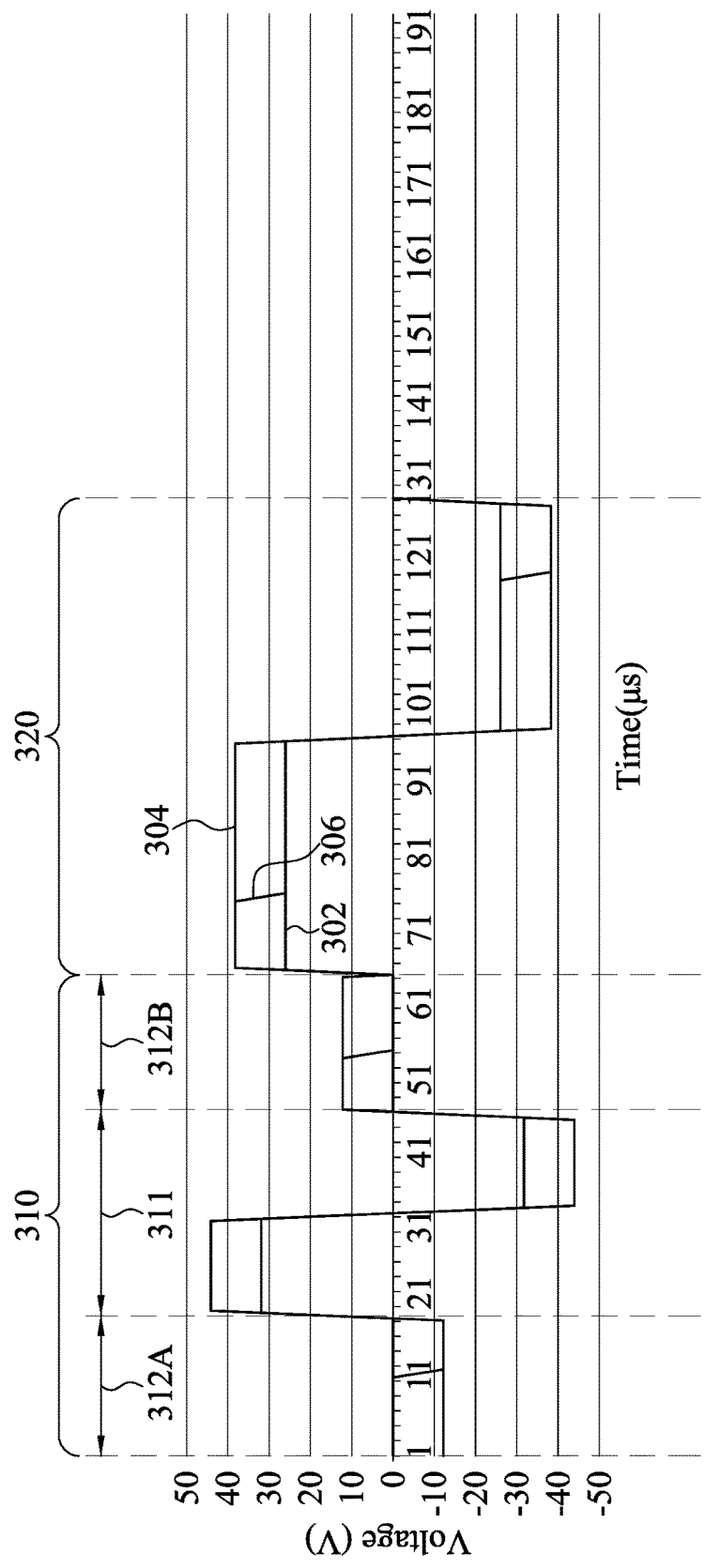
Figure 4A:
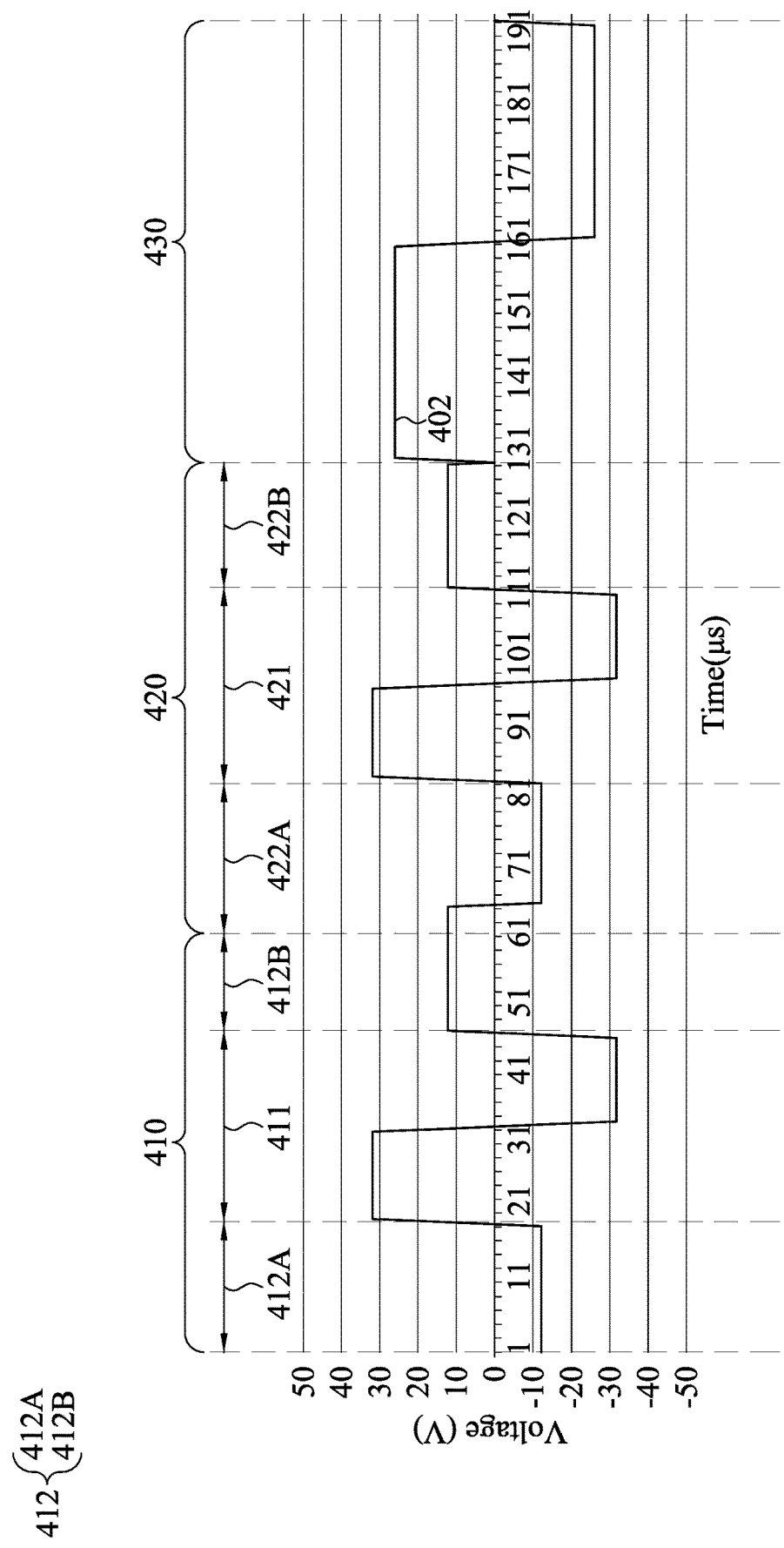
FIGS. 4A to 4D are waveform diagrams illustrating the driving voltage applied to the pixel circuits over time in accordance with another embodiment of the present disclosure.
Figure 4B:
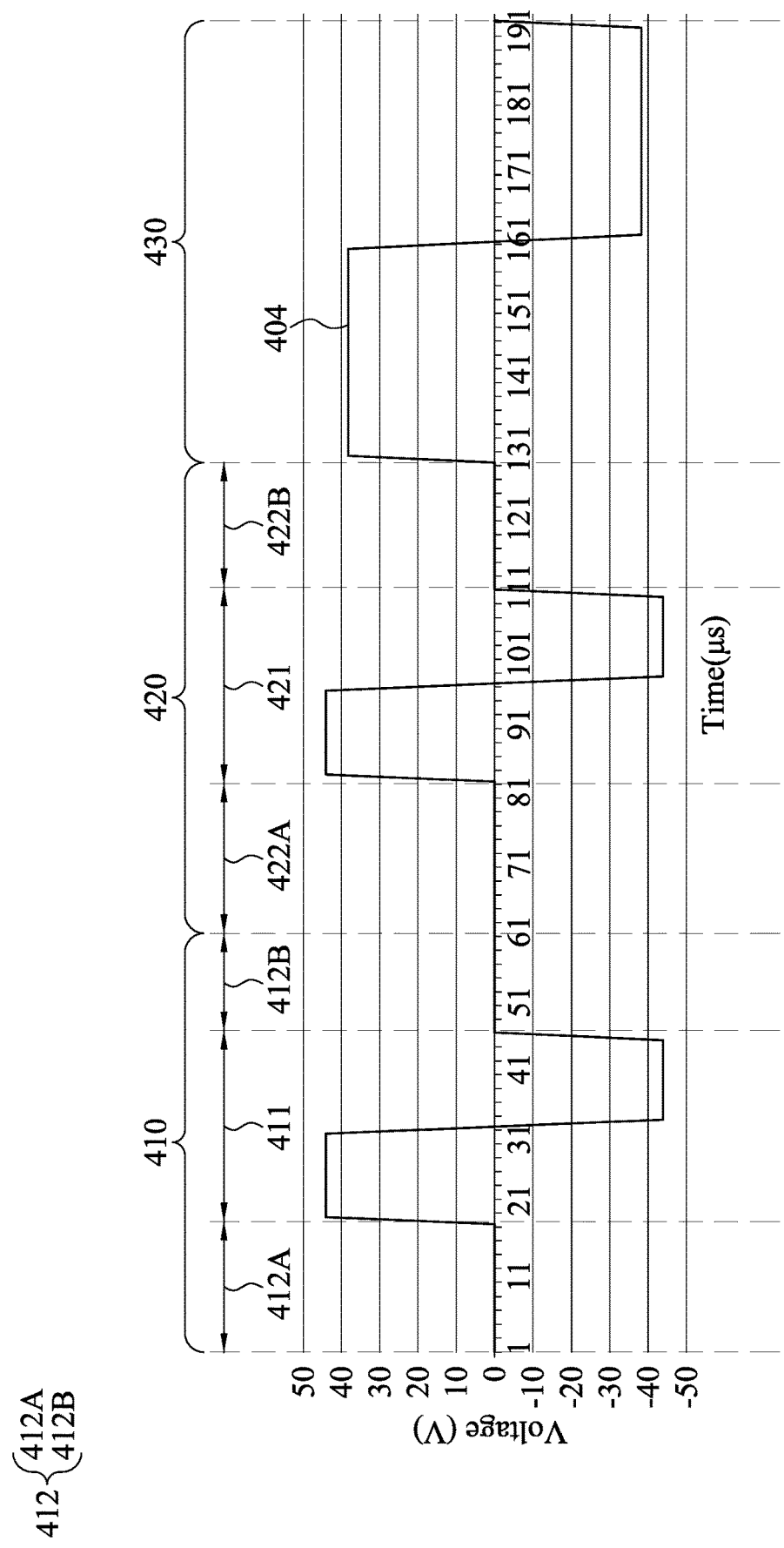
Figure 4C:
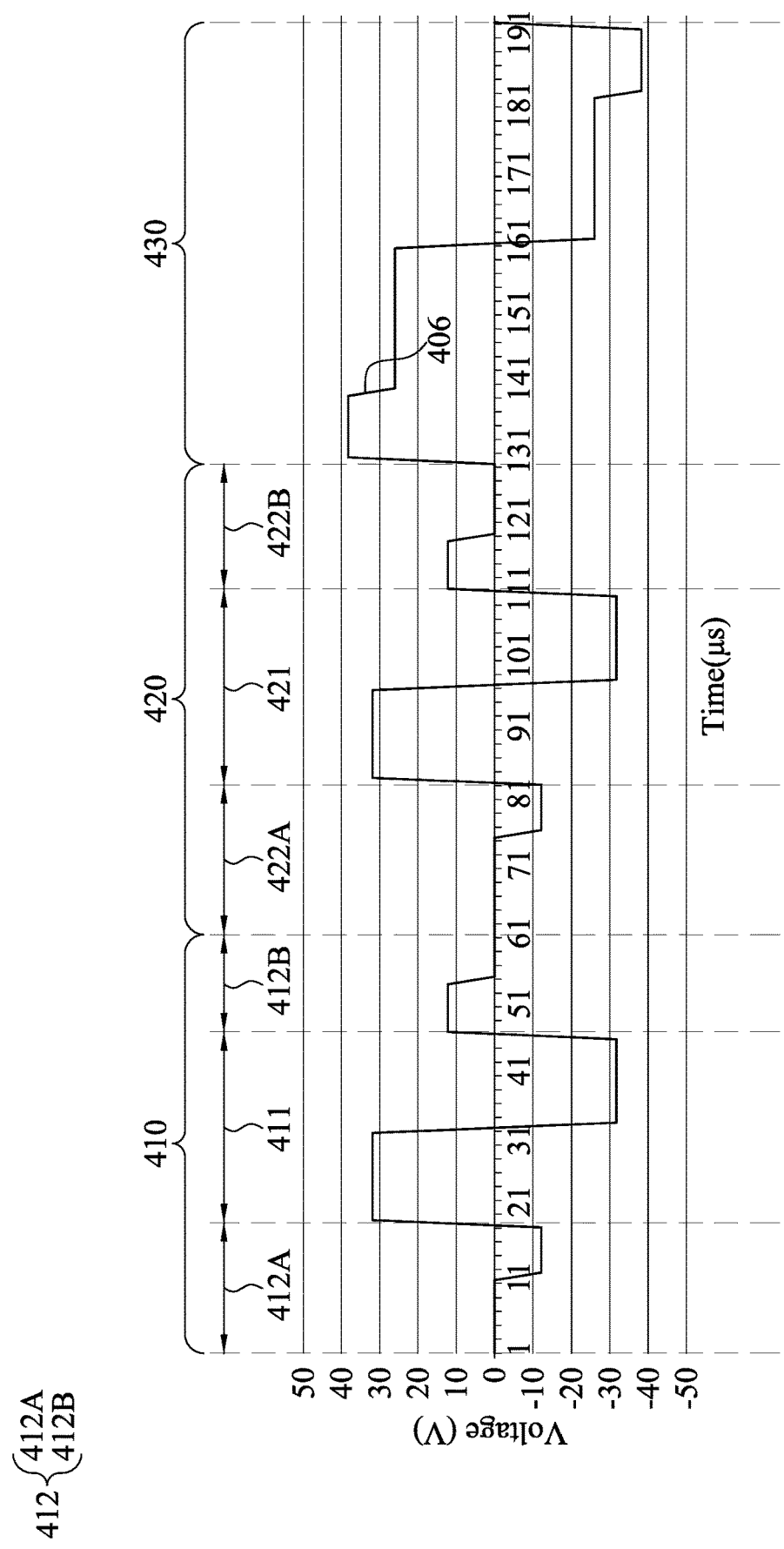
Figure 4D:
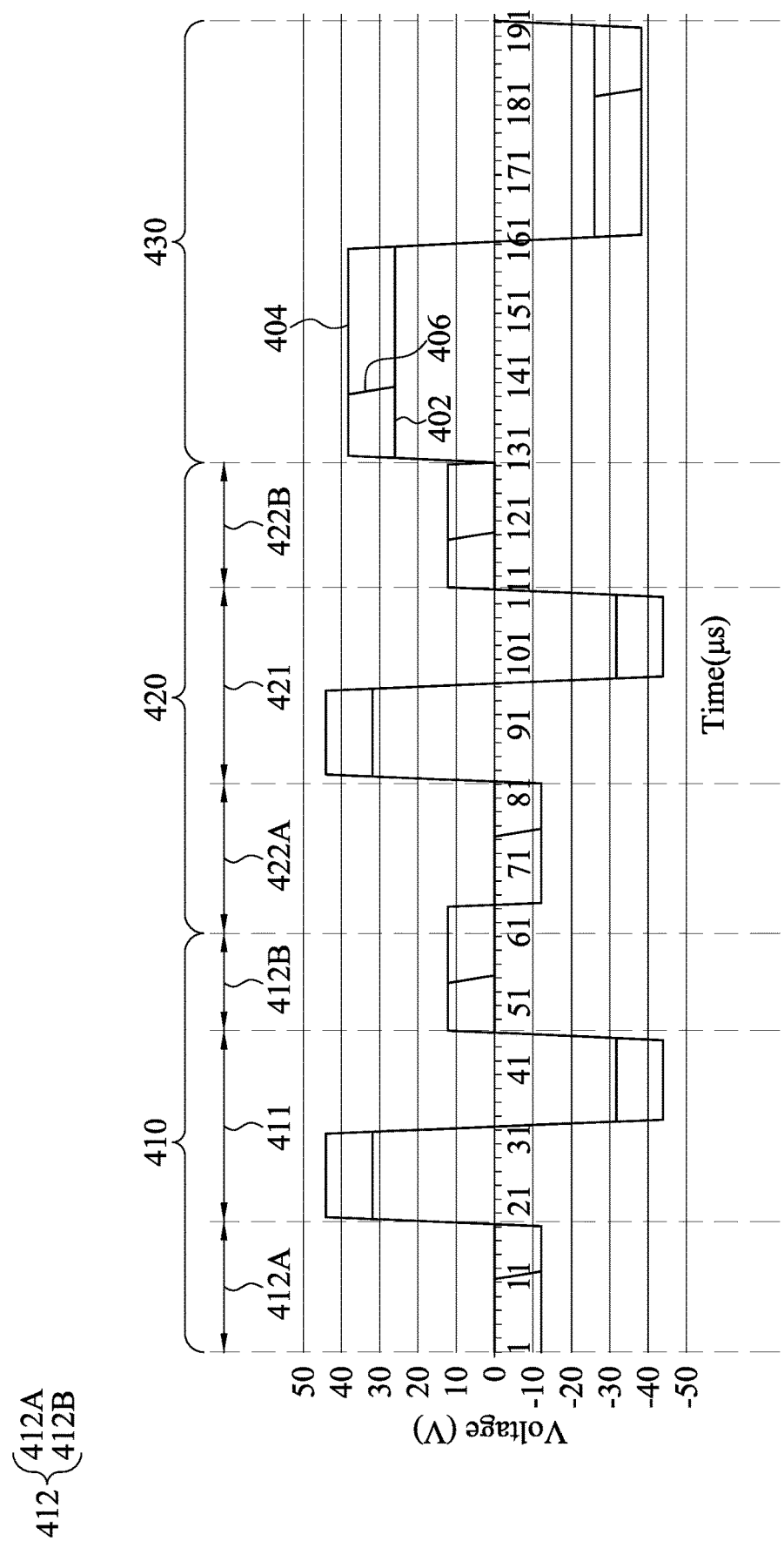
Figure 5A:
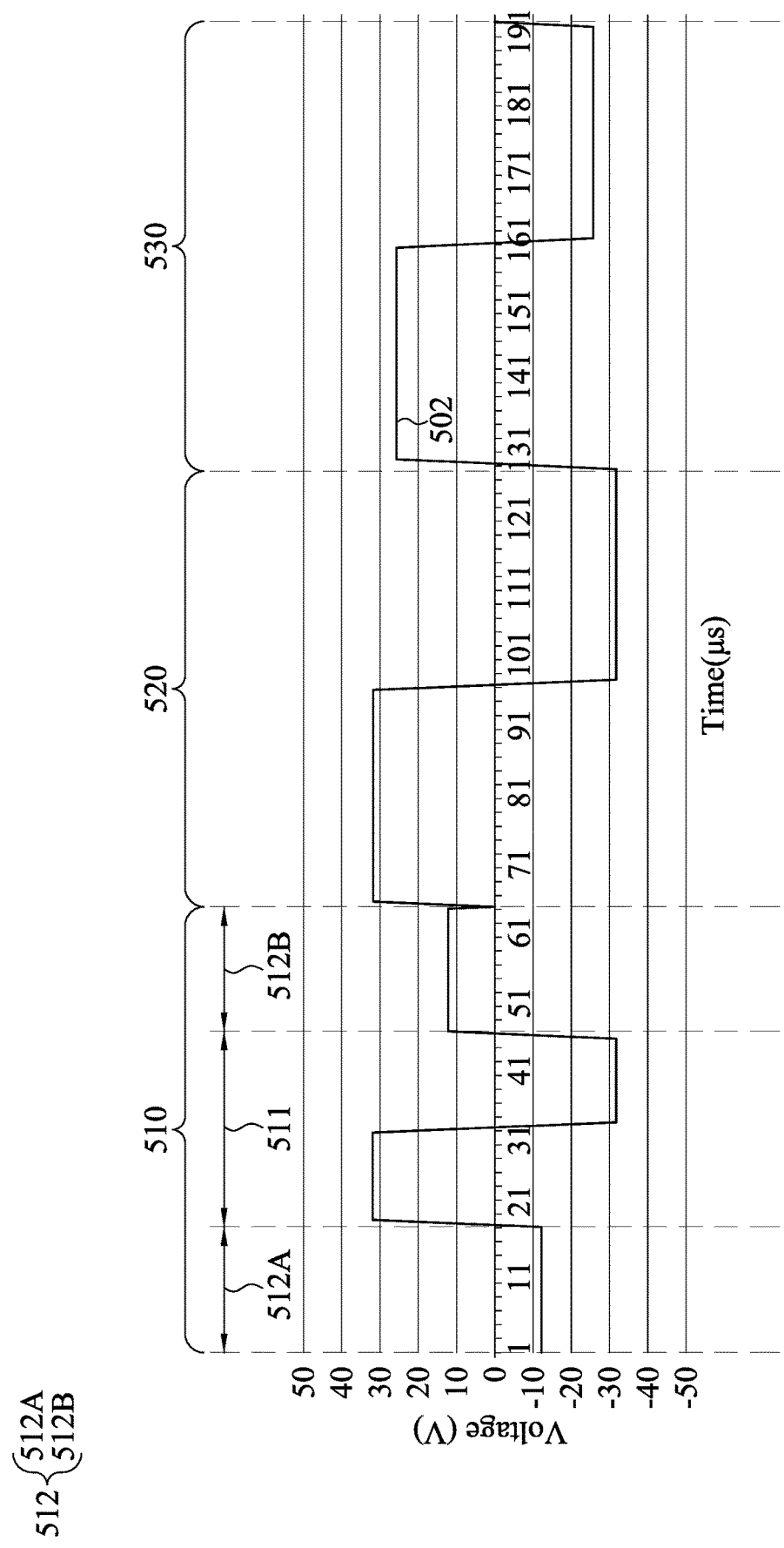
FIGS. 5A to 5D are waveform diagrams illustrating the driving voltage applied to the pixel circuits over time in accordance with yet another embodiment of the present disclosure.
Figure 5B:
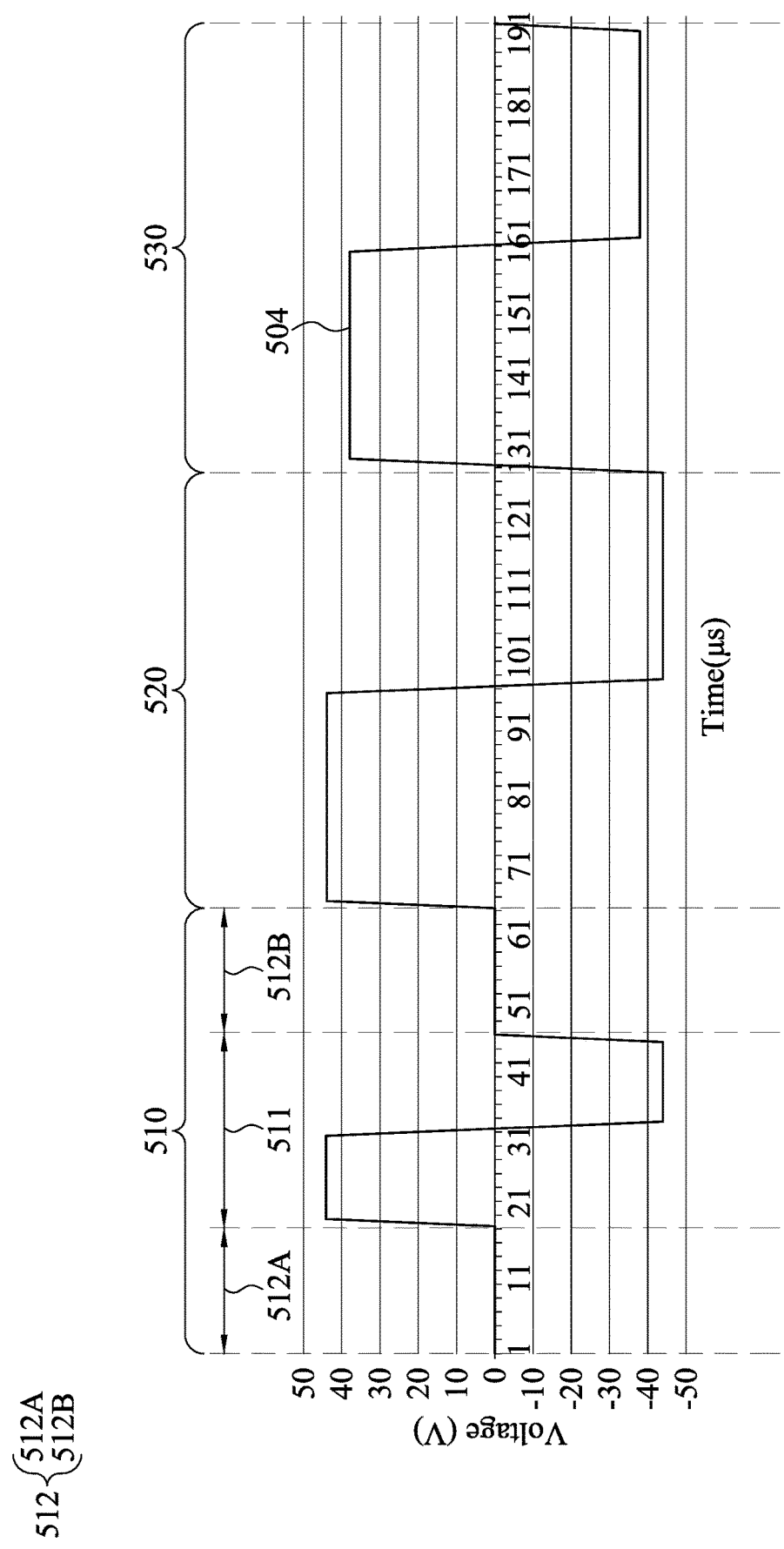
Figure 5C:
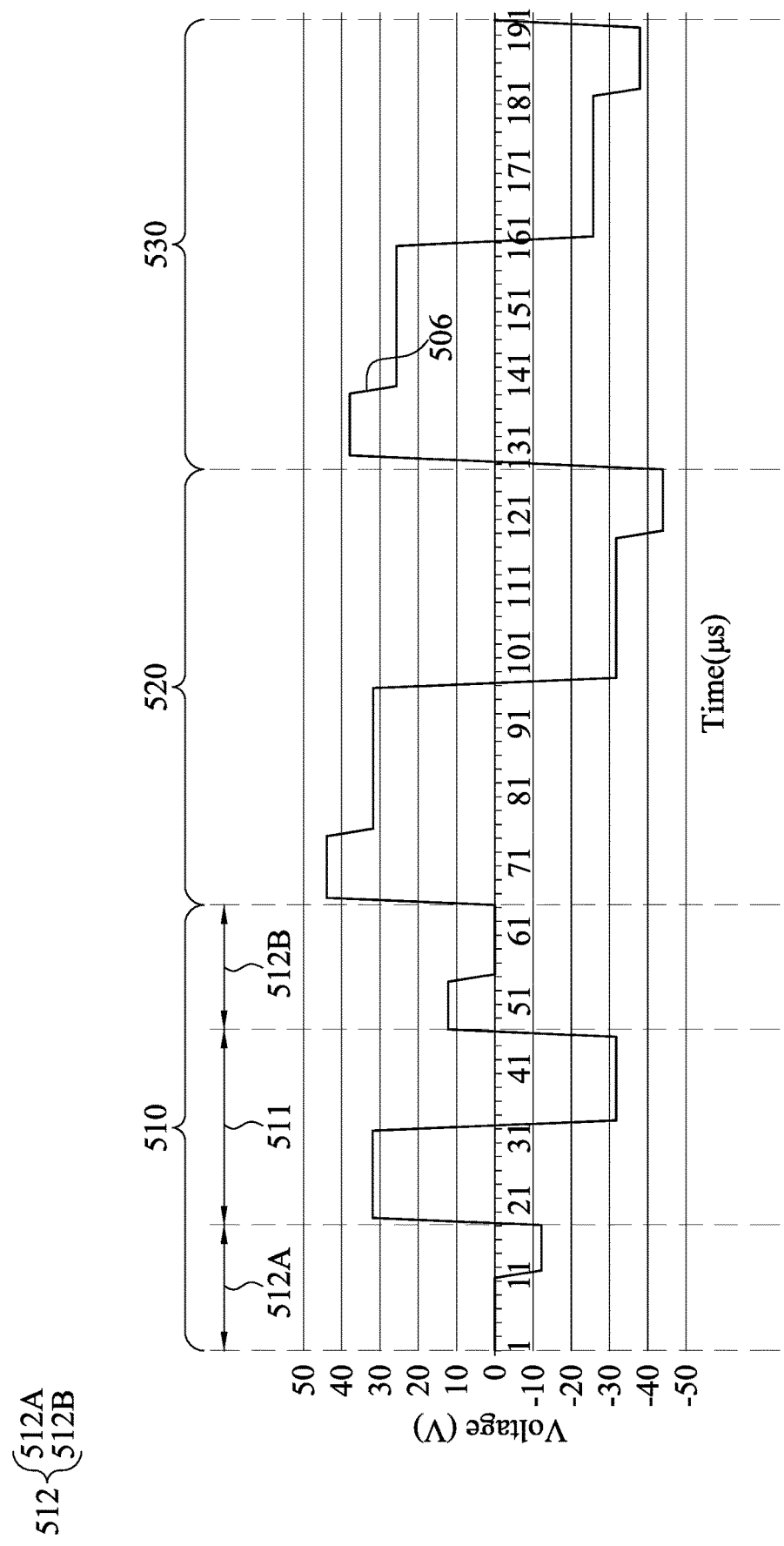
Figure 5D:
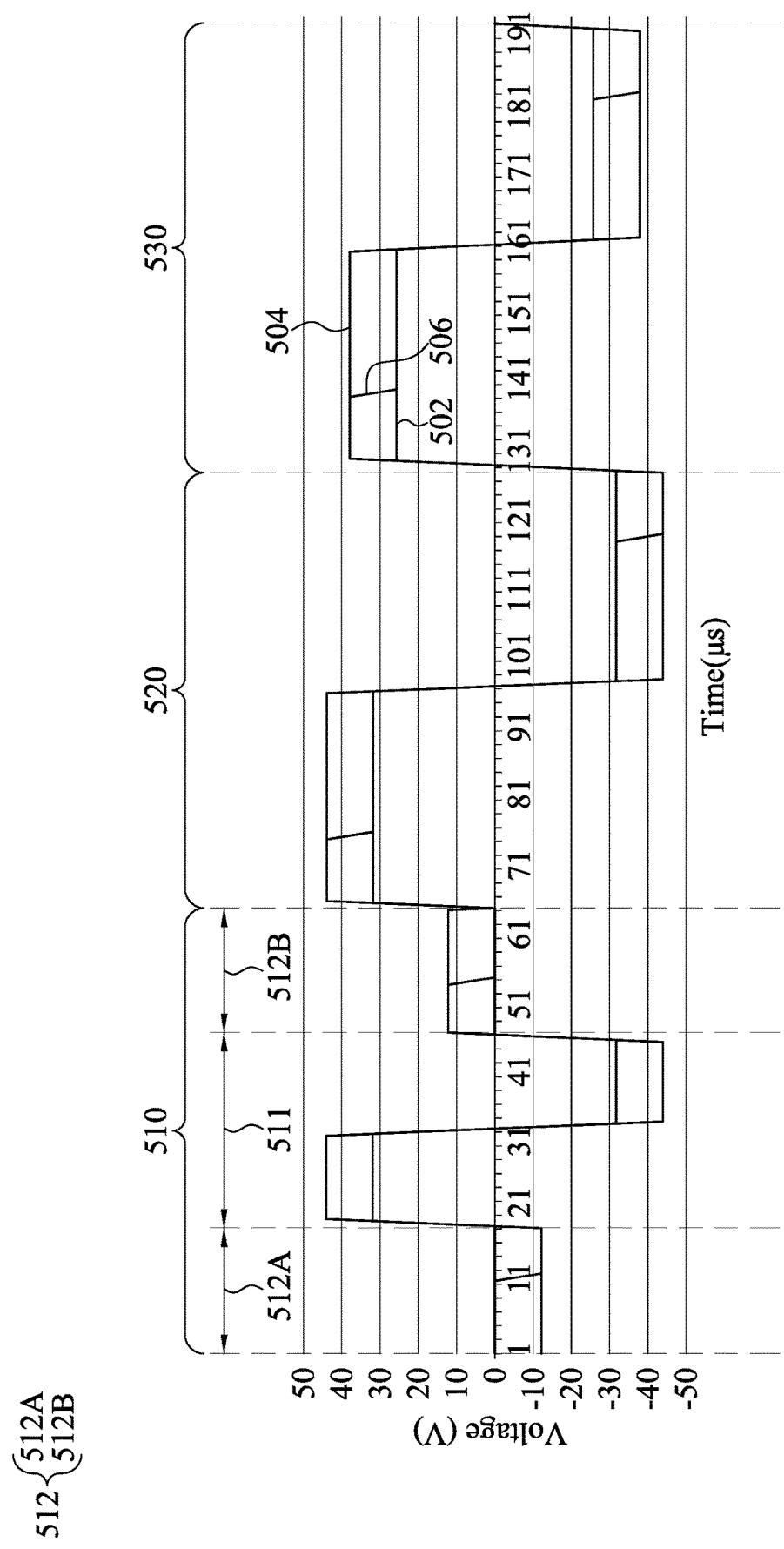

Accordingly, the voltage amplitude sensed by the pixel circuit on the activated scanning electrode in the operation region of stage 310 is between 44.4V and 32.4V, while the voltage amplitude sensed by the pixel circuit on the activated scanning electrode in the sleep region of stage 310 is between 0 and 12.2V. In addition, the voltage amplitude sensed by the pixel circuit on the activated scanning electrode in stage 320 is between 26.4V and 38.4V. Therefore, curve 306 can be derived from the range between curves 302 and 304, as depicted in FIGS. 3C and 3D.

In the proposed PWM scanning procedure, a manipulation stage is introduced, resulting in a longer overall duration of the scanning procedure compared to the reference case (i.e., only include the selection stage). However, the duration of the selection stage in Case 1 is shortened due to the manipulation stage. In some embodiments, when the scanning procedures for two adjacent scanning lines are arranged in a pipelined manner, the time for updating or writing the pixels on each activated scanning electrode can be shortened to be substantially equal to the duration of the selection stage. This expedites the scanning procedure for each scan line. Further details will be explained in the embodiment of FIG. 13.

More specifically, the proposed PWM scanning procedure incorporates a manipulation stage, allowing the selection of an appropriate voltage from the voltage interval between the RV curves corresponding to two or more different voltages. This voltage is used to drive the pixel circuits on the activated scanning electrode during the manipulation stage or the selection stage. As a result, the grayscale screen can be generated with a reduced duration of the selection stage and improved grayscale display capability compared to the conventional PWM scanning procedure.

Case 1-2: Two $1^{st}$ Type Manipulation Stages Plus the Selection Stage

FIGS. 4A to 4D are waveform diagrams illustrating the driving voltage applied to the pixel circuits over time in accordance with another embodiment of the present disclosure.

In some embodiments, the PWM scanning procedure of each activated scanning electrode may include stages 410, 420, and 430 arranged in sequence. Stage 410 may refer to a first manipulation stage including an operation region 411 and a sleep region 412 (including sub-regions 412A and 412B). Stage 420 may refer to a second manipulation stage including an operation region 421 and a sleep region 422 (including sub-regions 422A and 422B). Stages 410 and 420 shown in FIGS. 4A-4D may be similar to stage 310 shown in FIGS. 3A-3D, and thus the details thereof will not be repeated here. Stage 430 may refer to a selection stage. For clarity, curves 402, 404, and 406, that respectively illustrate the dark-state voltage, bright-state voltage, and gray-state voltage applied to the pixel circuit on the activated scanning electrode over time, are separately shown in FIGS. 4A, 4B, and 4C, respectively. Additionally, curves 402, 404, and 406 are collectively shown in FIG. 4D for reference.

Specifically, during the PWM scanning procedure shown in FIGS. 4A-4D, the first manipulation stage (e.g., stage 410), the second manipulation stage (e.g., stage 420), and the selection stage (e.g., stage 430) are arranged in sequence, further reducing the duration of the selection stage (e.g., stage 430) compared to that of the selection stage 330 shown in FIGS. 3A-3D.

Case 2: $1^{st}$ Type Manipulation Stage Plus Speeding Stage and Selection Stage FIGS. 5A to 5D are waveform diagrams illustrating the driving voltage applied to the pixel circuits over time in accordance with yet another embodiment of the present disclosure.

In some embodiments, the PWM scanning procedure of each activated scanning electrode may include stages 510, 520, and 530 arranged in sequence. Stage 510 may refer to a manipulation stage including an operation region 511 and a sleep region 512 (including sub-regions 512A and 512B). Stage 520 may refer to a speeding stage. Stage 530 may refer to a selection stage. Stages 510 and 530 shown in FIGS. 5A-5D may be similar to stages 310 and 320 shown in FIGS. 3A-3D, respectively, and thus the details thereof will not be repeated here. For clarity, curves 502, 504, and 506, that respectively illustrate the dark-state voltage, bright-state voltage, and gray-state voltage applied to the pixel circuit on the activated scanning electrode over time, are separately shown in FIGS. 5A, 5B, and 5C, respectively. Additionally, curves 502, 504, and 506 are collectively shown in FIG. 5D for reference.

In some embodiments, the voltage amplitude in stage 520 (e.g., speeding stage) may be higher than that in stage 530 (e.g., selection stage) for curves 502 and 504. Specifically, during the speeding stage, the driving circuit 21 may control the scanning electrode driving circuit 221 and the data electrode driving circuit 222 to apply a high voltage to the display units 22B, 22G, and 22R. This increases the kinetic energy of the ChLC molecules within the liquid crystal layers 230B, 230G, and 230R to the level required by the homeotropic state, where the ChLC molecules have the highest kinetic energy. As a result, the speeding stage (e.g., stage 520) helps reduce the duration of the selection stage (e.g., stage 530) when updating the screen of the display panel 22.

Case 3: Two $2^{nd}$ Type Manipulation Stages Plus Selection Stage

FIGS. 6A to 6D are waveform diagrams illustrating the driving voltage applied to the pixel circuits over time in accordance with yet another embodiment of the present disclosure.

In some embodiments, the PWM scanning procedure of each activated scanning electrode may include stages 610, 620, and 630 arranged in sequence. Stages 610 and 620 may refer to a first manipulation stage and a second manipulation stage, respectively, each including a half-influence region. Stage 630 may refer to a selection stage. Stage 630 shown in FIGS. 6A-6D may be similar to stage 320 shown in FIGS. 3A-3D, and thus the details thereof will not be repeated here. For clarity, curves 602, 604, and 606, that respectively illustrate the dark-state voltage, bright-state voltage, and gray-state voltage applied to the pixel circuit on the activated scanning electrode over time, are separately shown in FIGS. 6A, 6B, and 6C, respectively. Additionally, curves 602, 604, and 606 are collectively shown in FIG. 6D for reference. It should be noted that stage 610 can be omitted in some embodiments, and one manipulation stage including the half-influence region is arranged prior to the selection stage.

Figure 6A:
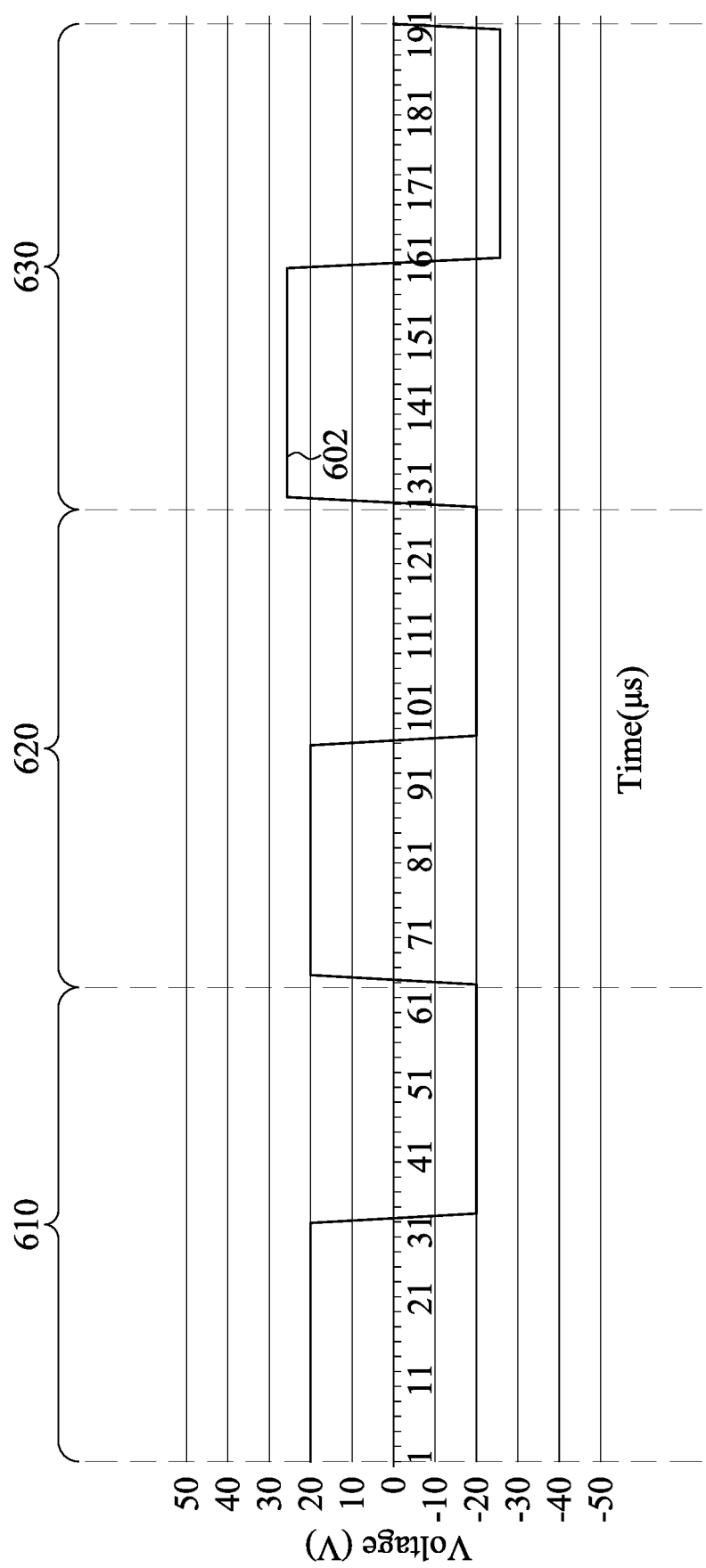
FIGS. 6A to 6D are waveform diagrams illustrating the driving voltage applied to the pixel circuits over time in accordance with yet another embodiment of the present disclosure.

In some embodiments, the voltage amplitude of the half-influence region may be within an intermediate voltage amplitude range (e.g., 14V to 32V). Referring to FIG. 6A, the amplitude of the dark-state voltage sensed by the pixel circuit on the activated scanning electrode in stages 610 and 620 is approximately 20.4V. Additionally, the amplitude of the dark-state voltage sensed by the pixel circuit on the activated scanning electrode in stage 630 (e.g., selection stage) is approximately 26.4V.

Figure 6B:
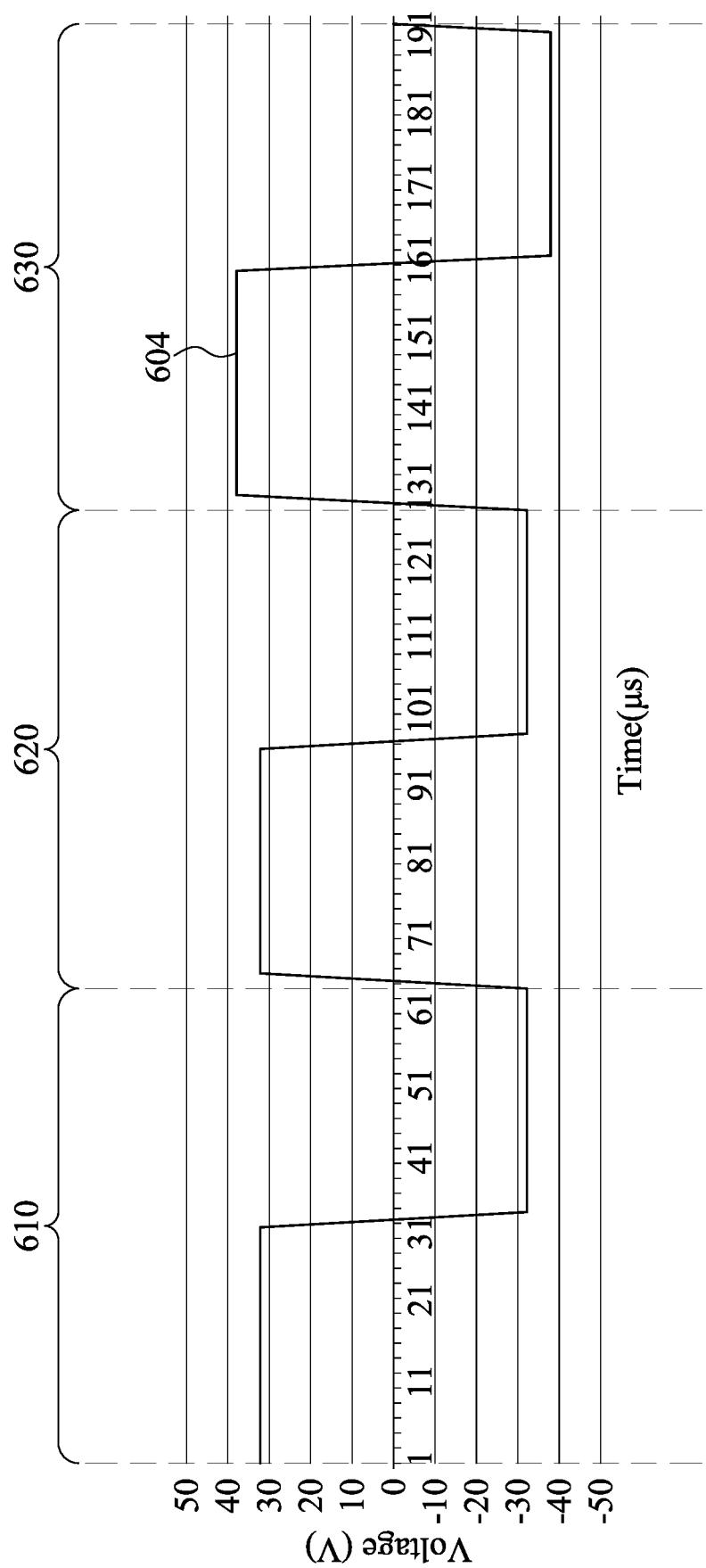
Figure 6C:
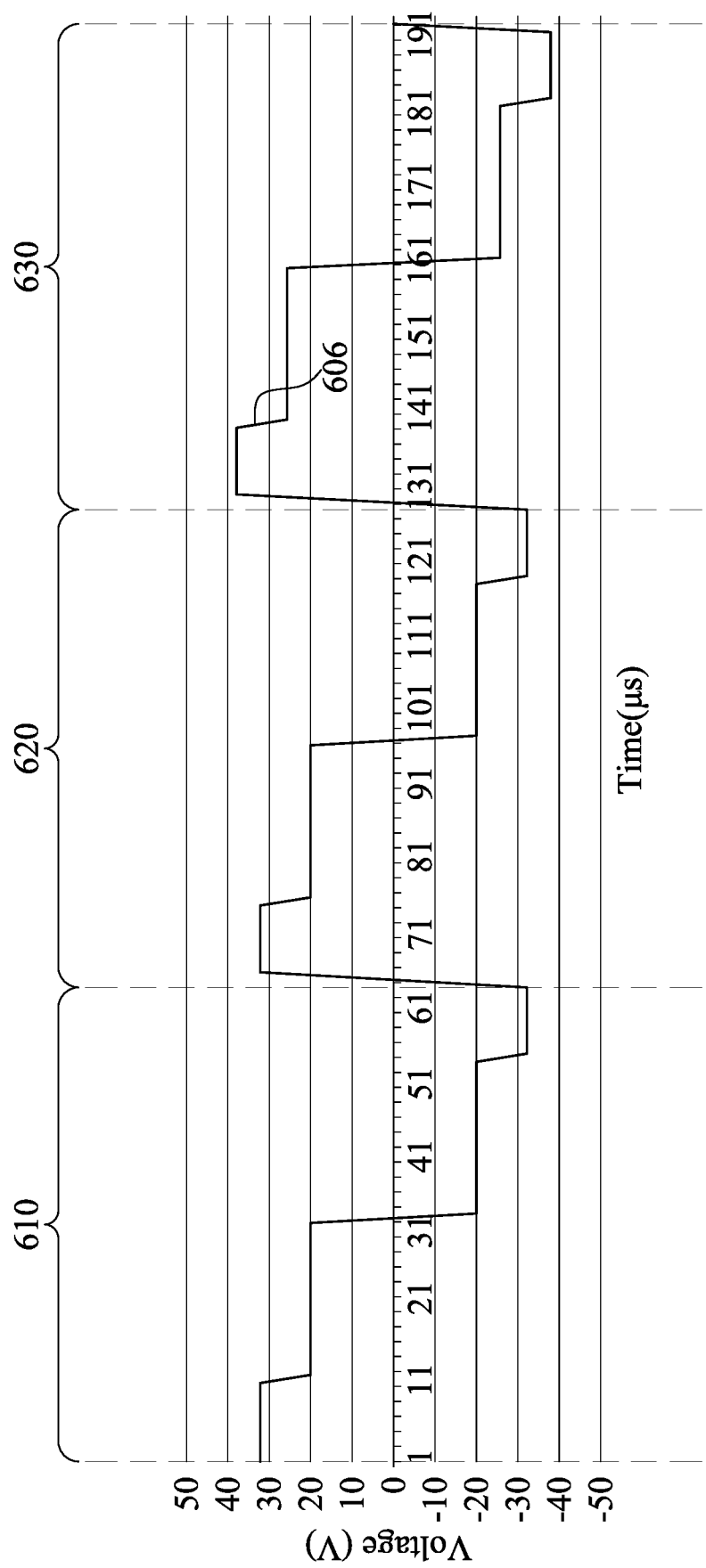
Figure 6D:
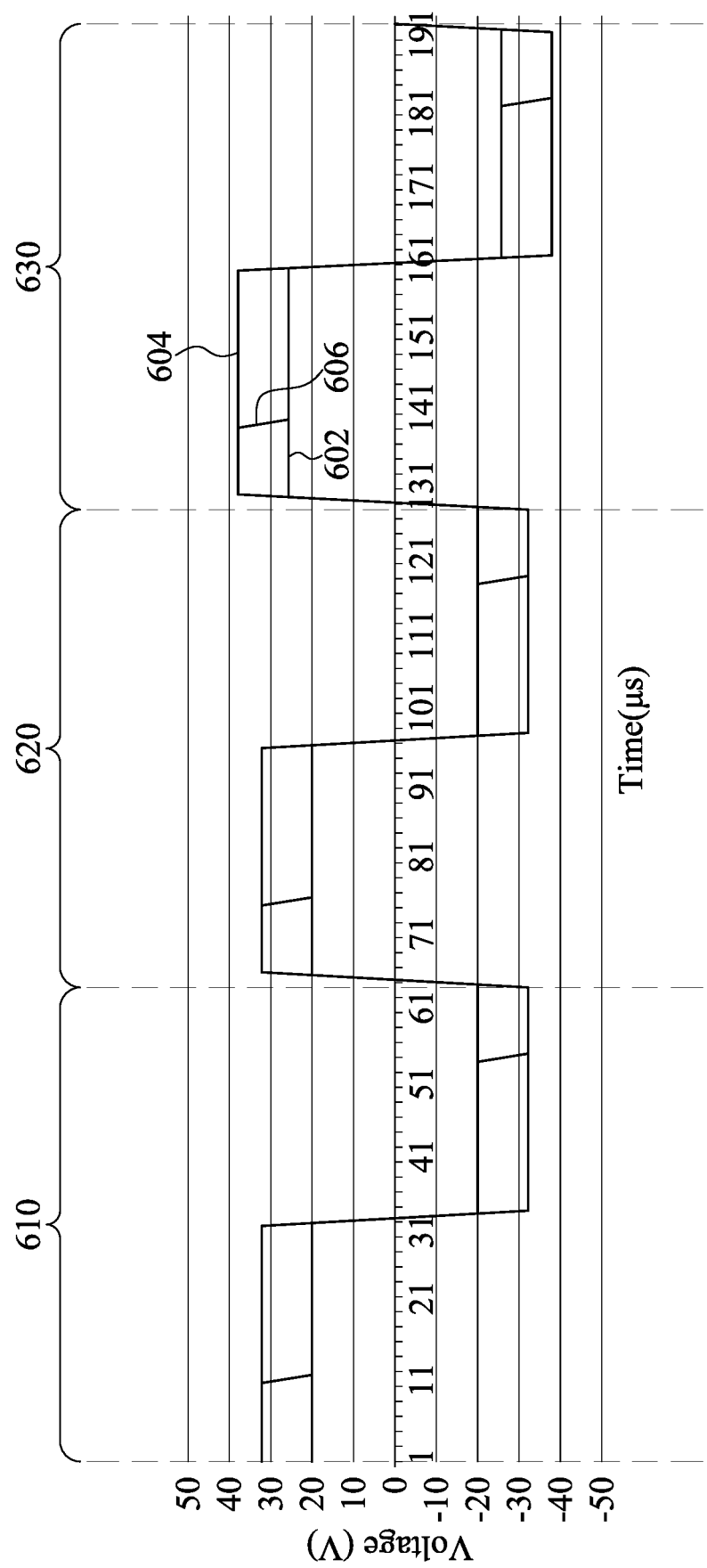
Figure 7A:
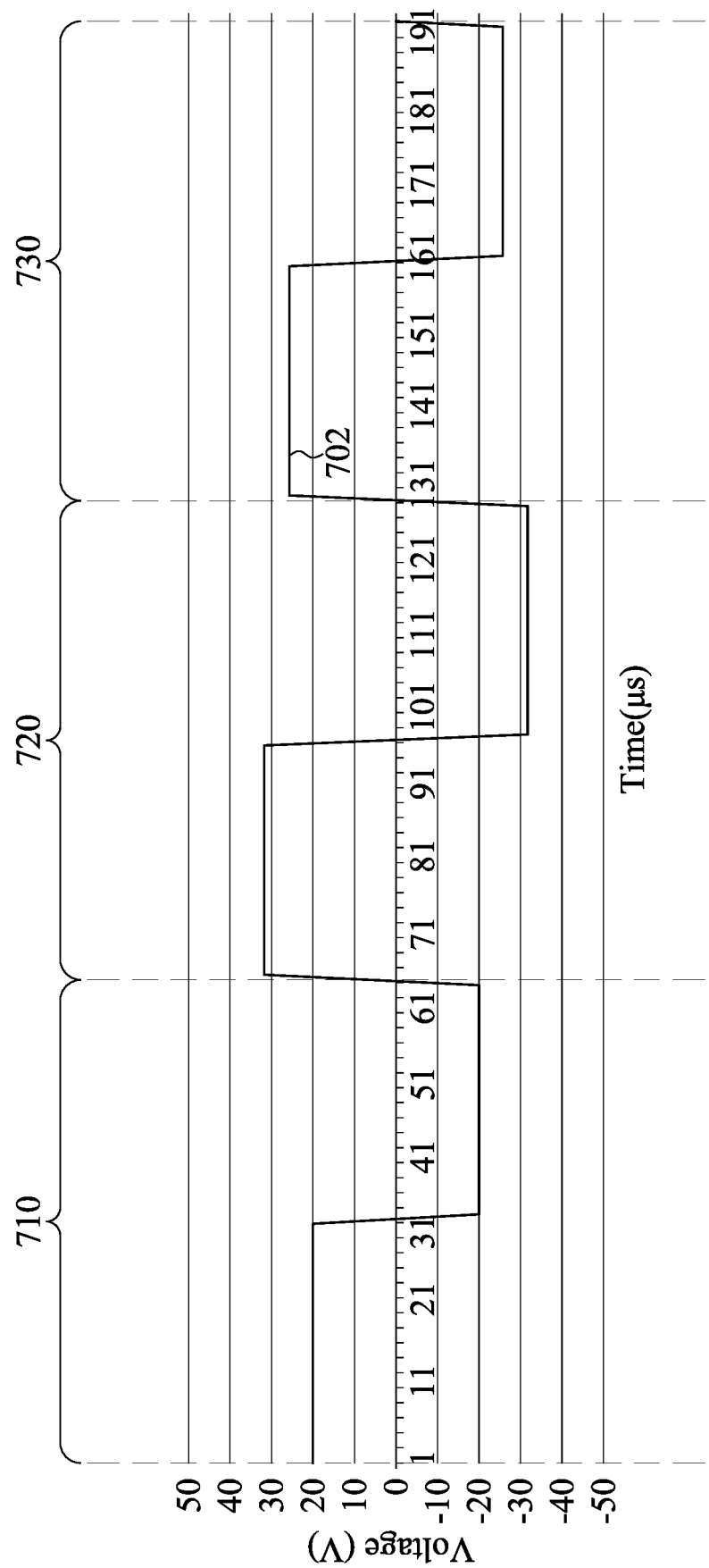
FIGS. 7A to 7D are waveform diagrams illustrating the driving voltage applied to the pixel circuits over time in accordance with yet another embodiment of the present disclosure.
Figure 7B:
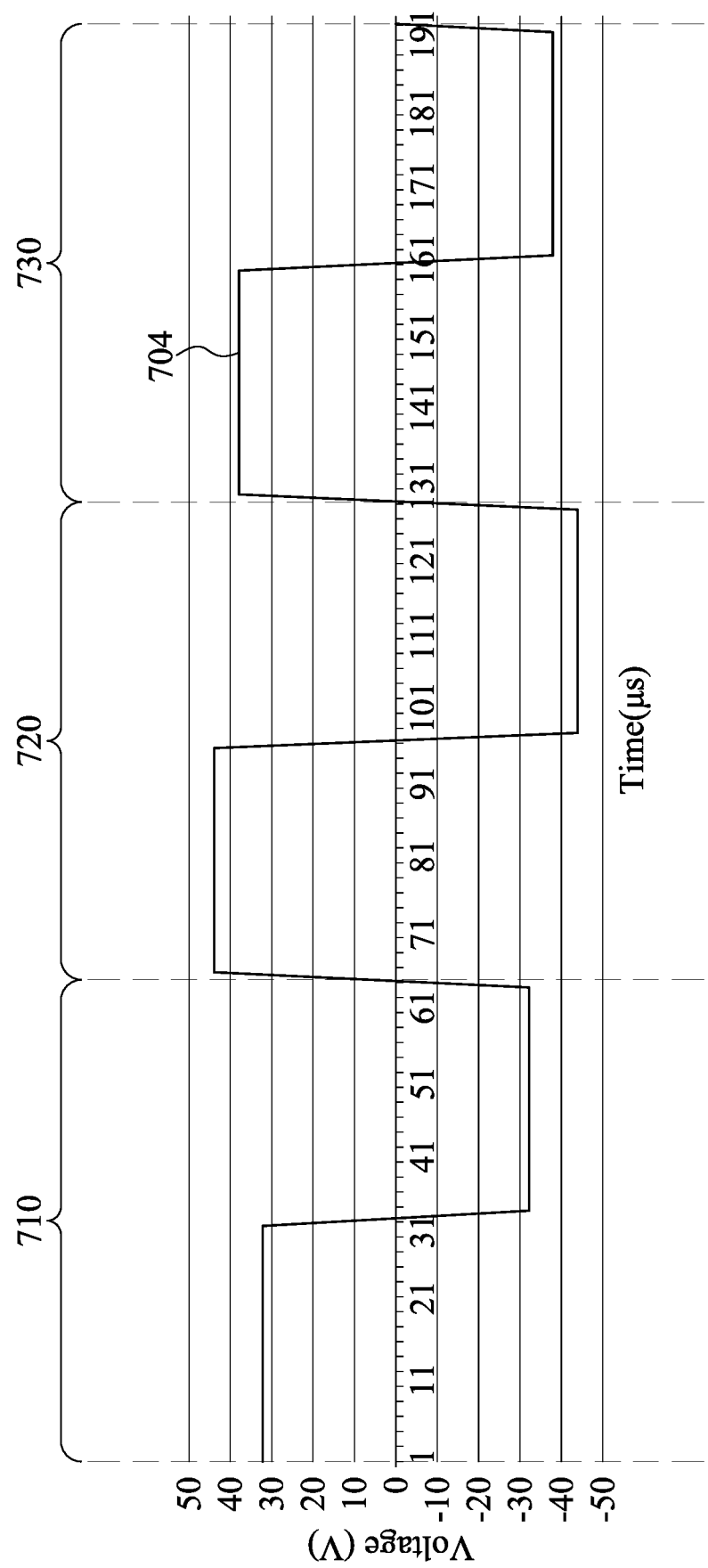
Figure 7C:
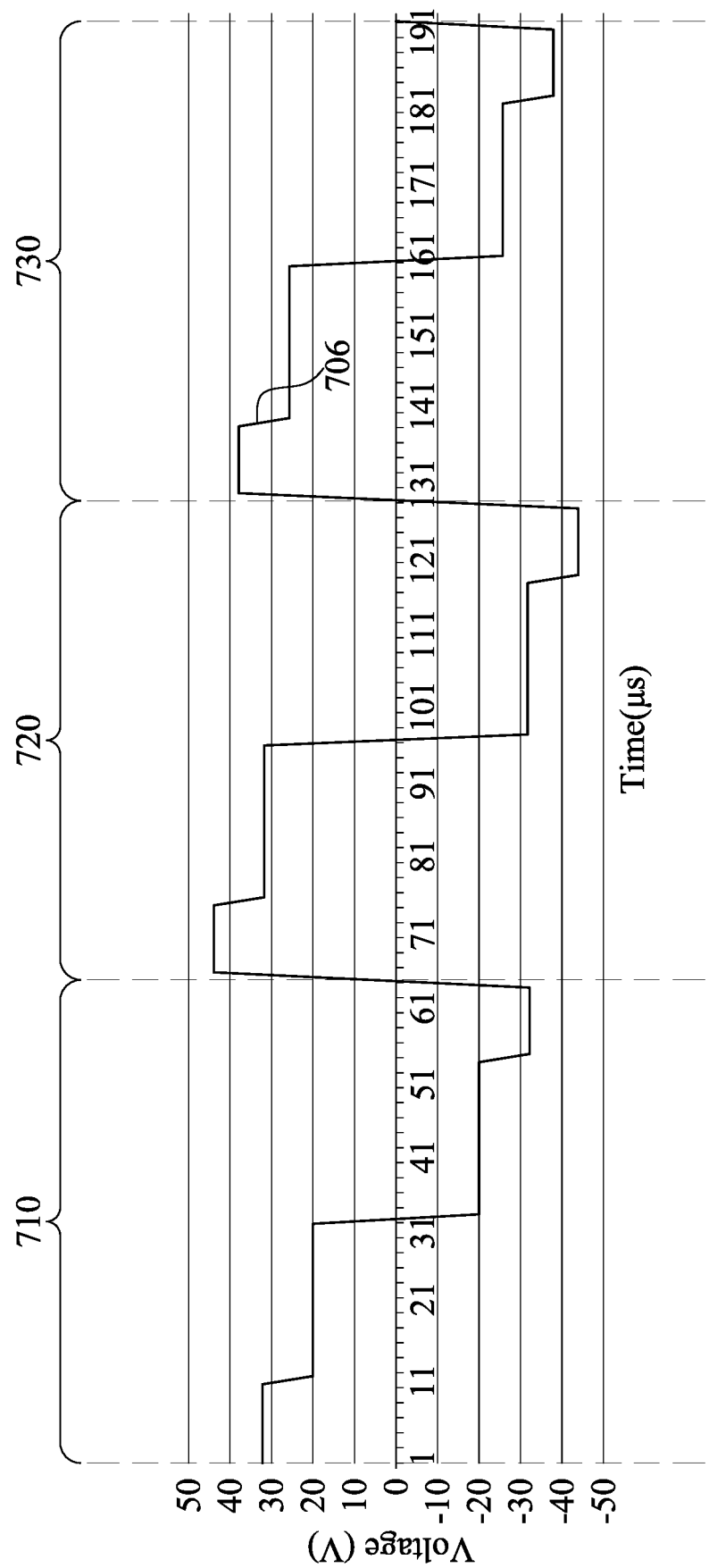
Figure 7D:
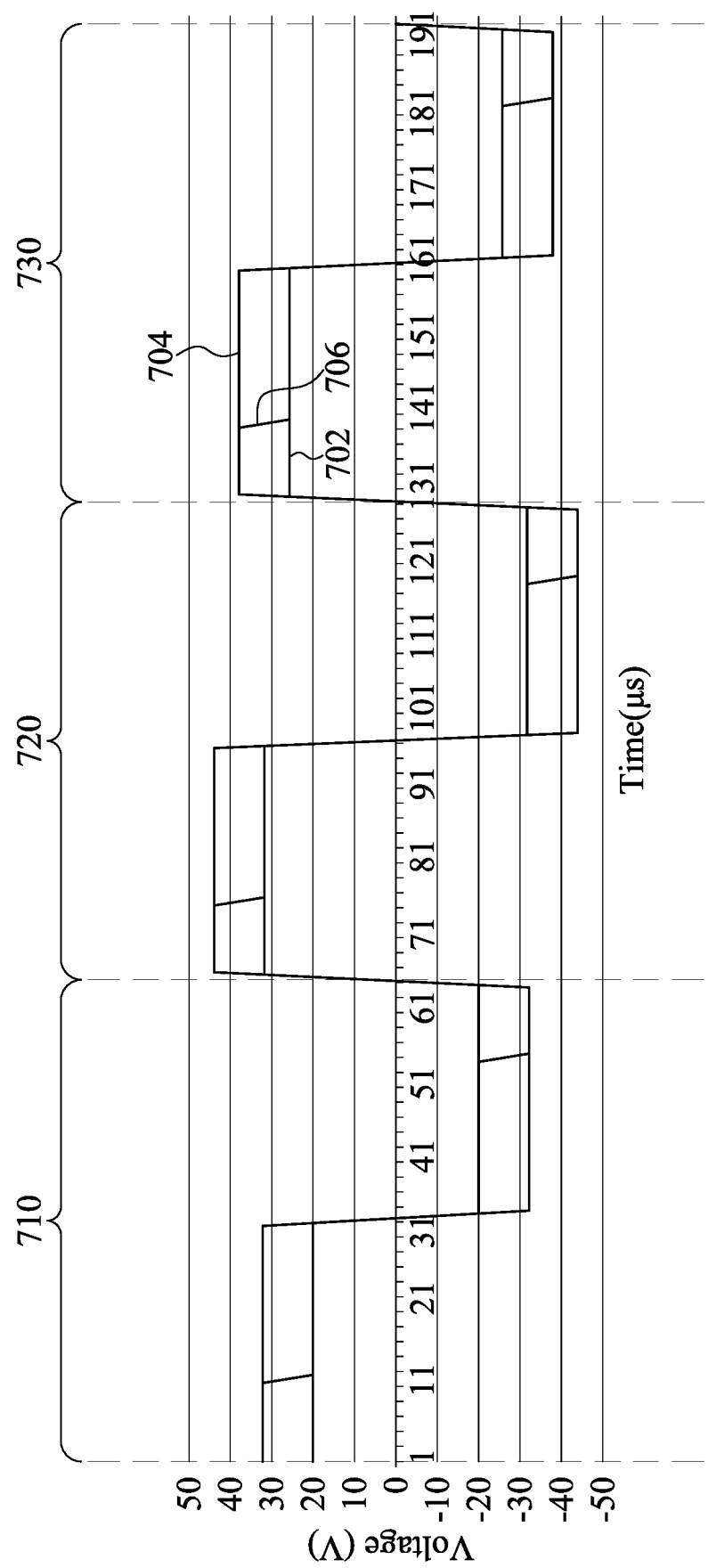
Figure 8A:
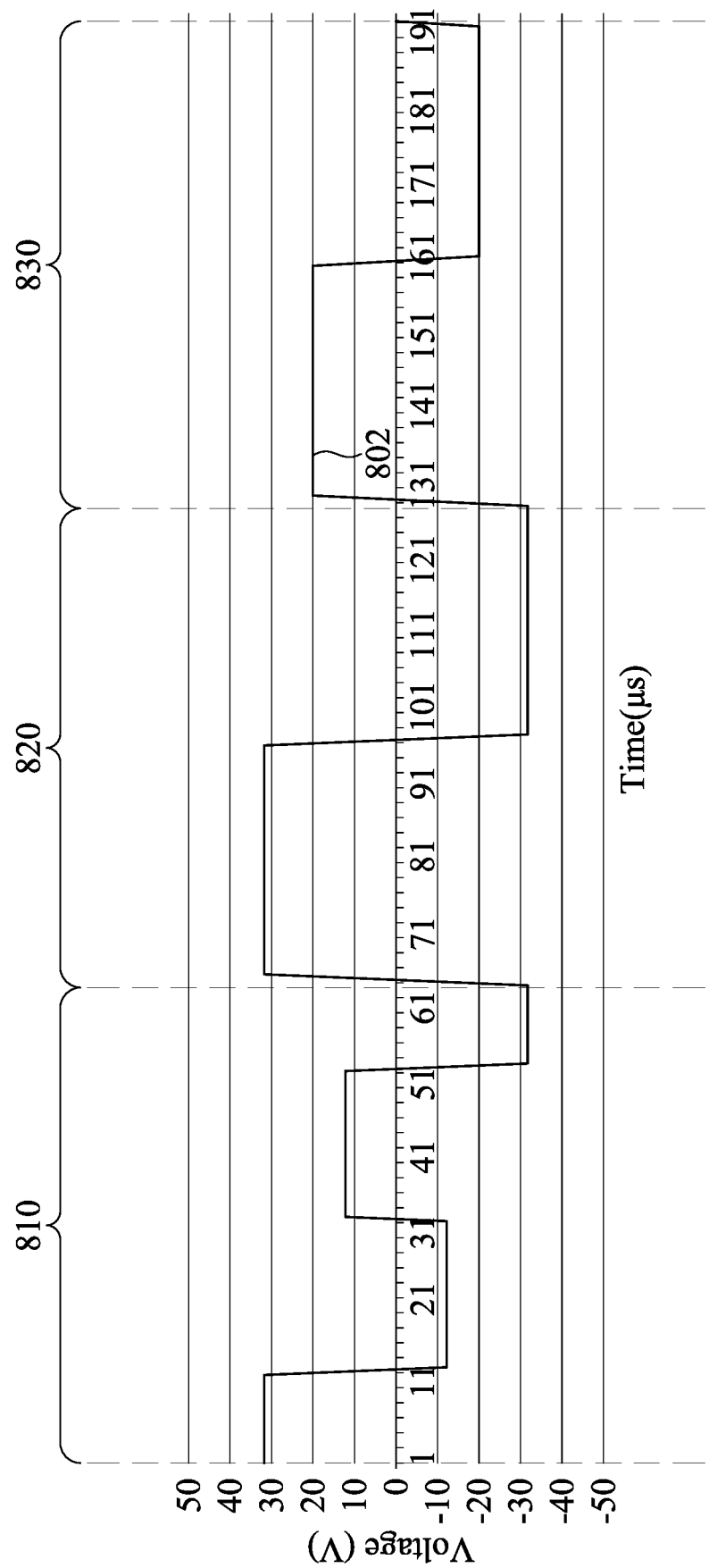
FIGS. 8A to 8D are waveform diagrams illustrating the driving voltage applied to the pixel circuits over time in accordance with yet another embodiment of the present disclosure.
Figure 8B:
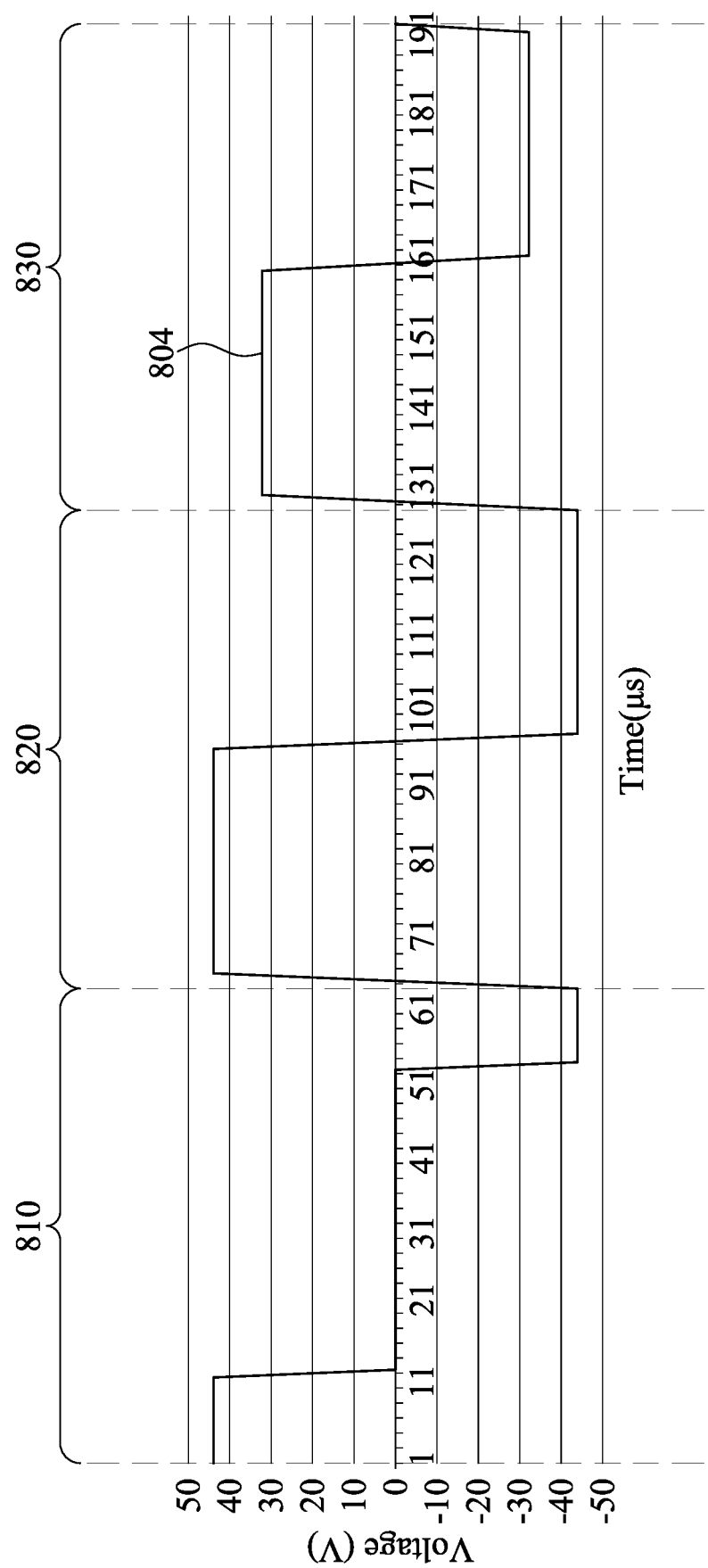
Figure 8C:
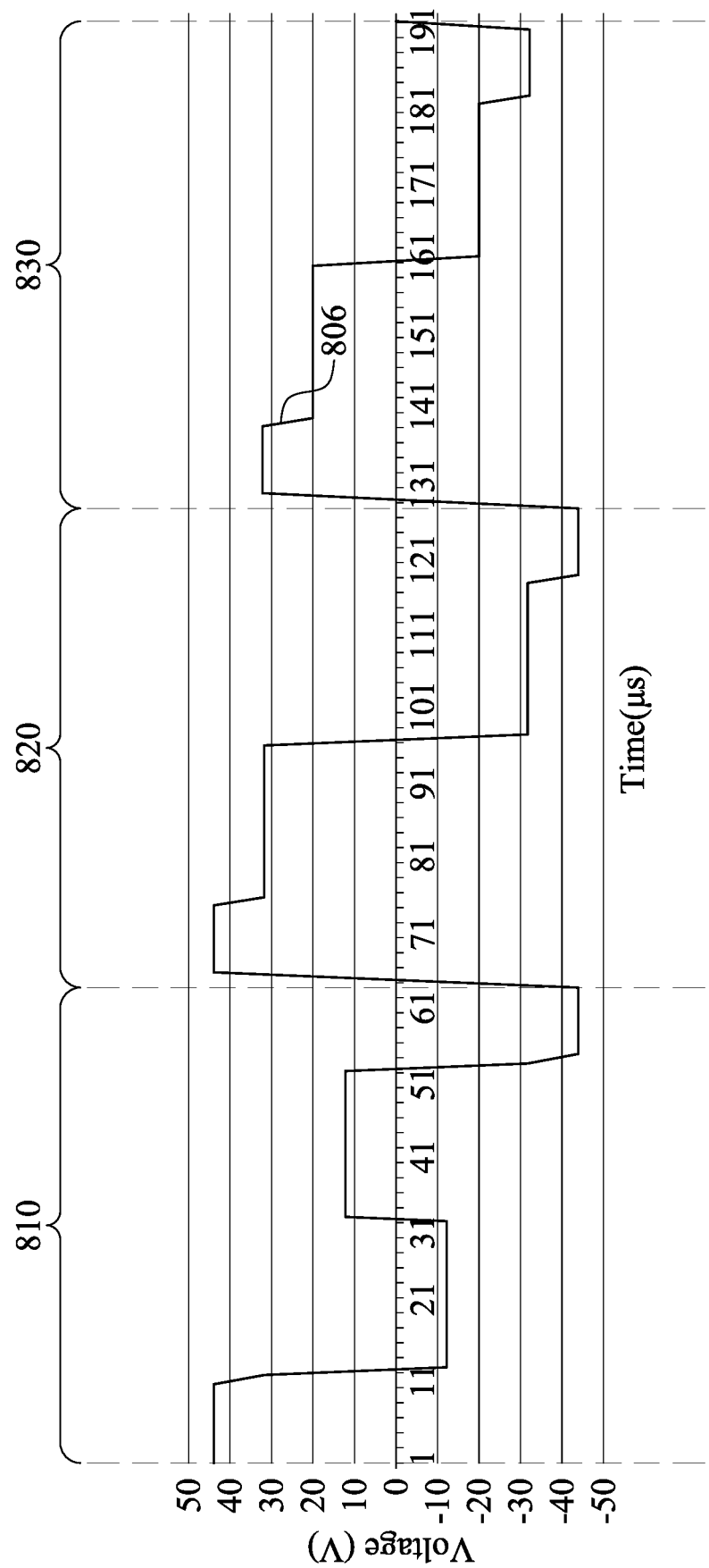
Figure 8D:
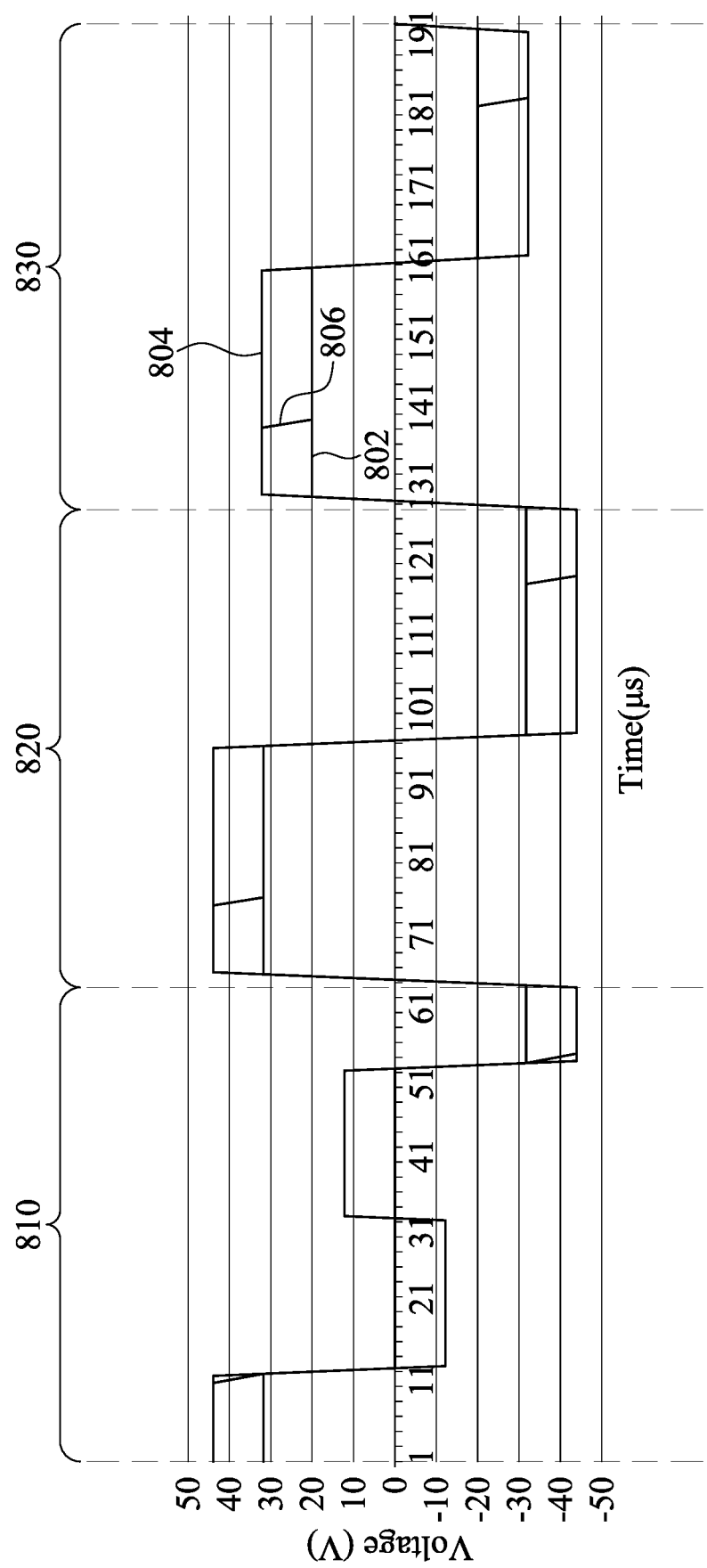
Figure 9A:
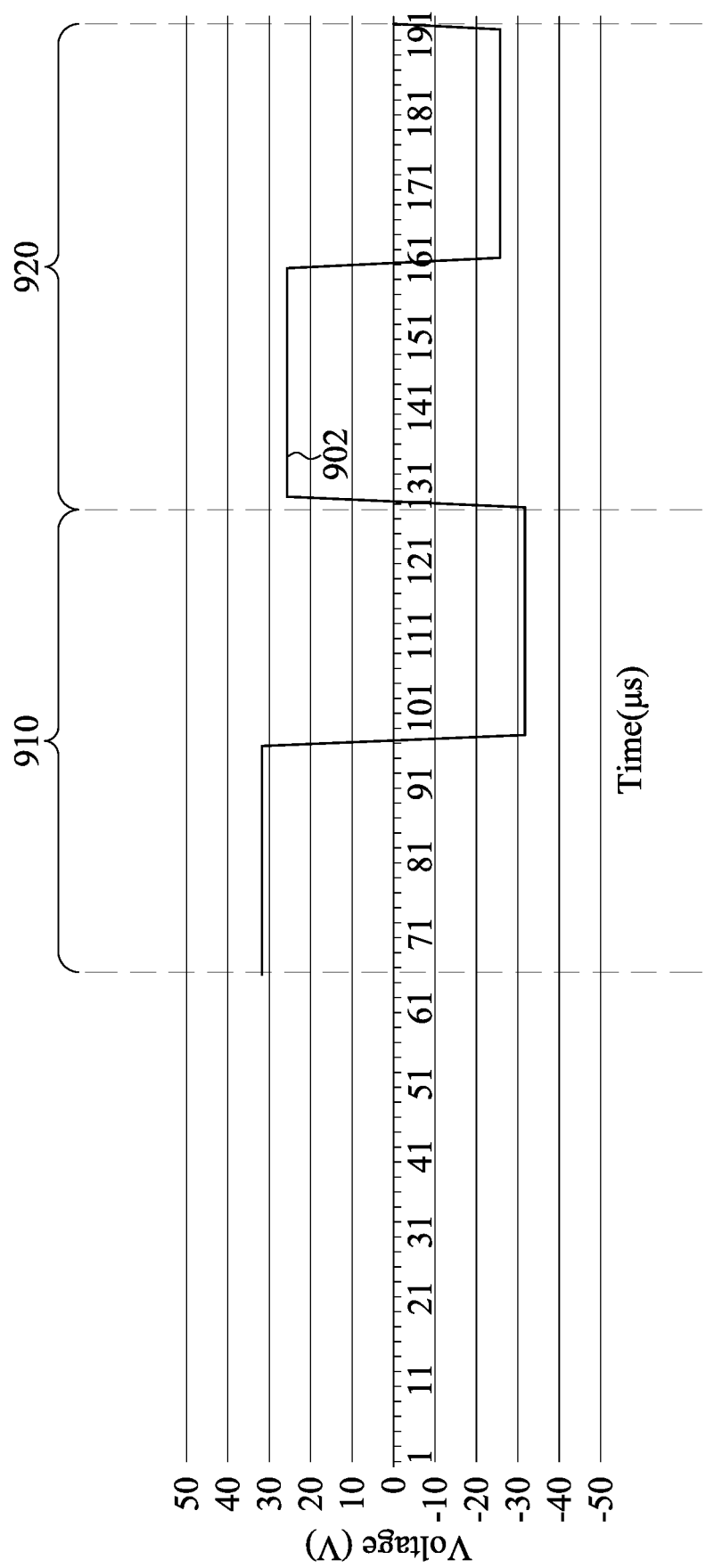
FIGS. 9A to 9D are waveform diagrams illustrating the driving voltage applied to the pixel circuits over time in accordance with yet another embodiment of the present disclosure.
Figure 9B:
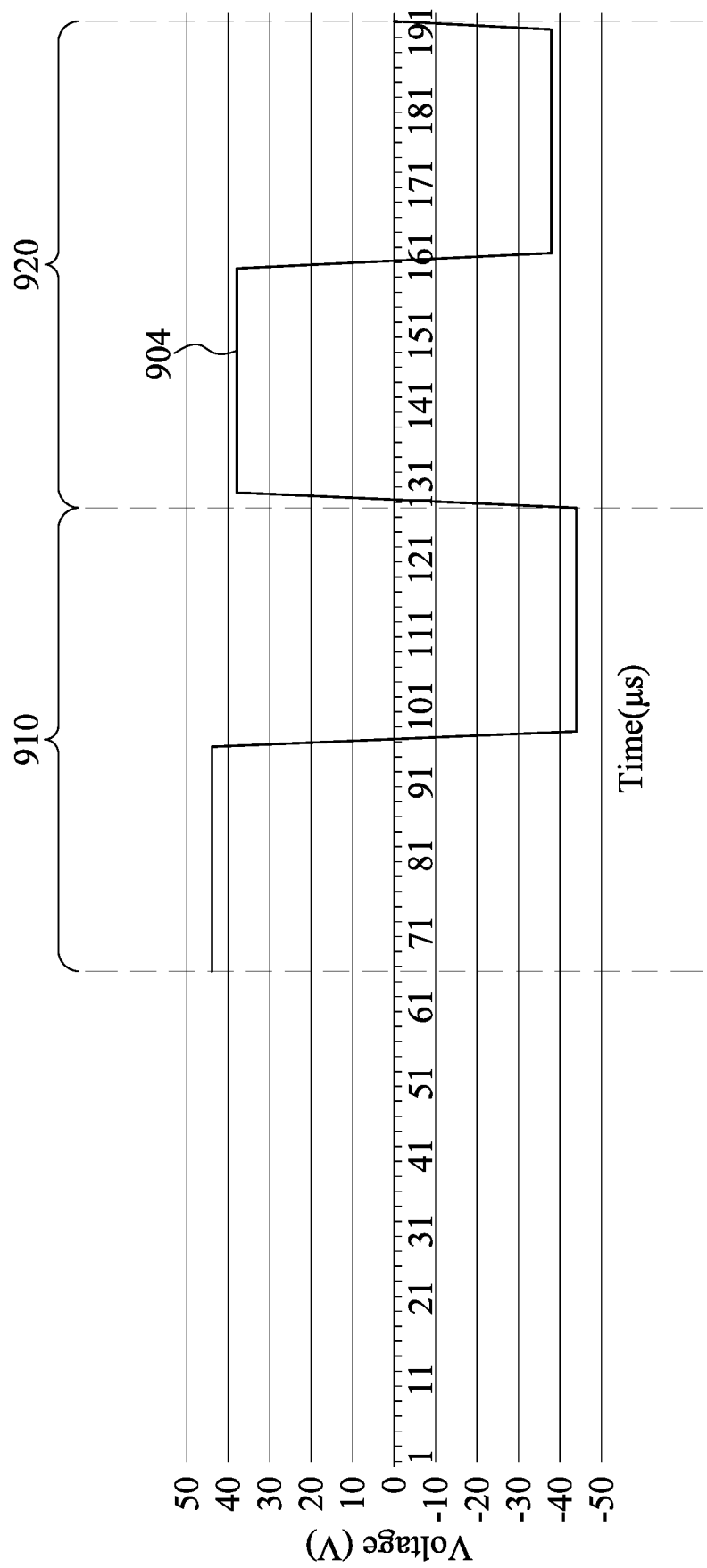
Figure 9C:
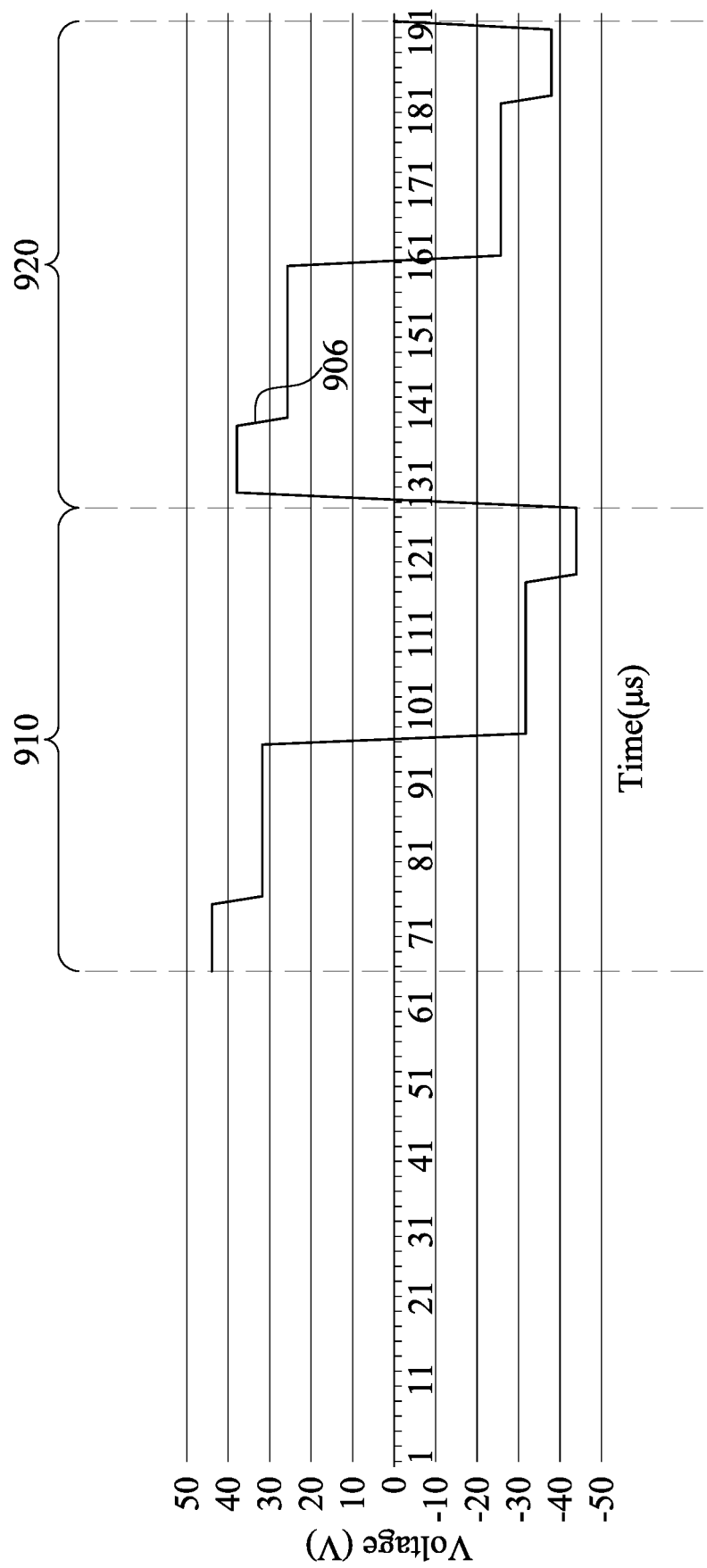
Figure 9D:
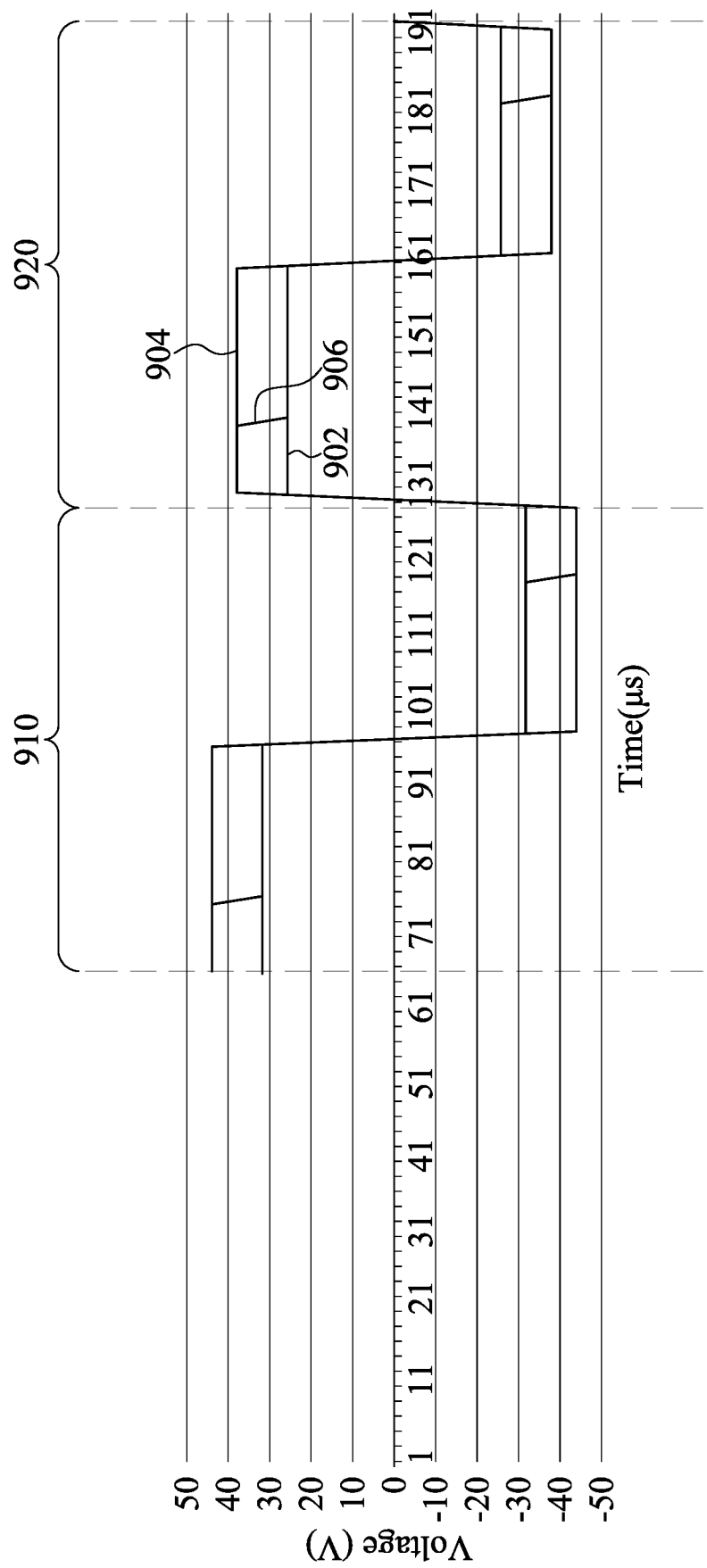
Figure 10A:
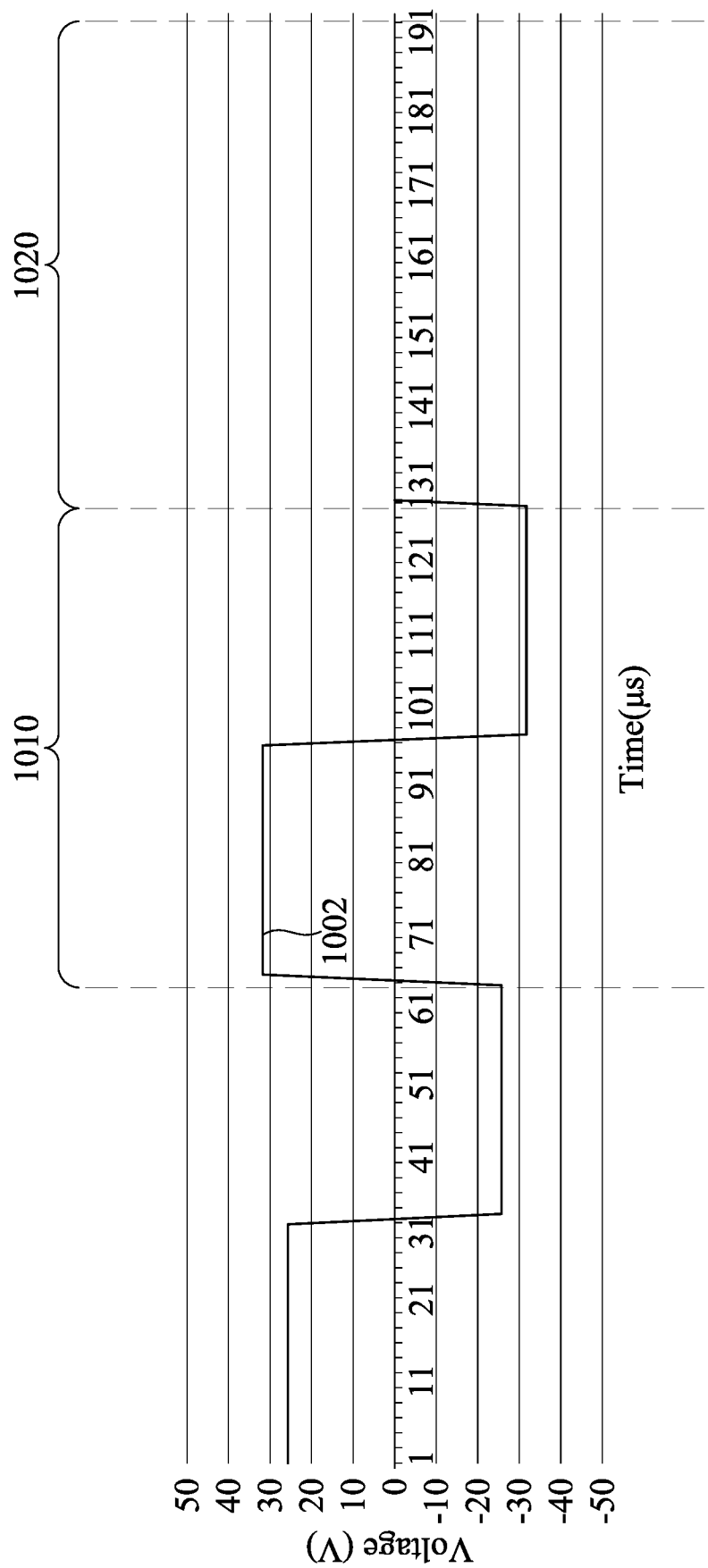
FIGS. 10A to 10D are waveform diagrams illustrating the driving voltage applied to the pixel circuits over time in accordance with yet another embodiment of the present disclosure.
Figure 10B:
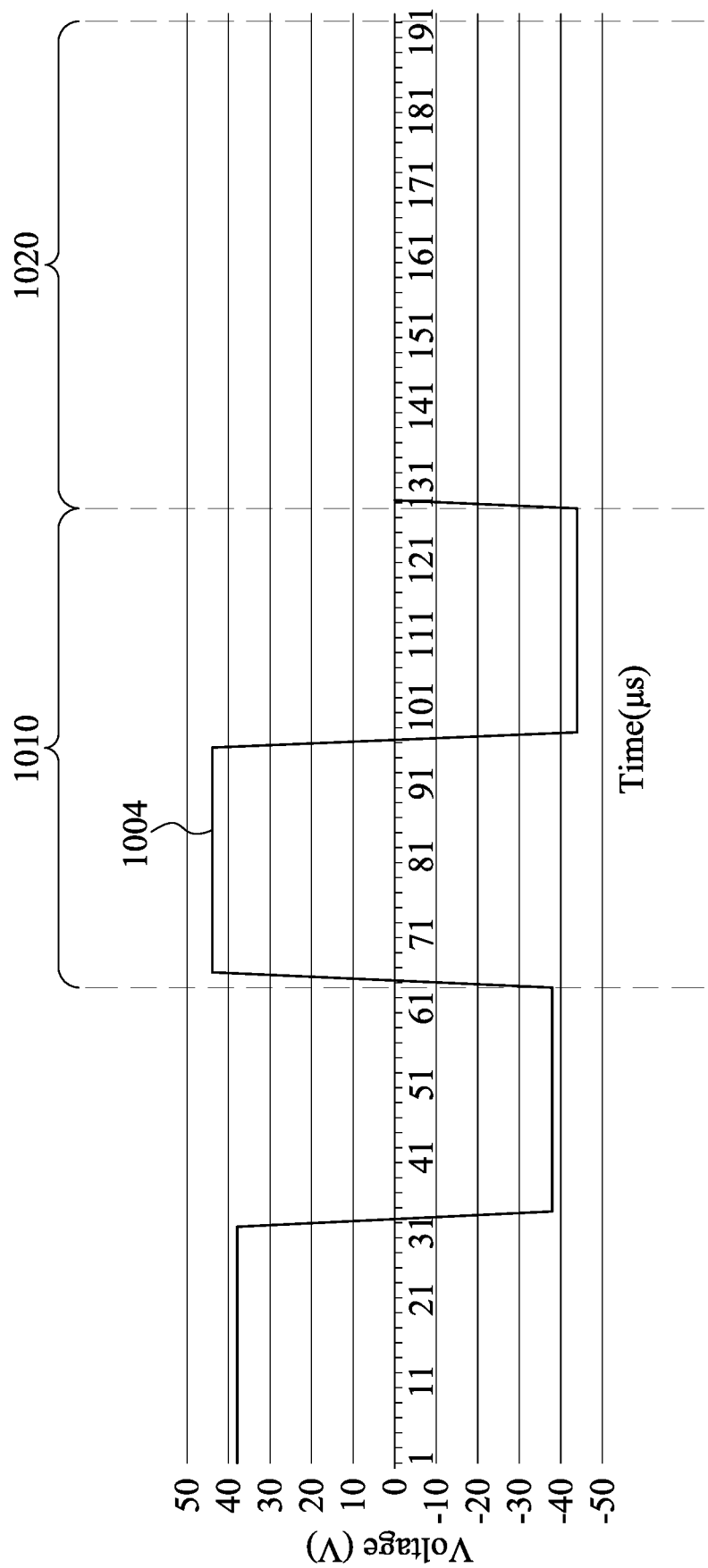
Figure 10C:
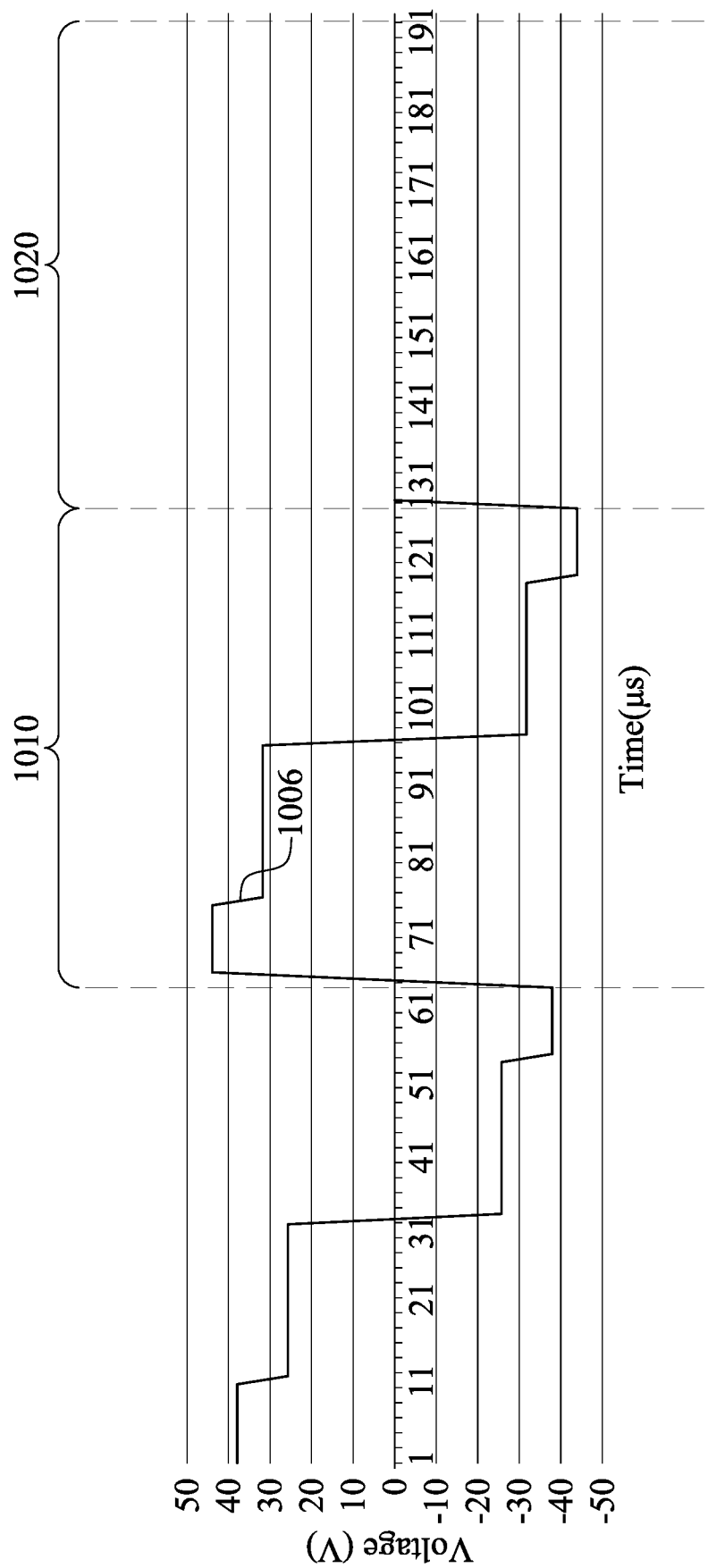
Figure 10D:
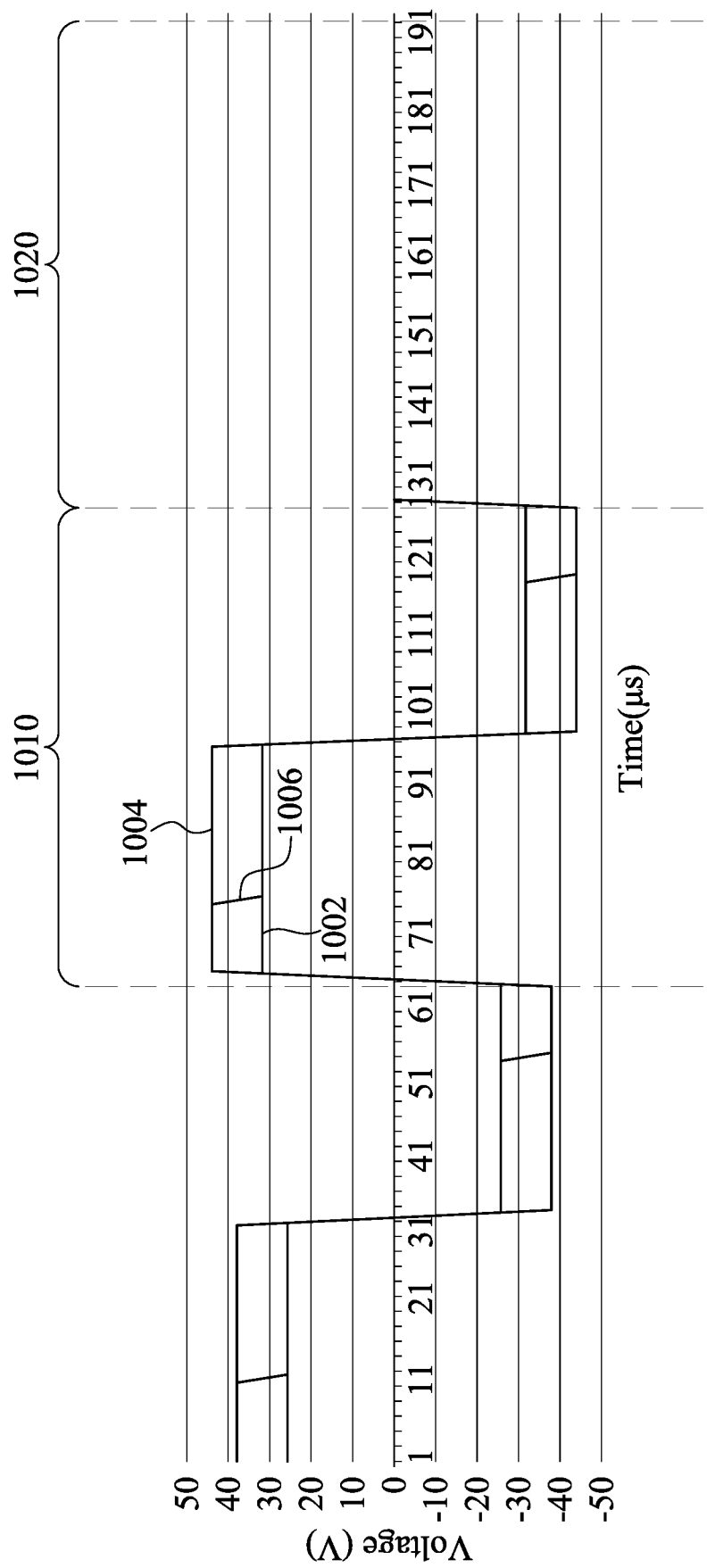

Referring to FIG. 6B, the amplitude of the bright-state voltage sensed by the pixel circuit on the activated scanning electrode in stages 610 and 620 is approximately 32.4V. Additionally, the amplitude of the bright-state voltage sensed by the pixel circuit on the activated scanning electrode in stage 630 (e.g., selection stage) is approximately 38.4V. Accordingly, the voltage amplitude sensed by the pixel circuit on the activated scanning electrode in stage 630 is approximately between 26.4V and 38.4V. In comparison with the conventional PWM scanning procedure, the proposed scanning scheme in Case 3 can also reduce the duration of the selection stage by utilizing manipulation stages, including the half-influence region.

Case 4: $1^{st}$ Type Manipulation Stage Plus Speeding Stage and Selection Stage FIGS. 7A to 7D are waveform diagrams illustrating the driving voltage applied to the pixel circuits over time in accordance with yet another embodiment of the present disclosure.

In some embodiments, the PWM scanning procedure of each activated scanning electrode may include stages 710, 720, and 730 arranged in sequence. Stages 710 and 720 may refer to a manipulation stage and a speeding stage, respectively, and stage 710 includes a half-influence region. Stage 730 may refer to a selection stage. Stage 730 shown in FIGS. 7A-7D may be similar to stage 320 shown in FIGS. 3A-3D, while stage 720 may be similar to stage 520 shown in FIGS. 5A-5D. The details of these stages will not be repeated here. For clarity, curves 702, 704, and 706, that respectively illustrate the dark-state voltage, bright-state voltage, and gray-state voltage applied to the pixel circuit on the activated scanning electrode over time, are separately shown in FIGS. 7A, 7B, and 7C, respectively. Additionally, curves 702, 704, and 706 are collectively shown in FIG. 7D for reference.

In comparison with the conventional PWM scanning procedure, the proposed scanning scheme in Case 4 can also reduce the duration of the selection stage by utilizing one manipulation stage (including the half-influence region) and one speeding stage.

Case 5: $1^{st}$ Type Manipulation Stage Plus Selection Stage and $2^{nd}$ Type Manipulation Stage FIGS. 8A to 8D are waveform diagrams illustrating the driving voltage applied to the pixel circuits over time in accordance with yet another embodiment of the present disclosure.

In some embodiments, the PWM scanning procedure of each activated scanning electrode may include stages 810, 820, and 830 arranged in sequence. Stages 810 and 820 may refer to a first-type manipulation stage (e.g., including an operation and a sleep region) and a selection stage, respectively. Stage 830 may refer to a second-type manipulation stage (e.g., including a half-influence region). The details of stages 810 to 830 can be referred to the aforementioned embodiments, and thus will not be repeated here. For clarity, curves 802, 804, and 806, that respectively illustrate the dark-state voltage, bright-state voltage, and gray-state voltage applied to the pixel circuit on the activated scanning electrode over time, are separately shown in FIGS. 8A, 8B, and 8C, respectively. Additionally, curves 802, 804, and 806 are collectively shown in FIG. 8D for reference.

In comparison with the conventional PWM scanning procedure, the proposed scanning scheme in Case 5 can also reduce the duration of the selection stage and improve the grayscale display capability of the display panel 22 by utilizing one $1^{st}$-type manipulation stage before the selection stage, and one $2^{nd}$-type manipulation stage after the selection stage.

Case 6: Speeding Stage Plus Selection Stage

FIGS. 9A to 9D are waveform diagrams illustrating the driving voltage applied to the pixel circuits over time in accordance with yet another embodiment of the present disclosure.

In some embodiments, the PWM scanning procedure of each activated scanning electrode may include stages 910 and 920 arranged in sequence. Stages 910 and 920 may refer to a speeding stage and a selection stage, respectively. The details of stages 910 and 920 can be referred to the aforementioned embodiments, and thus will not be repeated here. For clarity, curves 902, 904, and 906, that respectively illustrate the dark-state voltage, bright-state voltage, and gray-state voltage applied to the pixel circuit on the activated scanning electrode over time, are separately shown in FIGS. 9A, 9B, and 9C, respectively. Additionally, curves 902, 904, and 906 are collectively shown in FIG. 9D for reference.

In some embodiments, the voltage amplitude in stage 910 (e.g., speeding stage) may be higher than that in stage 920 (e.g., selection stage) for curves 902 and 904. Specifically, during the speeding stage, the driving circuit 21 may control the scanning electrode driving circuit 221 and the data electrode driving circuit 222 to apply a high voltage to the display units 22B, 22G, and 22R. This increases the kinetic energy of the ChLC molecules within the liquid crystal layers 230B, 230G, and 230R to the level required by the homeotropic state, where the ChLC molecules have the highest kinetic energy. As a result, the speeding stage (e.g., stage 910) helps reduce the duration of the selection stage (e.g., stage 920) when updating the screen of the display panel 22.

Case 7: Selection Stage Plus Speeding Stage

FIGS. 10A to 10D are waveform diagrams illustrating the driving voltage applied to the pixel circuits over time in accordance with yet another embodiment of the present disclosure.

In some embodiments, the PWM scanning procedure of each activated scanning electrode may include stages 1010 and 1020 arranged in sequence. Stages 1010 and 1020 may refer to a selection stage and a speeding stage, respectively. The scanning procedure shown in FIGS. 10A-10D is similar to that shown in FIGS. 9A-9D, with the difference being that the speeding stage is arranged after the selection stage in FIGS. 10A-10D. For clarity, curves 1002, 1004, and 1006, that respectively illustrate the dark-state voltage, bright-state voltage, and gray-state voltage applied to the pixel circuit on the activated scanning electrode over time, are separately shown in FIGS. 10A, 10B, and 10C, respectively. Additionally, curves 1002, 1004, and 1006 are collectively shown in FIG. 10D for reference. The speeding stage (e.g., stage 1020) helps reduce the overall duration of the scanning procedure when updating the screen of the display panel 22.

Case 8: One $1^{st}$ Manipulation Stage Plus Selection Stage

FIGS. 15A to 15D are waveform diagrams illustrating the driving voltage applied to the pixel circuits over time in accordance with yet another embodiment of the present disclosure.

In some embodiments, the PWM scanning procedure of each activated scanning electrode may include stages 1510 and 1520 arranged in sequence. Stage 1510 may refer to a manipulation stage including an operation region 1511 (e.g., including sub-regions 1511A and 1511B) and a sleep region 1512. Stage 1520 may refer to a selection stage. For clarity, curves 1502, 1504, and 1506, that respectively illustrate the dark-state voltage, bright-state voltage, and gray-state voltage applied to the pixel circuit on the activated scanning electrode over time, are separately shown in FIGS. 15A, 15B, and 15C, respectively. Additionally, curves 1502, 1504, and 1506 are collectively shown in FIG. 15D for reference.

In some embodiments, the AC voltages on the dark-state curve, bright-state curve, and grayscale curve (e.g., curves 1502, 1504, and 1506) are substantially the same within a duration of the operation region (e.g., region 1511) in the manipulation stage (e.g., stage 1510), and they are different in the remaining duration of the operation region in the manipulation stage. When the AC voltages on these curves are substantially the same (e.g., by setting the driving parameters described above) within the duration of the operation region in the manipulation stage, it can lead to improved image quality on screen 30 displayed on the display panel 22.

It should be noted that, for purposes of description, the horizontal axes in FIGS. 3-10 and 15 are shown in units of microseconds (s), which are not in absolute scale in time, but are used to illustrate the behaviors of the AC voltage pulses within different stages.

Figure 13:
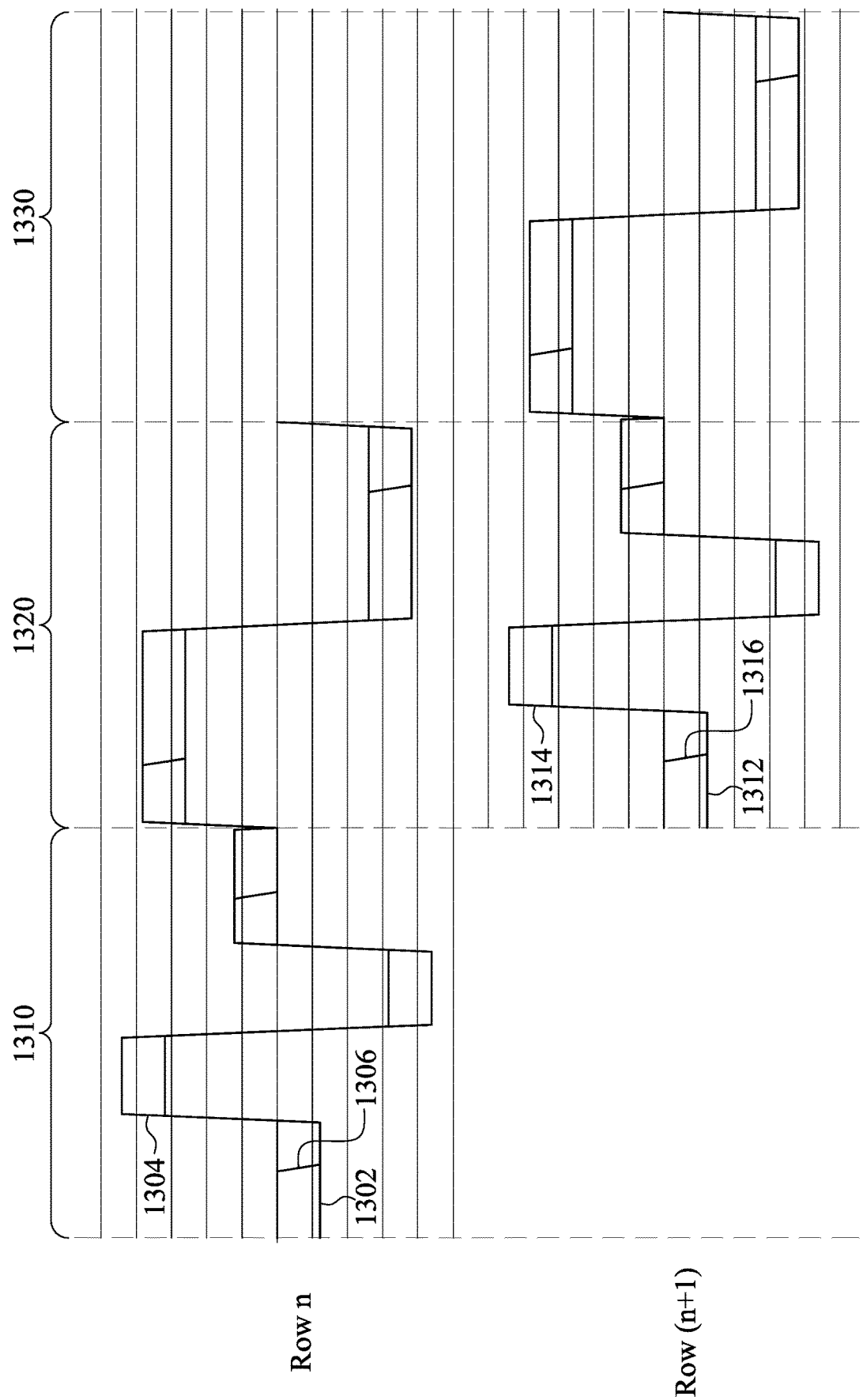
FIG. 13 is a waveform diagram illustrating the pipeline operations of two adjacent rows in accordance with some embodiments of the present disclosure.

In some embodiments, the proposed PWM scanning procedure for two adjacent scanning electrodes can be performed in a pipelined manner as shown in FIG. 13. For example, stages 1310 and 1320 represent the manipulation stage and the selection stage for the scanning electrode on Row n, while stages 1320 and 1330 represent to the manipulation stage and the selection stage for the scanning electrode on Row (n+1), respectively. Additionally, curves 1302 to 1306 for Row n and curves 1312 to 1316 for Row (n+1) may be similar to curves 302 to 306 shown in FIG. 3D, respectively. More specifically, the scanning electrode driving circuit 221 and the data electrode driving circuit 222 can activate two adjacent scanning electrodes on Rows n and (n+1) at the same time, allowing the selection stage of the PWM scanning procedure for Row n and the manipulation stage of the PWM scanning procedure for Row (n+1) to be performed concurrently. As a result, the duration for updating or writing the pixels (i.e., the scanning procedure) on each scan line can be substantially equal to the duration of the selection stage, where is shortened by the manipulation stage (or the speeding stage) compared to the duration of the selection stage in the conventional PWM scanning procedure. It should be noted that while the curves shown in FIG. 13 are derived from FIG. 3D, the concept for pipelining the proposed PWM scanning procedure can be applied to the embodiments of FIGS. 4 to 10 as well, thereby shortening the duration of the selection stage and the overall duration of the scanning procedure for each scan line.

Figure 14:
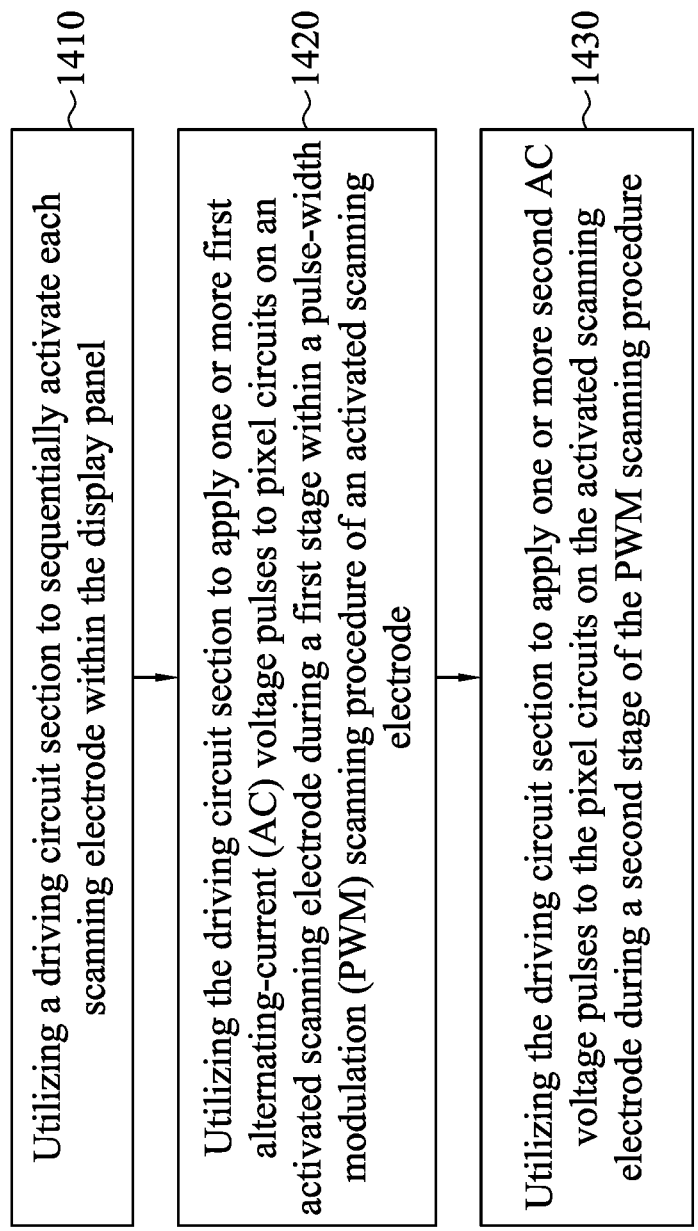
FIG. 14 is a flowchart of a method for driving a cholesteric liquid crystal display in accordance with some embodiments of the present disclosure.
Figure 15A:
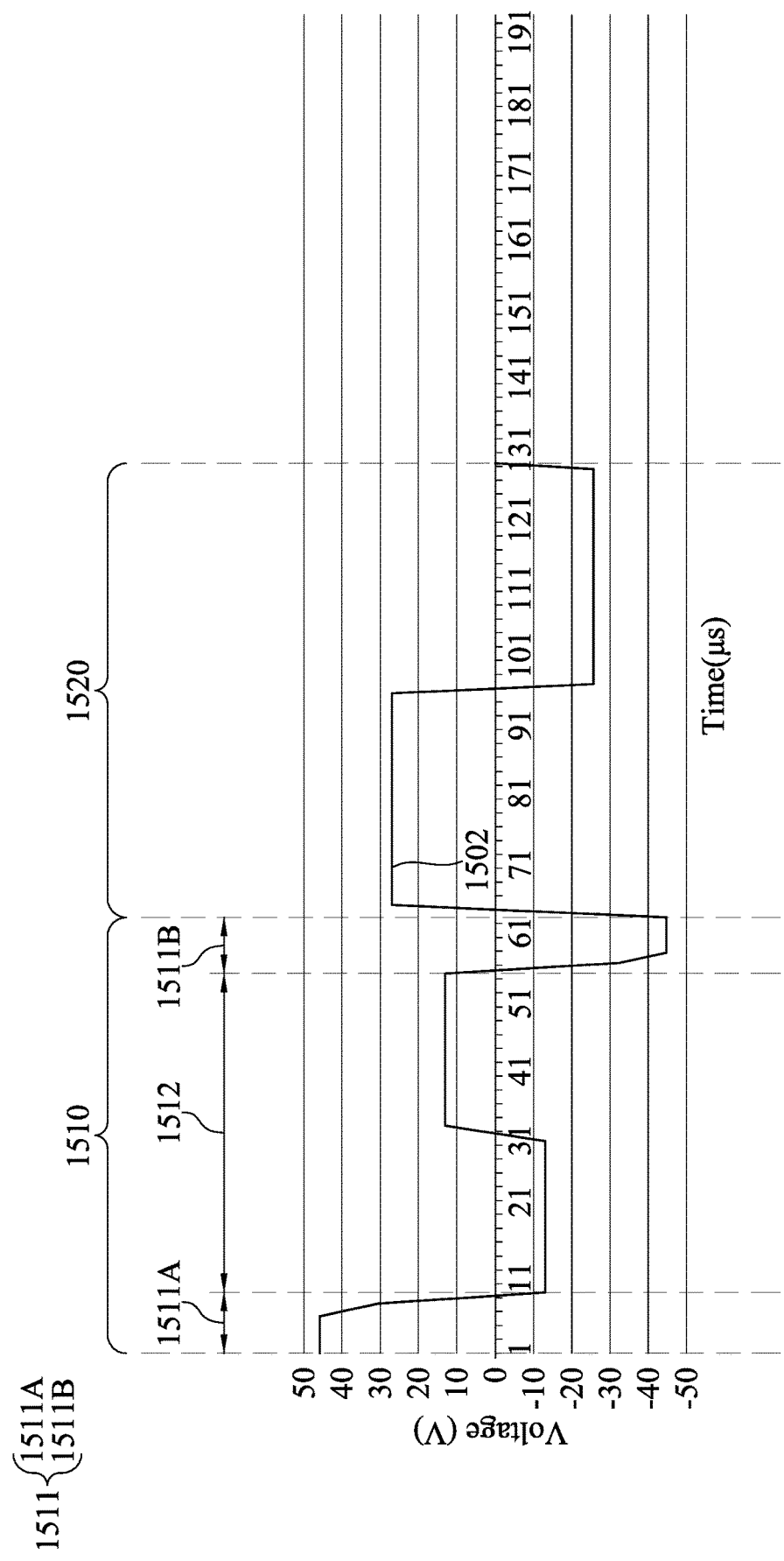
FIGS. 15A to 15D are waveform diagrams illustrating the driving voltage applied to the pixel circuits over time in accordance with yet another embodiment of the present disclosure.
Figure 15B:
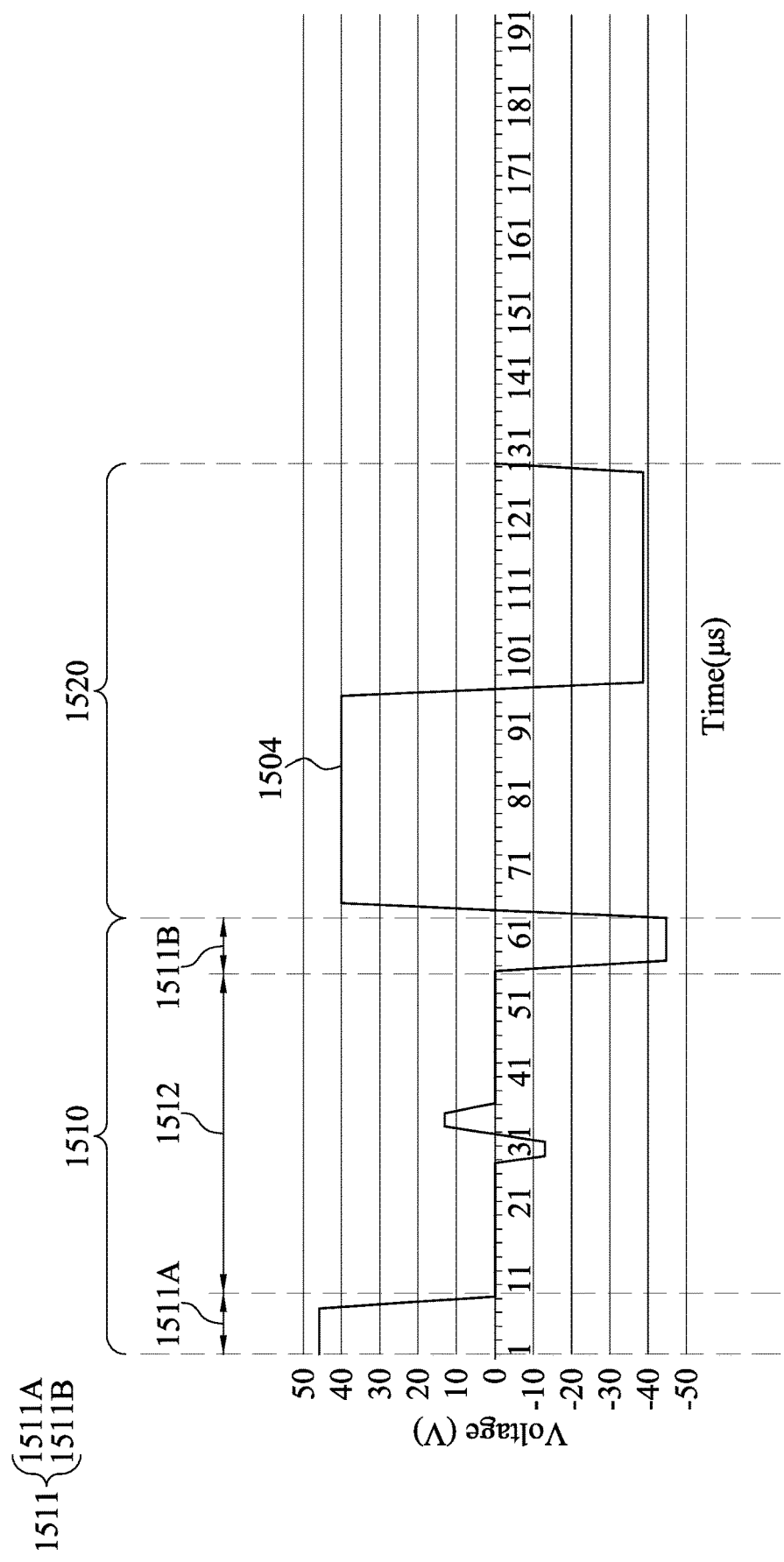
Figure 15C:
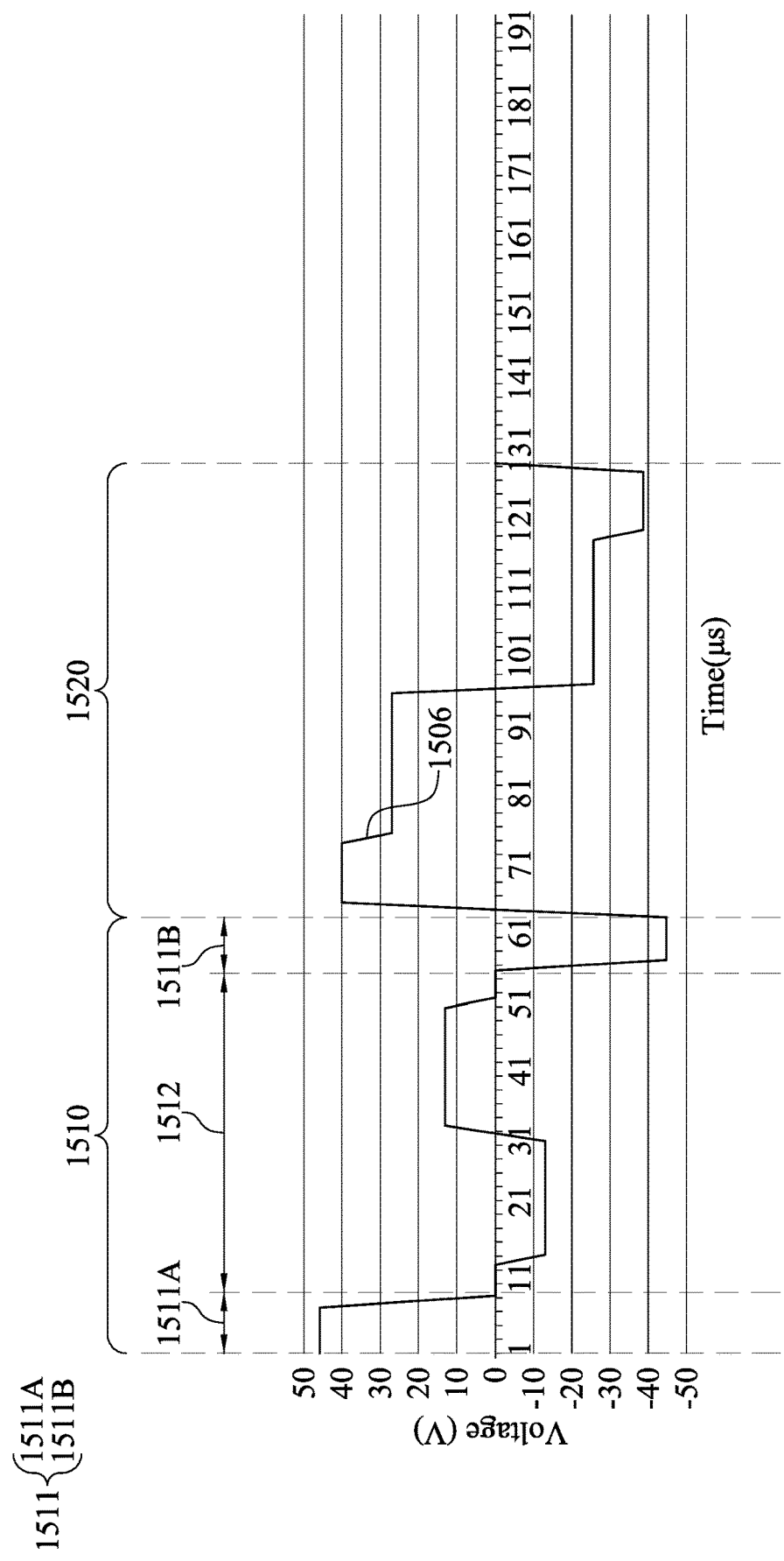
Figure 15D:
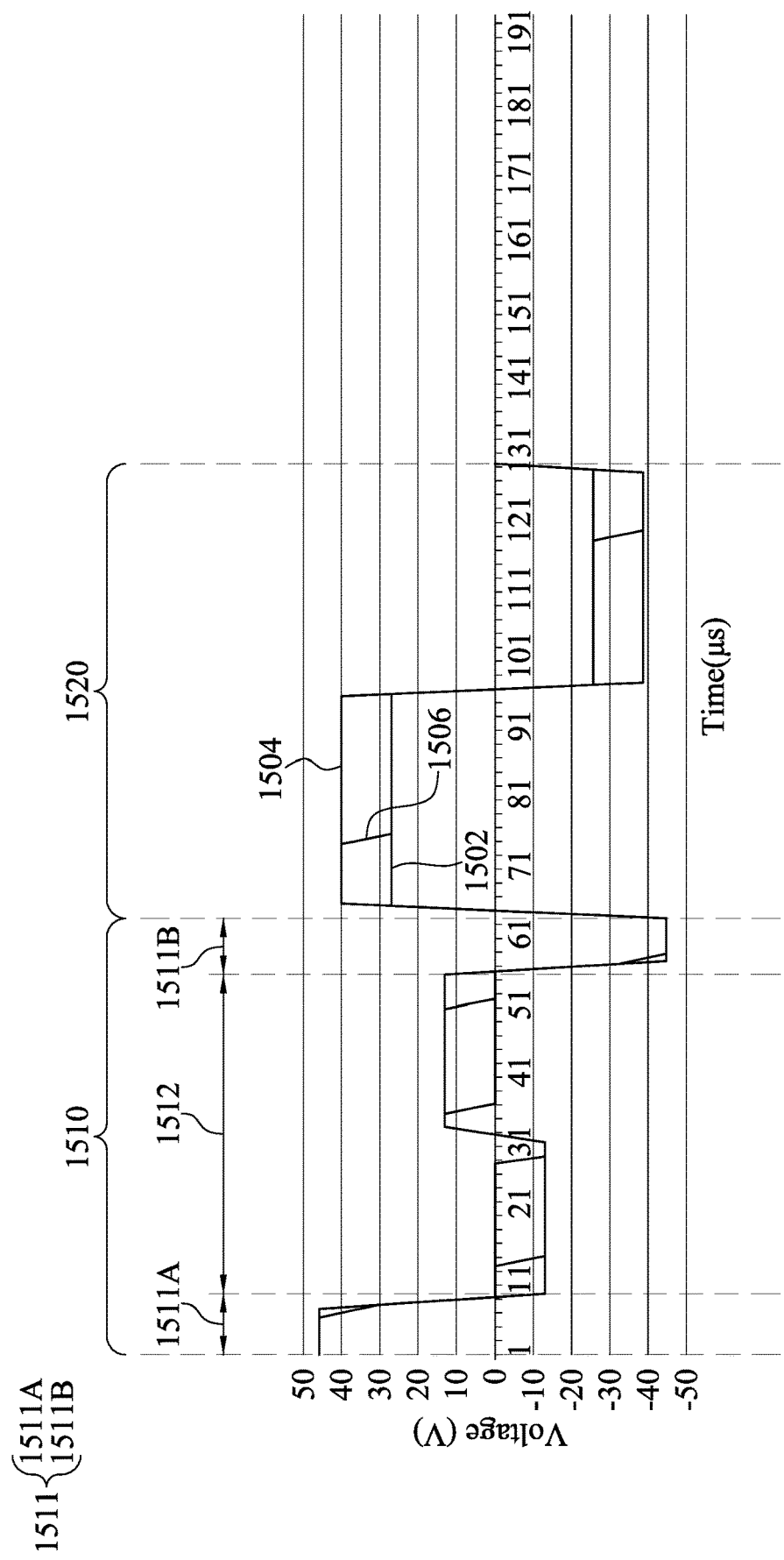

FIG. 14 is a flowchart of a method for driving a cholesteric liquid crystal display in accordance with some embodiments of the present disclosure.

Please refer to FIG. 2 and FIG. 14. Flow 1400 may include steps 1410 to 1430. Step 1410: Utilizing a driving circuit section to sequentially activate each scanning electrode within the display panel. For example, the driving circuit section may include the scanning electrode driving circuit 221 and the data electrode driving circuit 222. While updating or writing the screen displayed on the display panel 22, the driving circuit section may sequentially activate each scanning electrode (e.g., BSE1 to BSEN, GSE1 to GSEN, or RSE1 to RSEN) within the display panel.

Step 1420: Utilizing the driving circuit section to apply one or more first alternating-current (AC) voltage pulses to pixel circuits on an activated scanning electrode during a first stage within a pulse-width modulation (PWM) scanning procedure of an activated scanning electrode.

Step 1430: Utilizing the driving circuit section to apply one or more second AC voltage pulses to the pixel circuits on the activated scanning electrode during a second stage of the PWM scanning procedure. In some embodiments, a first voltage amplitude and a first frequency of the first AC voltage pulses are different from a second voltage amplitude and a second frequency of the second AC voltage pulses, respectively. For example, the first stage may be the speeding stage or the first-type manipulation stage described in the aforementioned embodiments.

While the present disclosure has been described with reference to specific embodiments, it is evident that many alternatives, modifications, and variations may be apparent to those skilled in the art. For example, various components of the embodiments may be interchanged, added, or substituted in other embodiments. Also, all of the elements of each figure are not necessary for operation of the disclosed embodiments. For example, one of ordinary skill in the art of the disclosed embodiments would be able to make and use the teachings of the present disclosure by simply employing the elements of the independent claims. Accordingly, embodiments of the present disclosure as set forth herein are intended to be illustrative, not limiting. Various changes may be made without departing from the spirit and scope of the present disclosure.

Even though numerous characteristics and advantages of the present disclosure have been set forth in the foregoing description, together with details of the structure and function of the invention, the disclosure is illustrative only. Changes may be made to details, especially in matters of shape, size, and arrangement of parts, within the principles of the invention to the full extent indicated by the broad general meaning of the terms in which the appended claims are expressed.

What is claimed is:

1. A cholesteric liquid crystal display device, comprising:
   a liquid crystal display panel, comprising:
      a first substrate on which a plurality of first electrodes extending in a first direction are formed;
      a second substrate on which a plurality of second electrodes extending in a second direction different from the first direction are formed;
      a cholesteric liquid crystal layer formed between the first substrate and the second substrate; and
      a driving circuit section, configured to apply a plurality of alternating-current (AC) voltage pulses to pixel circuits at intersections between the first electrodes and the second electrodes,
   wherein a pulse-width modulation (PWM) scanning procedure of the pixel circuits on an activated first electrode comprises a first stage and a second stage,
   wherein the first stage is configured to expedite the second stage for writing data to the pixel circuits on the activated first electrode.

2. The cholesteric liquid crystal display device of claim 1, wherein:
the AC voltage pulses within the first stage and the second stage have a first voltage amplitude and a second voltage amplitude, respectively; and
the first voltage amplitude is different from the second voltage amplitude.

3. The cholesteric liquid crystal display device of claim 2, wherein:
the first voltage amplitude is substantially equal to a voltage amplitude in a homeotropic state of cholesteric liquid crystal molecules within the cholesteric liquid crystal layer; and
the second voltage amplitude is lower than the first voltage amplitude.

4. The cholesteric liquid crystal display device of claim 3, wherein:
the PWM scanning procedure further comprises a third stage for manipulating grayscale values of the pixel circuits to be written in the second stage; and
the third stage, the first stage, and the second stage are arranged in sequence.

5. The cholesteric liquid crystal display device of claim 4, wherein:
the third stage comprises an operation region and a sleep region;
the AC voltage pulses in the operation region and the sleep region within the third stage have a third voltage amplitude and a fourth voltage amplitude, respectively;
the first voltage amplitude is higher than the second voltage amplitude; and
the third voltage amplitude is higher than the fourth voltage amplitude.

6. The cholesteric liquid crystal display device of claim 5, wherein:
the operation region comprises a plurality of operation sub-regions;
the sleep region comprises a plurality of sleep sub-regions; and
the operation sub-regions and the sleep sub-regions are arranged in an alternating fashion.

7. The cholesteric liquid crystal display device of claim 6, wherein:
a first ratio between a first duration of the operation region and a second duration of the second stage is lower than a first predetermined value; and
a second ratio between a third duration of the sleep region and the second duration of the second stage is higher than a second predetermined value.

8. The cholesteric liquid crystal display device of claim 7, wherein the first predetermined value and the second predetermined value are 0.6 and 0.4, respectively.

9. The cholesteric liquid crystal display device of claim 4, wherein:
the AC voltage pulses within the third stage have a third voltage amplitude; and
the first voltage amplitude is higher than the second voltage amplitude.

10. A cholesteric liquid crystal display device, comprising:
a liquid crystal display panel, comprising:
a first substrate on which a plurality of first electrodes extending in a first direction are formed;
a second substrate on which a plurality of second electrodes extending in a second direction different from the first direction are formed;
a cholesteric liquid crystal layer formed between the first substrate and the second substrate; and
a driving circuit section, configured to apply a plurality of alternating-current (AC) voltage pulses to pixel circuits at intersections between the first electrodes and the second electrodes,
wherein a pulse-width modulation (PWM) scanning procedure of the pixel circuits on an activated first electrode comprises a first stage and a second stage,
wherein the first stage is configured to manipulate grayscale values of the pixel circuits on the activated first electrode to be written in the second stage.

11. The cholesteric liquid crystal display device of claim 10, wherein:
the first stage comprises an operation region and a sleep region;
the AC voltage pulses in the operation region and the sleep region within the first stage have a first voltage amplitude and a second voltage amplitude, respectively;
the AC voltage pulses within the second stage have a third voltage amplitude; and
the first voltage amplitude is higher than the second voltage amplitude.

12. The cholesteric liquid crystal display device of claim 11, wherein the PWM scanning procedure further comprises a third stage which is substantially the same as the first stage, and the third stage, the first stage, and the second stage are arranged in sequence.

13. The cholesteric liquid crystal display device of claim 11, wherein:
the PWM scanning procedure further comprises a third stage;
the third stage, the first stage, and the second stage are arranged in sequence; and
a frequency and a voltage amplitude of the AC voltage pulses within the first stage are different from those within the third stage.

14. The cholesteric liquid crystal display device of claim 11, wherein:
the PWM scanning procedure further comprises a third stage for manipulating the grayscale values of the pixel circuits on the activated first electrode to be written in the second stage; and
the first stage, the second stage, and the third stage are arranged in sequence.

15. The cholesteric liquid crystal display device of claim 14, wherein:
the AC voltage pulses within the third stage have a fifth voltage amplitude; and
the fifth voltage amplitude is substantially between the second voltage amplitude and the third voltage amplitude.

16. The cholesteric liquid crystal display device of claim 11, wherein:
during the first stage and the second stage, dark-state AC voltage pulses and bright-state AC voltage pulses are applied to the second electrodes on the activated first electrode to obtain a first RV (reflectivity vs. voltage) curve, and a second RV curve, respectively; and
a voltage interval exists between the first RV curve and the second RV curve within a particular voltage range.

17. The cholesteric liquid crystal display device of claim 16, wherein the driving circuit section is further configured to adjust the voltage interval using a plurality of driving parameters in the first stage, and the driving parameters comprise durations of the AC voltage pulses, temperature and viscosity of cholesteric liquid crystal molecules within the cholesteric liquid crystal layer, driving capability, a pitch of cholesteric liquid crystal helical structures within the cholesteric liquid crystal layer.

18. The cholesteric liquid crystal display device of claim 16, wherein:
- a first area of the dark-state AC voltage pulses over time is greater than or equal to a second area of the bright-state AC voltage pulses over time in the sleep region within the first stage; and
- a third area of the bright-state AC voltage pulses over time is greater than a fourth area of the dark-state AC voltage pulses over time within the second stage.

19. A method for driving a cholesteric liquid crystal display device, the cholesteric liquid crystal display device comprising a display panel and a driving circuit section, wherein the display panel comprises a plurality of scanning electrodes and a plurality of data electrodes, the method comprising:
- utilizing the driving circuit section to sequentially activate each scanning electrode within the display panel;
- utilizing the driving circuit section to apply one or more first alternating-current (AC) voltage pulses to pixel circuits on an activated scanning electrode during a first stage within a pulse-width modulation (PWM) scanning procedure of an activated scanning electrode; and
- utilizing the driving circuit section to apply one or more second AC voltage pulses to the pixel circuits on the activated scanning electrode during a second stage of the PWM scanning procedure,
- wherein a first voltage amplitude and a first frequency of the one or more first AC voltage pulses are different from a second voltage amplitude and a second frequency of the one or more second AC voltage pulses, respectively.

20. The method of claim 19, wherein the first stage is for expediting the second stage to write data to the pixel circuits on the activated scanning electrode, or for manipulating grayscale values of the pixel circuits to be written in the second stage.

* * * * *